Figure 4:
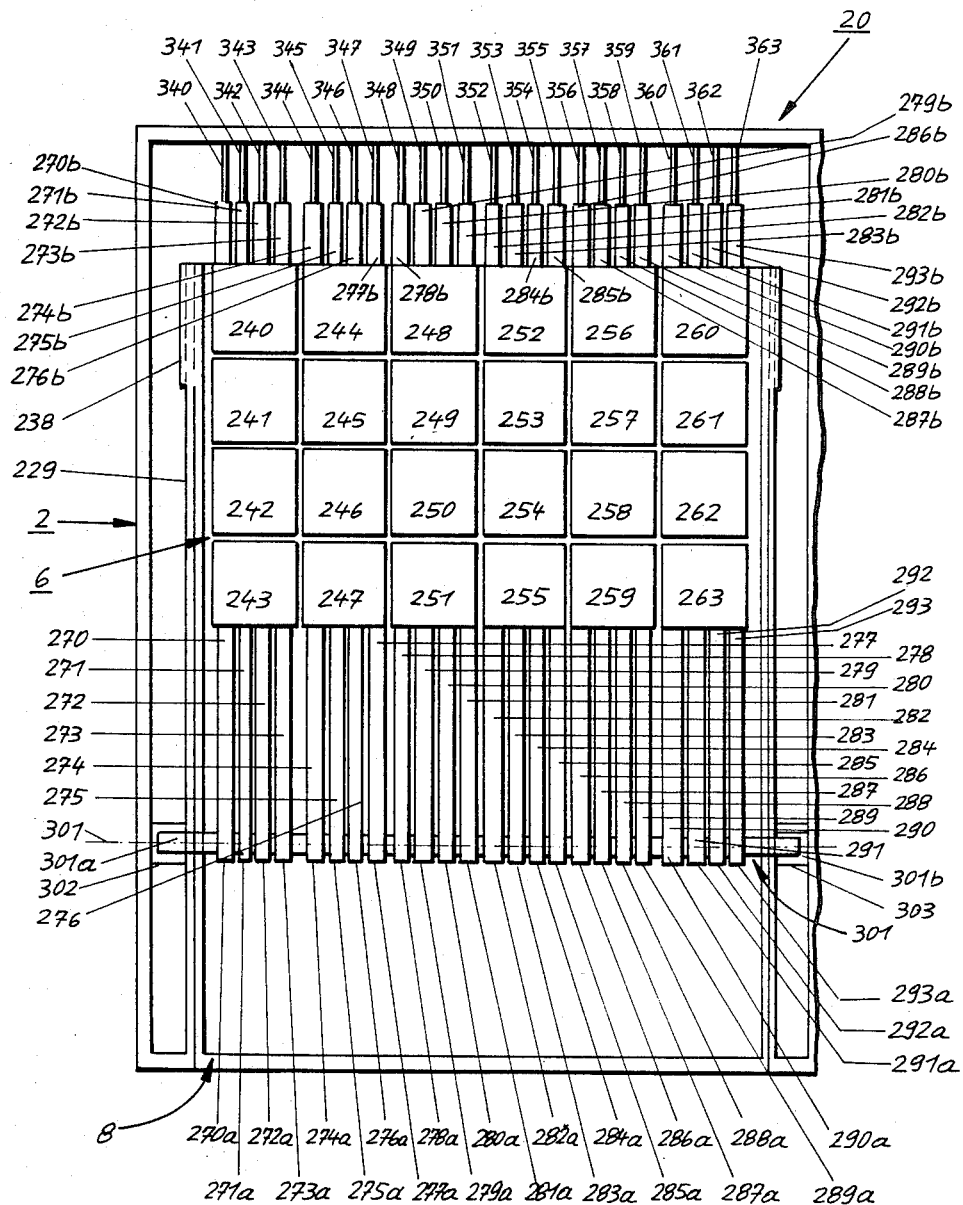

United States Patent [19]

Ippen

[11] Patent Number: 4,543,452
[45] Date of Patent: Sep. 24, 1985

[54] APPARATUS FOR THE STORING AND RECOVERY OF INFORMATION, SUBSCRIBER'S NUMBERS, SUBSCRIBER'S ADDRESSES, ETC.

[75] Inventor: Heiko Ippen, Krefeld, Fed. Rep. of Germany

[73] Assignee: Confon AG, Rheineck, Switzerland

[21] Appl. No.: 469,135

[22] Filed: Feb. 23, 1983

[30] Foreign Application Priority Data

Feb. 23, 1982 [DE] Fed. Rep. of Germany ... 8205000[U]
Feb. 23, 1982 [DE] Fed. Rep. of Germany ... 8205001[U]
Feb. 17, 1983 [DE] Fed. Rep. of Germany ....... 3304772

[51] Int. Cl.$^4$ ........................................ H04M 1/274
[52] U.S. Cl. ................................ 179/90 B; 179/90 K
[58] Field of Search ............ 179/90 B, 90 A, 90 AN, 179/90 K, 18 BA, 178

[56] References Cited

U.S. PATENT DOCUMENTS

| 4,164,630 | 8/1979 | Brodbeck | 179/90 B |
| 4,408,101 | 10/1983 | Brodbeck | 179/90 B |
| 4,409,440 | 10/1983 | Brodbeck | 179/90 B |

*Primary Examiner*—Stafford D. Schreyer
*Attorney, Agent, or Firm*—Erwin S. Teltscher

[57] ABSTRACT

The invention relates to an apparatus for the storage and recovery of information and subscriber's numbers while using a telephone register. By means of selection keys, the desired register card is removed from a stack of such cards by extending a drawer or the flapping up of a cover. A device connectable to a telephone makes it possible to automatically call up and dial stored subscriber's numbers. The keyboards with the selection keys of the telephone register and the subscriber's number dialing device are arranged in juxtaposed or superimposed manner in the telephone register casing (FIG. 1).

40 Claims, 62 Drawing Figures

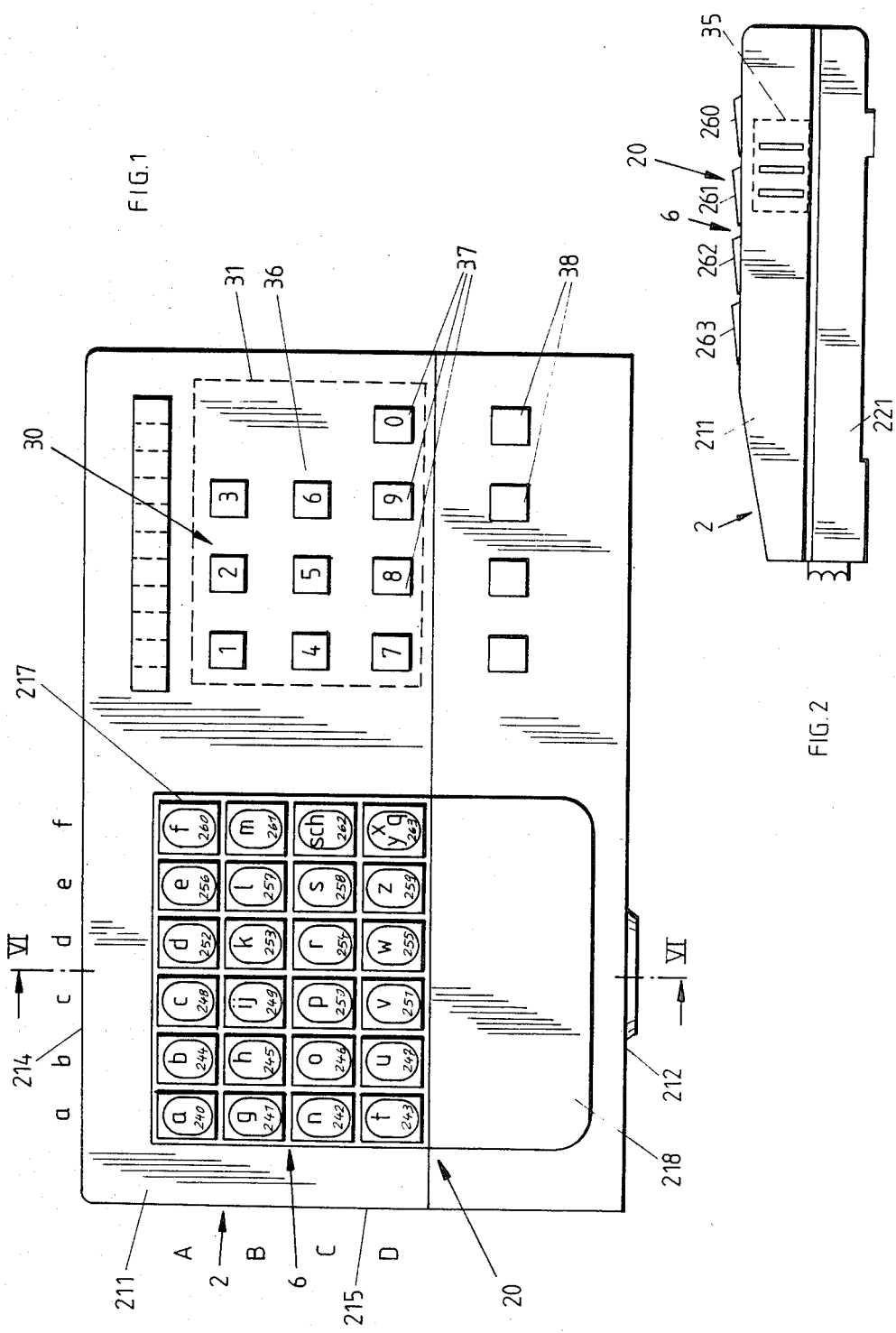

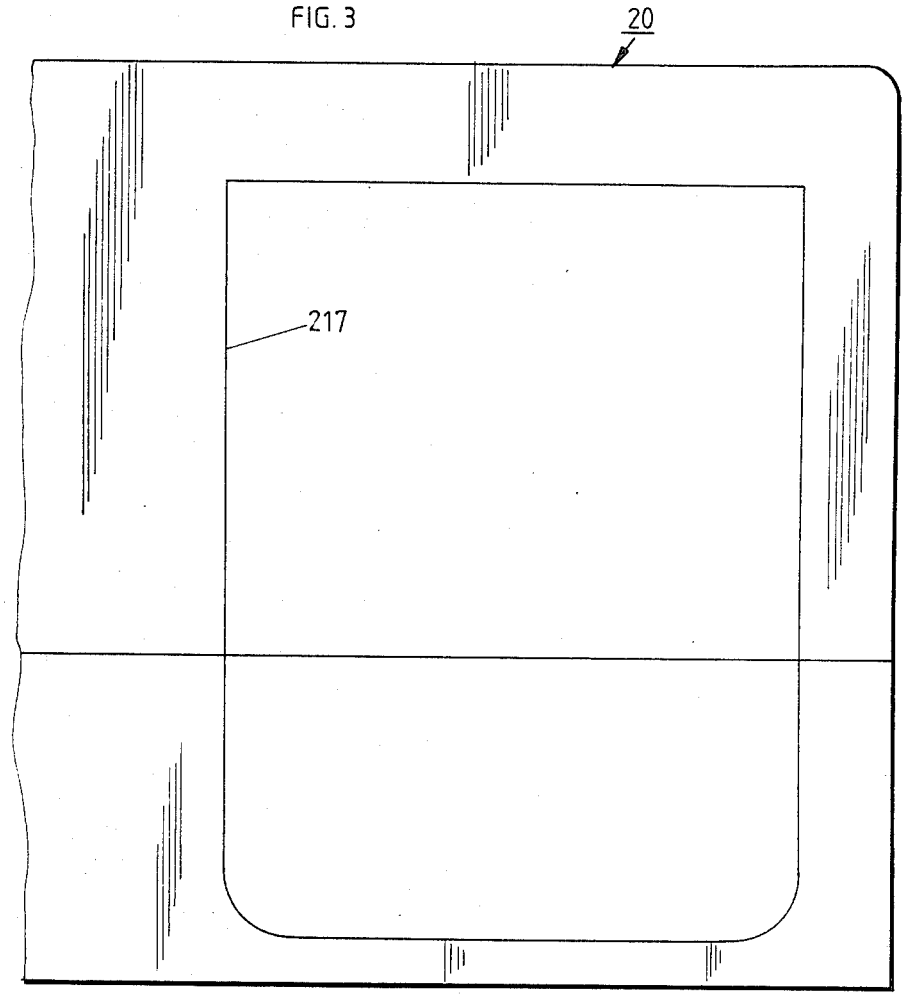
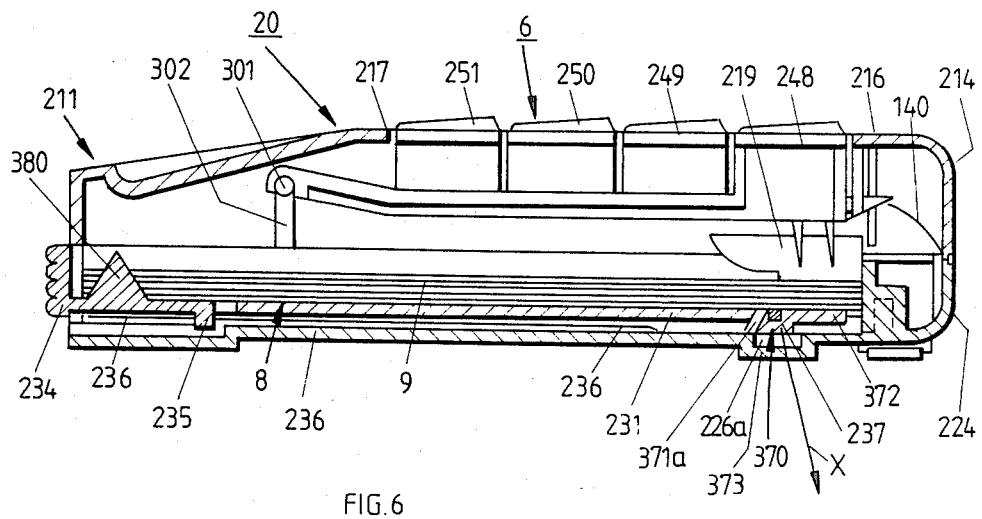

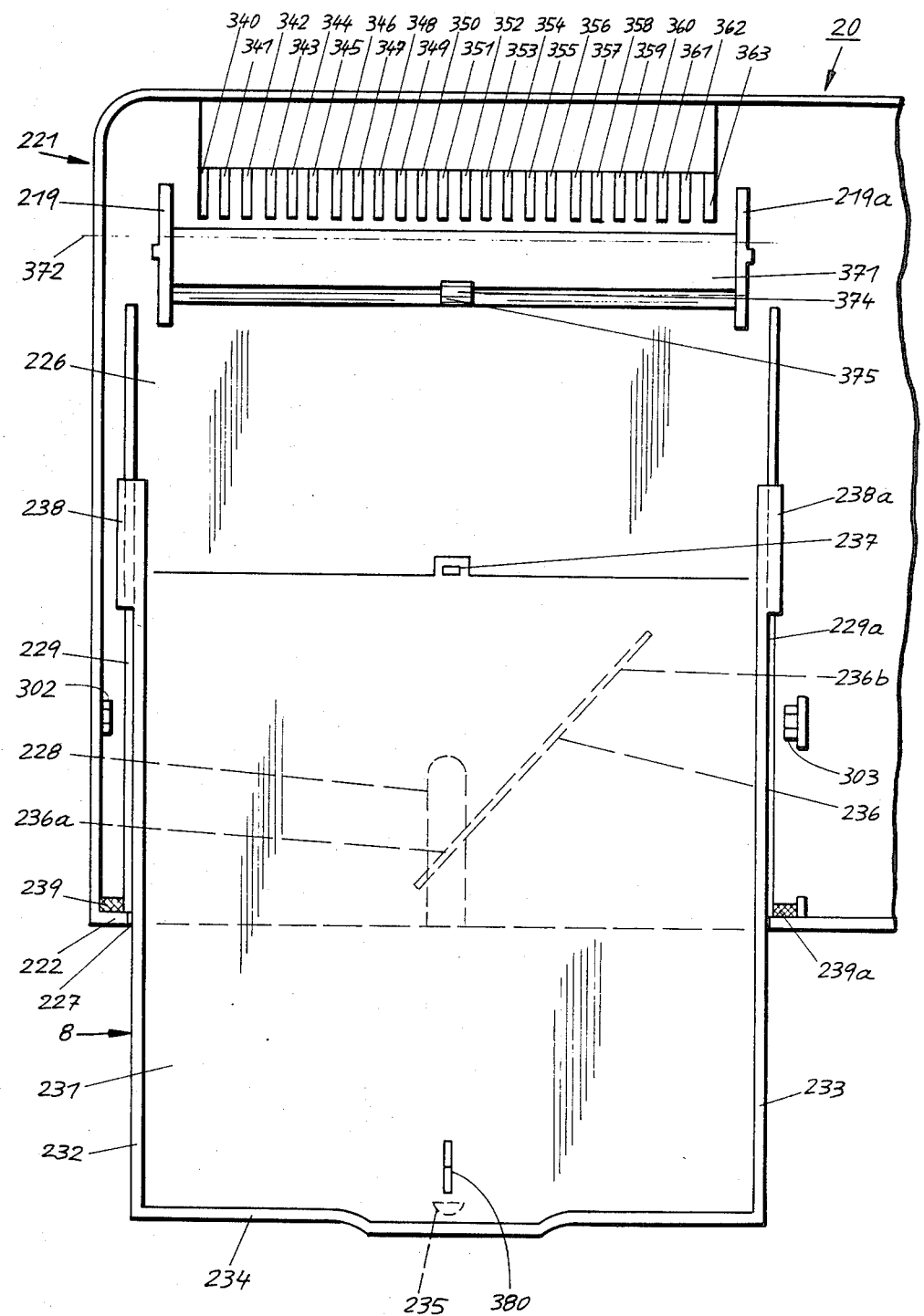

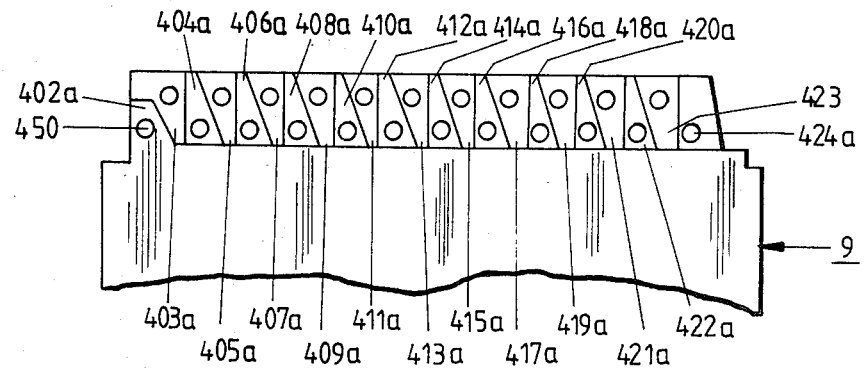
FIG. 14
FIG. 15
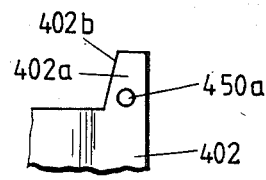
FIG. 16
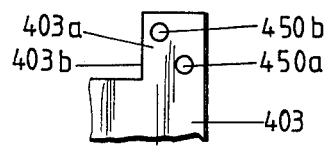
FIG. 17
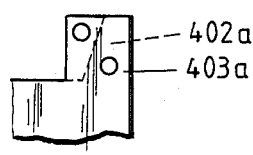
FIG. 18
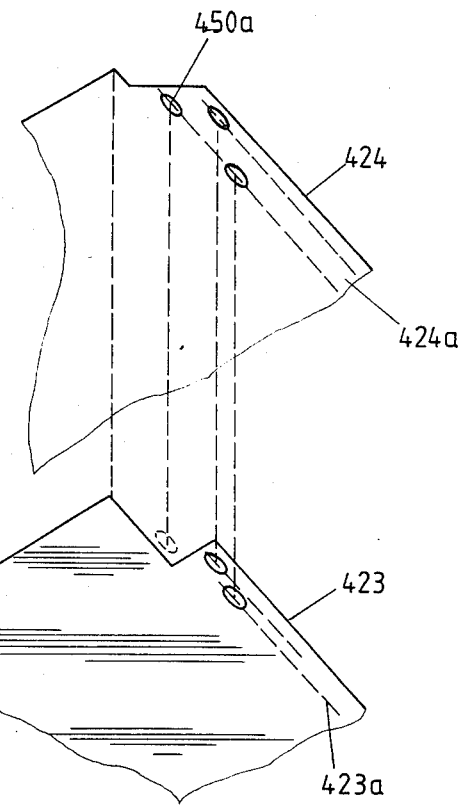

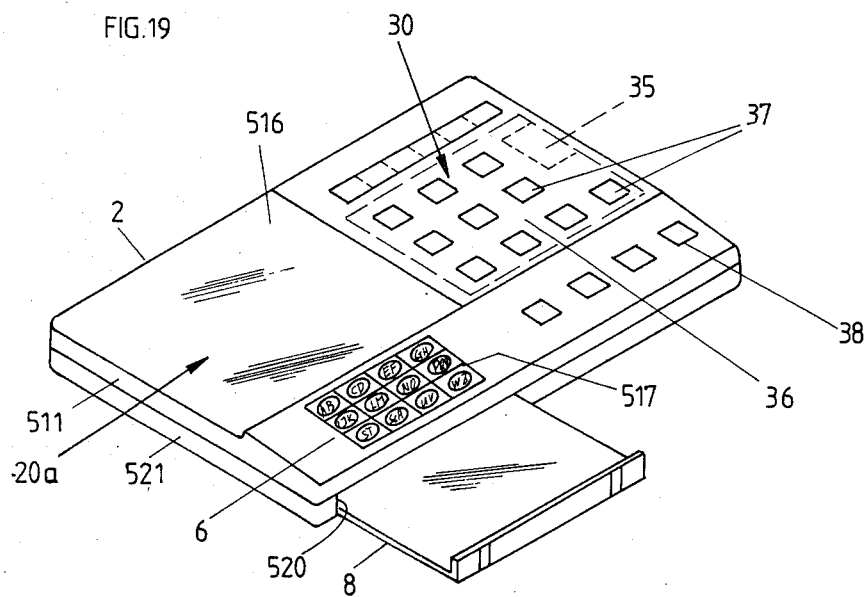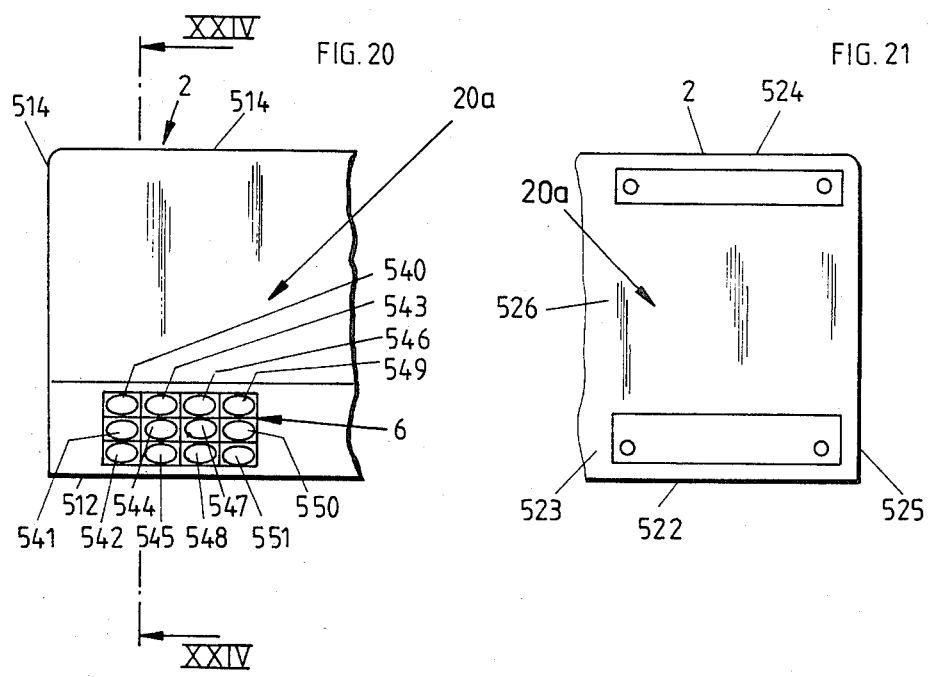

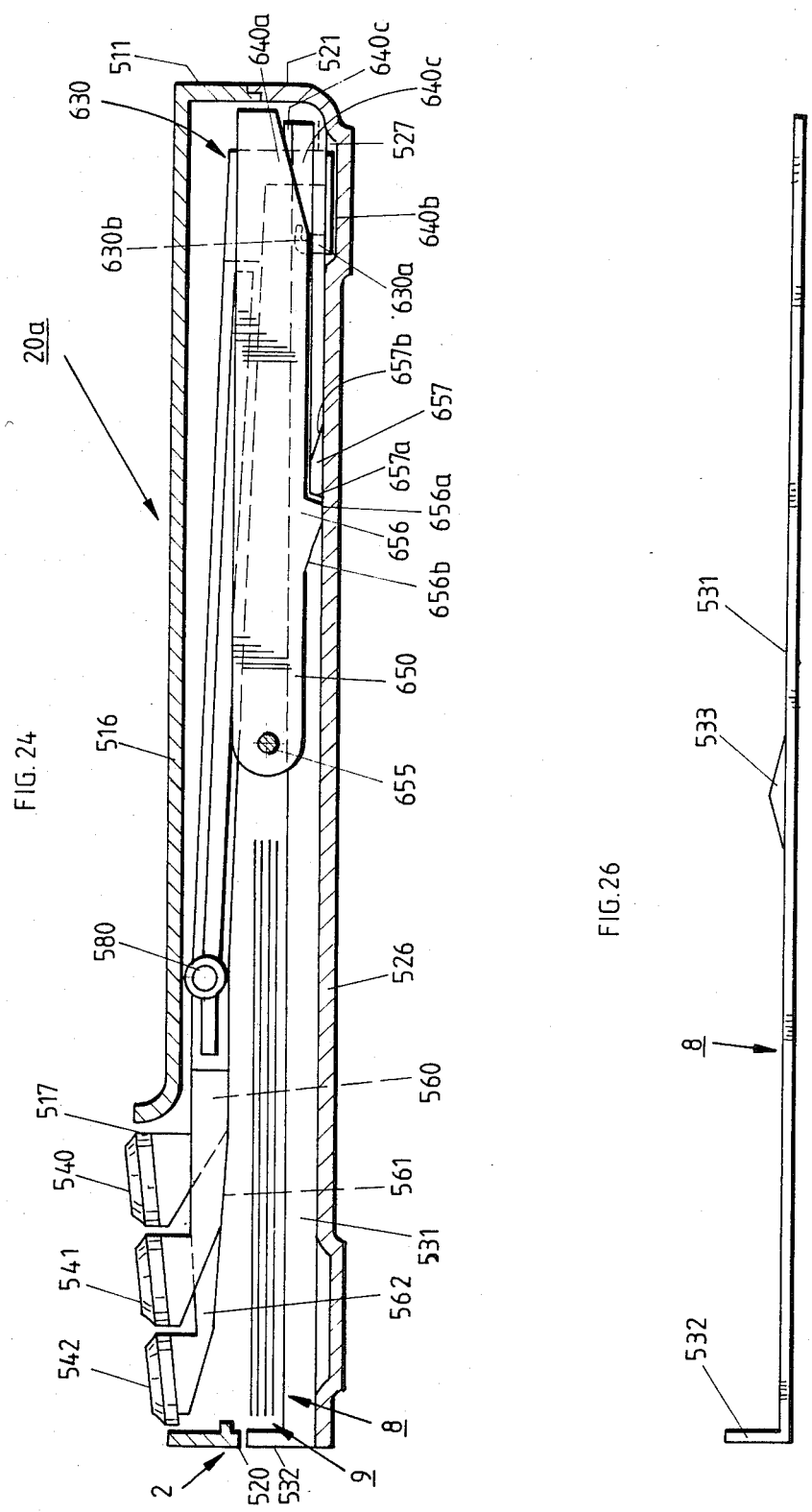

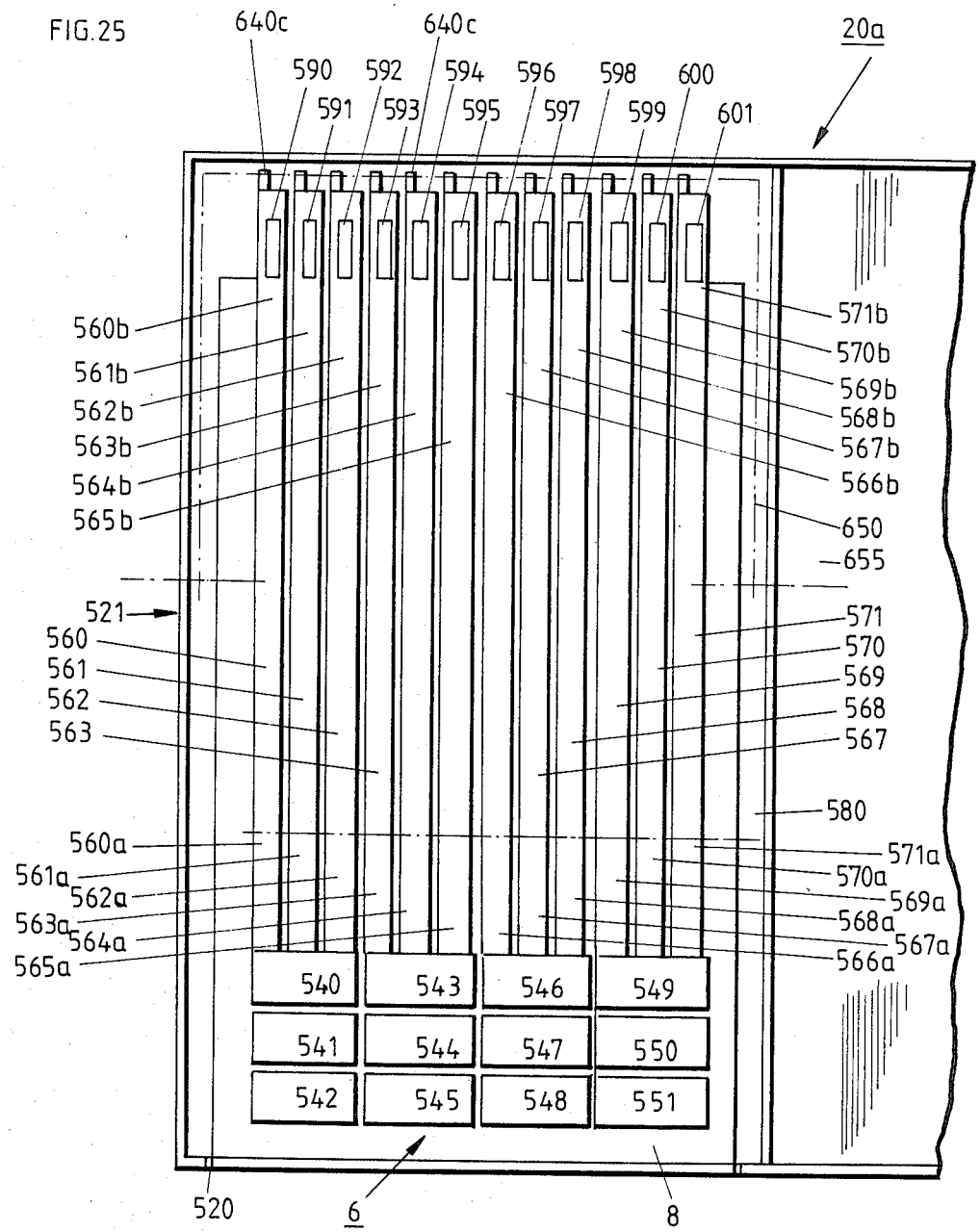

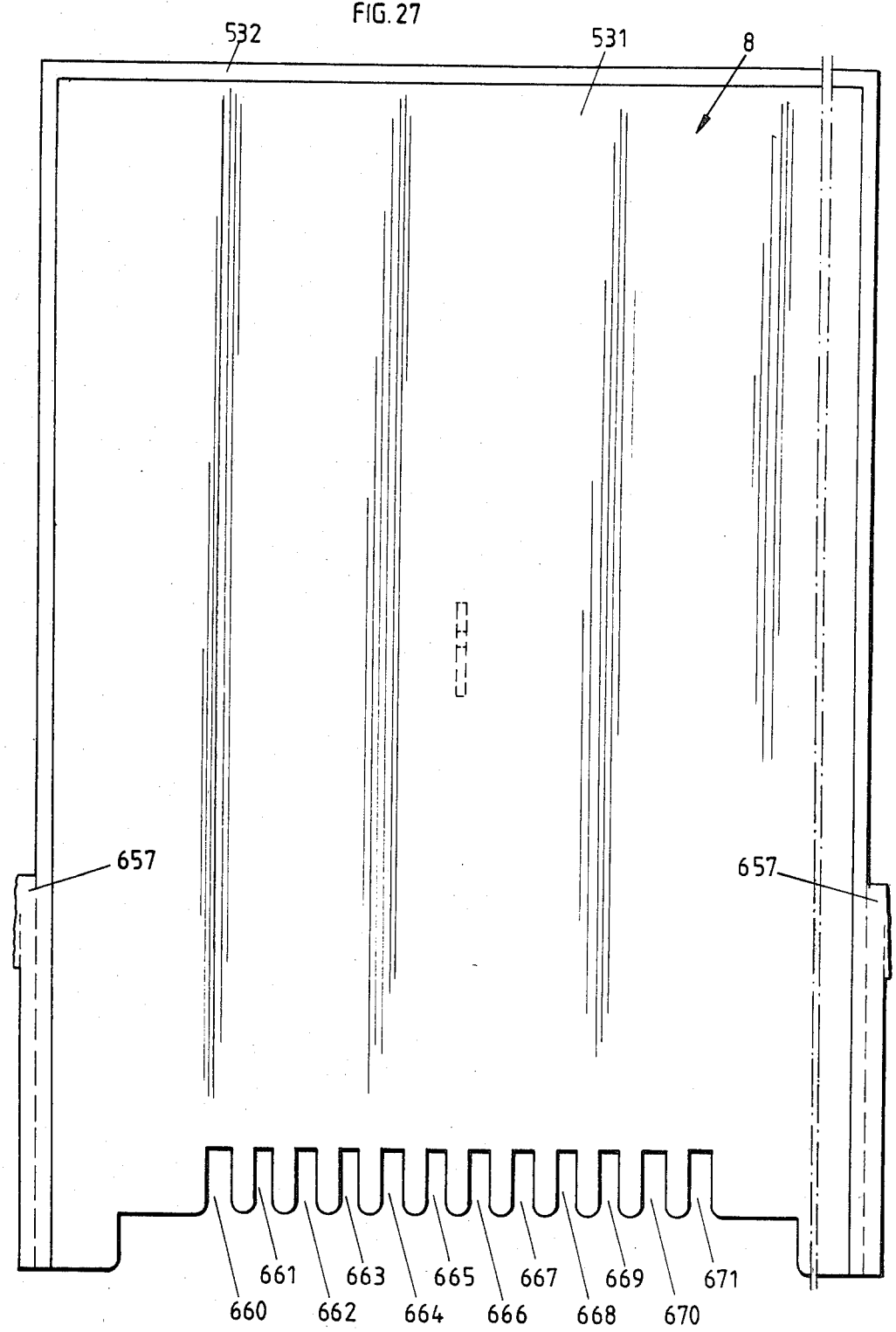

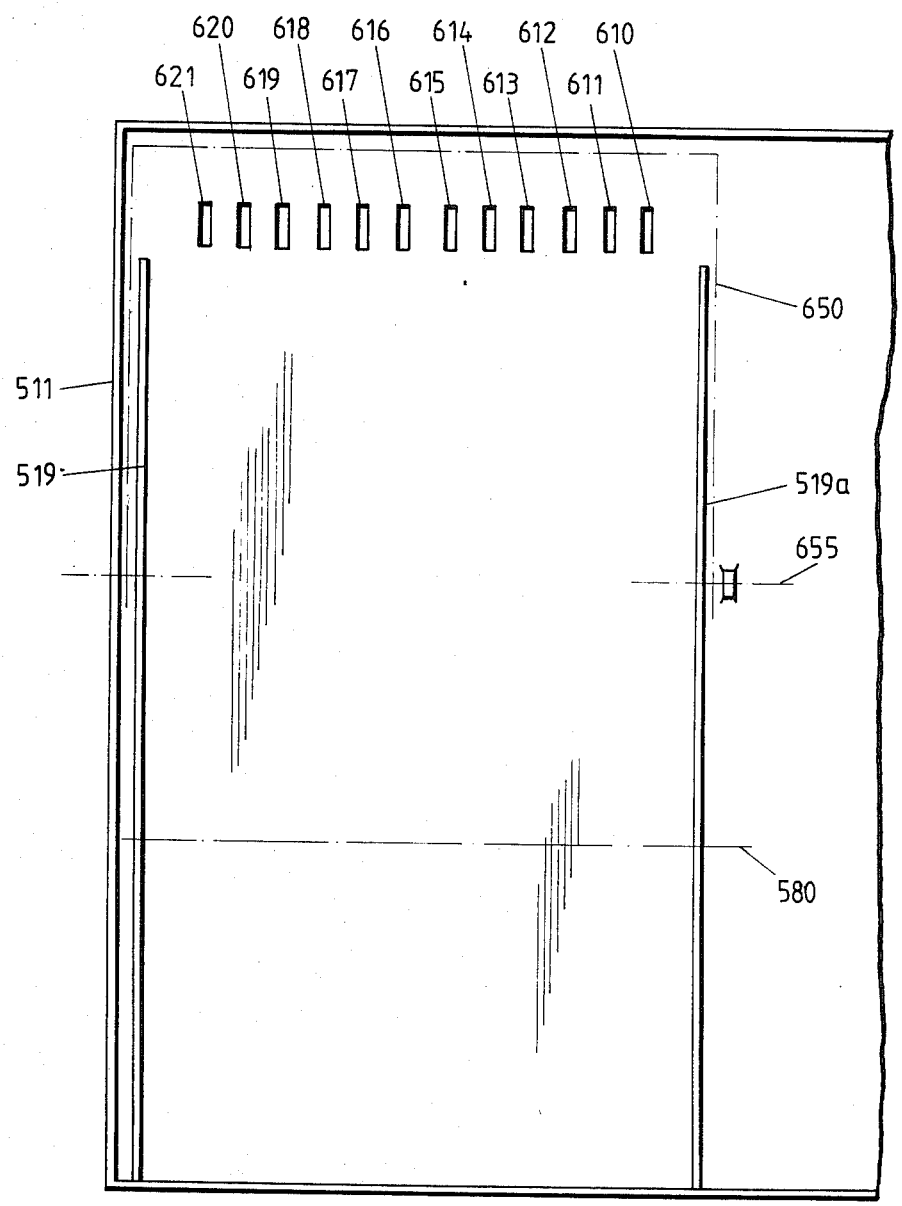

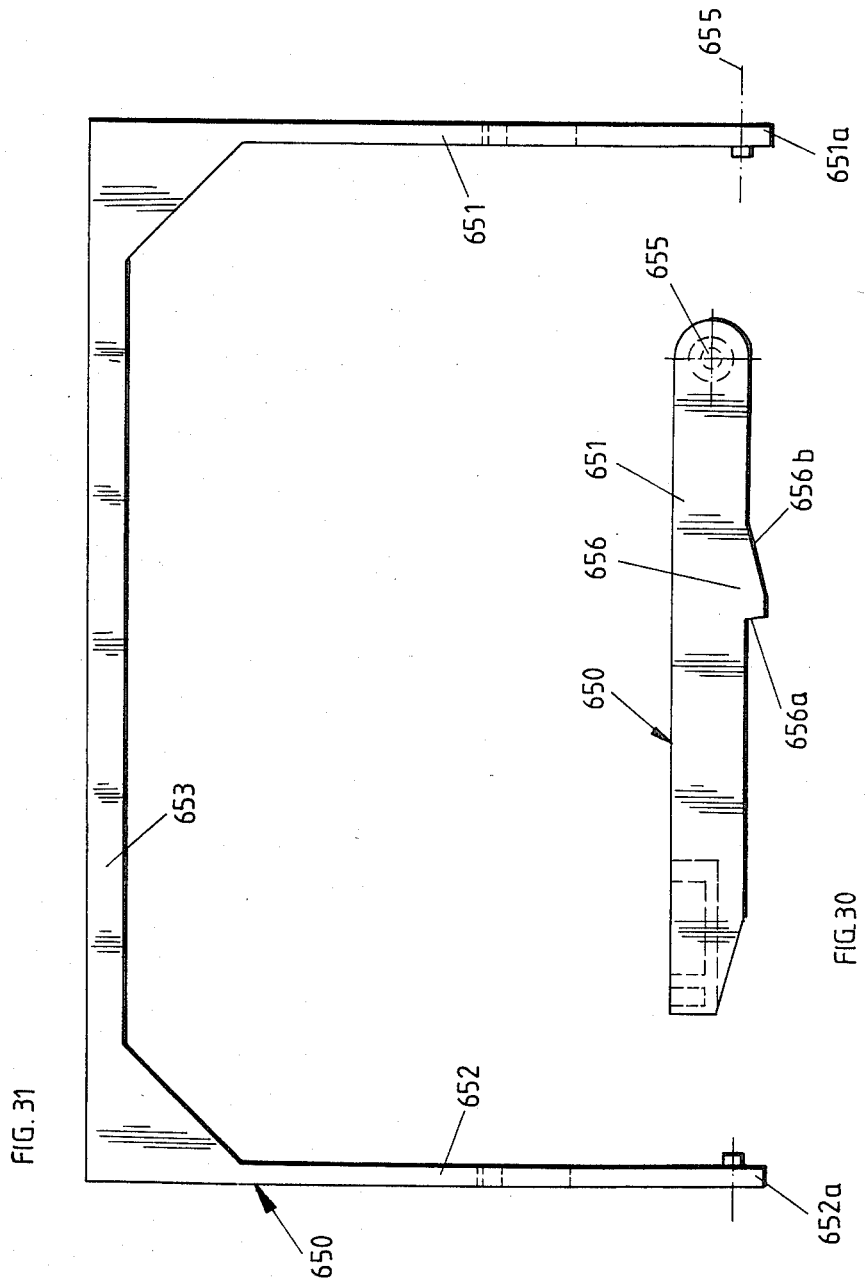

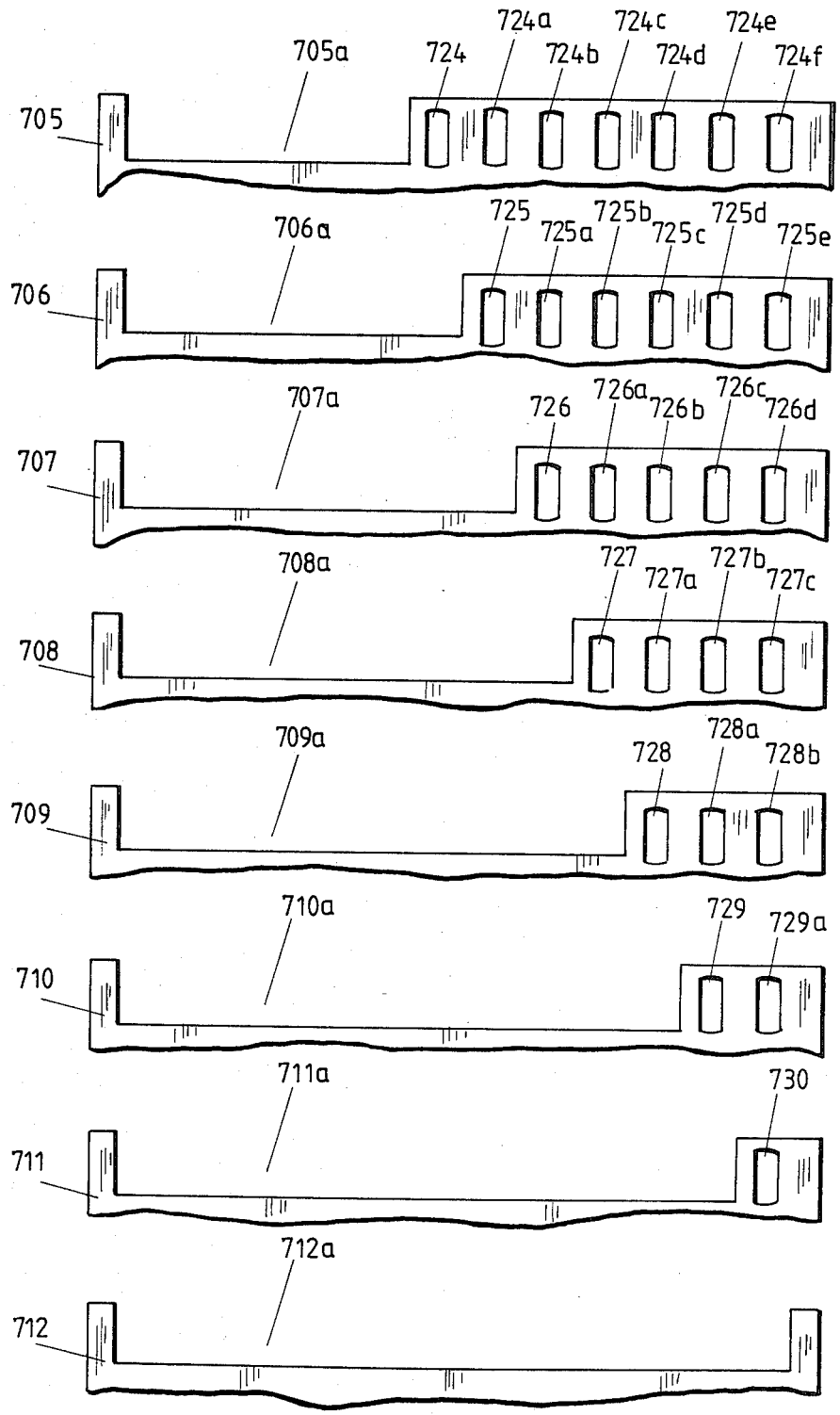

APPARATUS FOR THE STORING AND RECOVERY OF INFORMATION, SUBSCRIBER'S NUMBERS, SUBSCRIBER'S ADDRESSES, ETC.

The invention relates to an apparatus for storing and delivering information, subscriber's numbers, subscriber's addresses, etc.

The problem of the invention is to provide an apparatus permitting the storing of the names of telephone subscribers, their numbers and/or addresses, as well as short numbers, together with an automatic dialling of stored subscriber's numbers after feeding in a short number.

According to the invention, this problem is solved by a telephone register of the aforementioned type in which in a casing a register card selection and release device is provided, (a) comprising a plurality of series juxtaposed and/or superimposed selection keys combined into a keyboard and a drawer under the action of a compression spring and closable by means of a locking device with a stack of register cards housed therein, which on their back edge portions have selection tongues with openings, each selection key being fixed to a swivel arm constructed as a lever and mounted in the casing and which carries at its free end a card retaining pin directed perpendicular to the base plate of the casing bottom part, the card retaining pins being juxtaposed in two rows and being staggered relative to one another in such a way that the pins of every other swivel arm are combined into a row, whilst a resiliently mounted drawer retaining strip is arranged in the vicinity of the movement path of the card retaining pins in the rear area of the base plate of the casing bottom part, said retaining strip being in operative connection with a drawer locking device releasing the extension of the drawer under the action by the card retaining pin of a depressed selection key and the openings for the card retaining pins in the rear edge portions of the register cards extend in stepped manner and increasing in size by in each case one selection tongue carrying an opening from the lowermost register card with the first opening from right bottom to top left and the uppermost register card, each selection tongue having a number of openings corresponding to the number of openings of the selection tongues of the in each case lower register card, increased by one opening, whereby the opening by which each register card is increased compared with the openings of the selection tongues of the in each case underlying register card overhangs with respect to the card portions of the in each case underlying register cards carrying the tongue-like openings, whilst the openings in the selection tongues of the register cards are arranged in superimposed manner, the selection tongues of every other register card having a sloping portion for releasing an opening of the selection tongue of the in each case underlying register card, or (b) a plurality of series juxtaposed and superimposed selection keys combined into a keyboard and a drawer under the action of a compression spring and closable by means of a locking device having a stack of register cards arranged therein, which on their rear edge portions have selection tongues with openings, each selection key being fixed to a swivel arm constructed in a lever and mounted in the casing and which carries at its other free rear end a U-shaped card retaining pin, whereby the vertically upwardly directed bar of every card retaining pin has a cam-like projection parallel to the leg of the U-shaped portion of the card retaining pin, whereby the drawer comprising a plate-like drawer bottom with a front closing strip closing the drawer extension opening in the casing front wall when the drawer is inserted is constructed open at the back and at both sides and in its rearward edge area has a number of slot-like recesses corresponding to the number of card retaining pins and having a length corresponding to that of the U-shaped portions at the ends of the swivel lever, whilst the two lateral drawer boundary walls are formed by two boundary walls arranged on either side of the plate-like drawer bottom and shaped onto the inner wall surface of the casing cover part and whereby for guiding the swivel lever, each swivel lever is provided on the end carrying the card retaining pin with a vertically directed slot-like opening in which engages a cam shaped onto the inner wall surface of the casing cover part and is guided in the said opening, or (c) an extendable and retractable drawer arranged in the casing with a stack of register cards with selection cutouts and with a depression formed in the drawer bottom for separating the selected register card from the register cards left behind in the casing and for transferring the selected card into the extension plane by means of selection key combined into a keyboard, and with dogs, or (d) a casing with selection means, whereby the casing with a box-like base part, whose upper casing cover plate is provided with a dish-shaped depression for receiving a stack of loose register cards carrying reference numbers, is provided on the edge with register-like selection cutouts, a cover being pivotably mounted on the casing about a horizontal axis and covers the dish-shaped depression with the cards, said cover being in operative connection with two-armed selection and control levers which can be depressed by vertical push-button pressure and acting on the register cards via swivel levers having at its front free ends selection keys combined into a keyboard and at the ends opposite to the selection keys tongue-like portions, the register cards of the stack being held in lateral guides in the vicinity of the cover swivel axis, and a device for automatically dialling stored subscriber's numbers connectable to a telephone and which is provided with a subscriber's number storage unit having a keyboard and figures keys and operating keys, the keyboards of the register card selection and release device and the subscriber's number dialling device being juxtaposed or superimposed in the casing.

Such an apparatus makes it possible to store on the reigster cards of the telephone register the telephone subscribers, their subscriber's numbers and also their addresses and code numbers, so-called index numbers, in order to bring about by means of the short numbers allocated to the individual subscribers on the register cards an automatic dialling of the chosen subscriber, it then merely being necessary to feed the short numbers taken from the telephone register cards into the keyboard of the subscriber's number dialling device, following the storage of the numbers associated with the individual subscribers in said dialling device.

The particular advantage resulting from the apparatus according to the invention is the integration of a subscriber's number dialling device constructed in per se known manner into a telephone register in such a way that the latter provides the possibility of listing the subscribers with address and number, for the case that the desired subscriber is to be dialled manually. The telephone register also offers the possibility of recording the short numbers, index numbers or code numbers for the individual subscribers necessary for putting into operation the subscriber's number dialling device and that, after examining the telephone register, the short number allocated to the subscriber to be dialled is keyed into the subscriber's number dialling device bringing about the automatic dialling of the subscriber's number stored in the dialling device and associated with this particular short number, thereby establishing a connection with the desired subscriber. The casing of the apparatus constructed according to the invention can be provided with a plug in order to provide the connection between the subscriber's number dialling device and a telephone. Otherwise, there is a fixed connection between the subscriber's number dialling device and the telephone.

As a result of the construction according to the invention, the telephone subscriber is provided with a means having a simple and compact construction enabling the subscriber and owner of such an apparatus to have a plurality of storage possibilities, together with the possibility of automatic dialling.

The invention also relates to an apparatus for selecting a register card from a stack by operating a selection key and for carrying out subscriber dialling on the basis of the digits of a subscriber's number in a subscriber's line in telecommunications and particularly telephone equipment, on the basis of a two-digit code number, whereby via electrical contacts associated with the digits of the code number, a microprocessor with the associated stores is controlled, whereby the selection key selects the register card, preferably with mechanical means such as finger pressure and/or spring tension and makes said card visible e.g. by drawing out a drawer or raising a cover, an associated contact being operable by each selection key, the code numbers and optionally the digits of a subscriber's number being displayed on a display panel located alongside the selection keys, whilst further function keys are provided characterized in that alongside the selection keys there are keys for the digits of a decade, e.g. 1 to 0, and that with the contact of one of the selection keys is fed in the first code number and with the contact of one of the figures keys, the second code number is fed in and are supplied to the microprocessor in such a way that on operating one selection key automatically the associated first code number and a reference character or symbol are displayed on the display panel, and that at least one function key is provided for directly calling a stored subscriber's number and/or for direct dialling with the figures keys.

With an apparatus according to the invention, the first code number is automatically fed in when the selection key is operated in order to open out the address list for one or more specific initial letters. No further operation of the selection keys for feeding in figures is necessary, so that these keys are protected. The second code number and optionally figures of a subscriber's number are fed in by means of the figures key, thereby providing an apparatus which can be simply and reliably operated.

Further advantegeous embodiments of the invention can be gathered from the subclaims.

The subject matter of the invetion is represented in exemplified manner in the drawings, wherein show:

FIG. 1 a plan view of an apparatus comprising a register card selection and release device and a subscriber's number dialling device for storing and recovering information and the like.

FIG. 2 a side view of the register card selection and release device.

FIG. 3 the register card selection and release device in a partial view from above.

FIG. 4 the reigster card selection and release device with the cover removed in a view from above.

FIG. 5 the register card selection and release device with removed cover and partly extended drawer in a view from above.

FIG. 6 vertical section along line VI—VI of FIG. 1.

Figure 7:
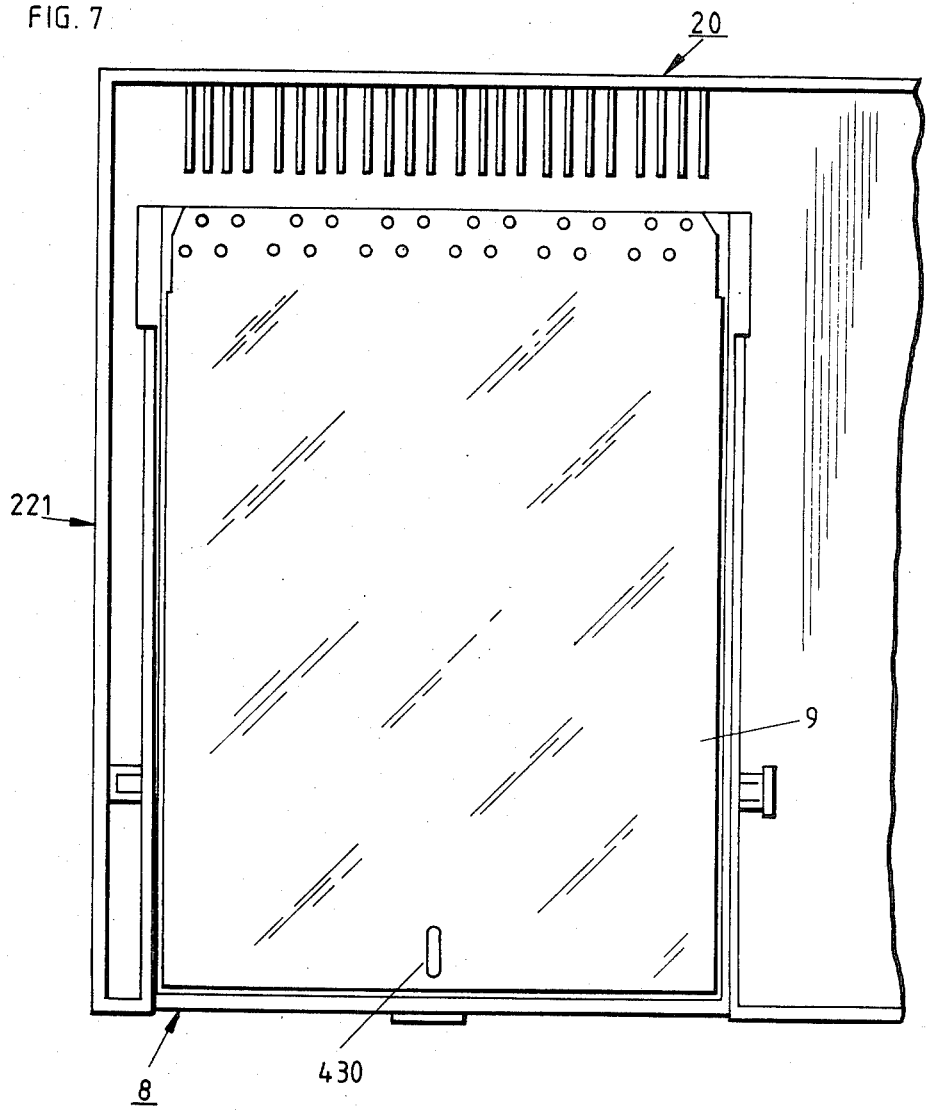

FIG. 7 a plan view of the register card selection and release device with removed cover and a stack of cards arranged in the drawer.

Figure 8:
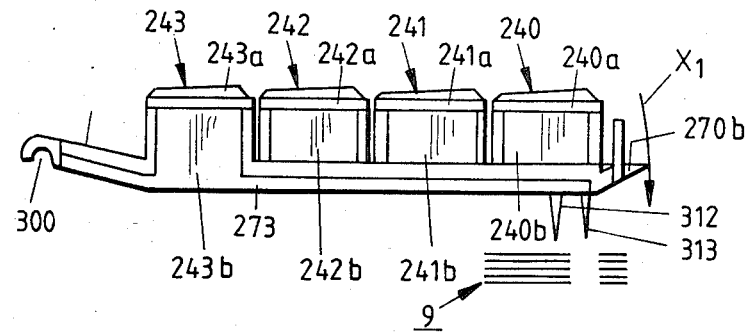

FIG. 8 four selection keys arranged in a longitudinal row with swivel arms of the register card selection and release device in a side view.

Figure 9:
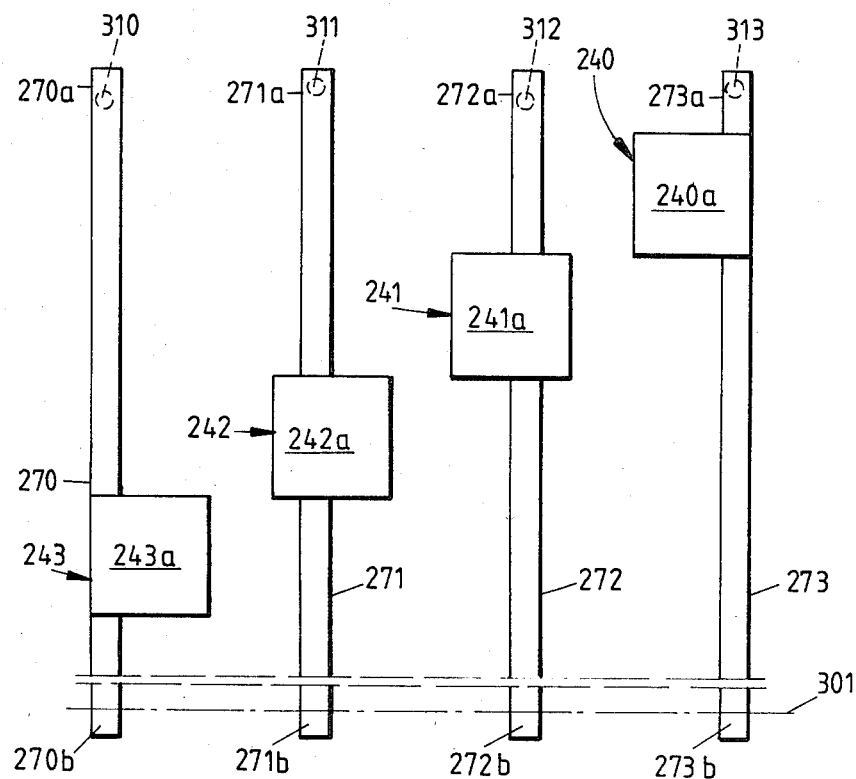

FIG. 9 the four selection keys of FIG. 8 in the drawn-apart position in a view from above.

Figure 10:
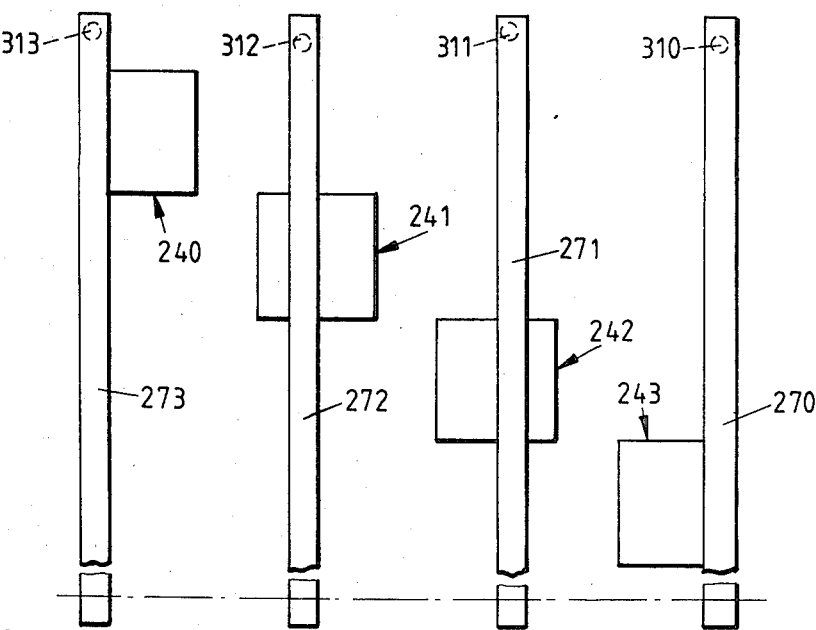

FIG. 10 a view from below of the selection keys of FIG. 9.

Figure 11:
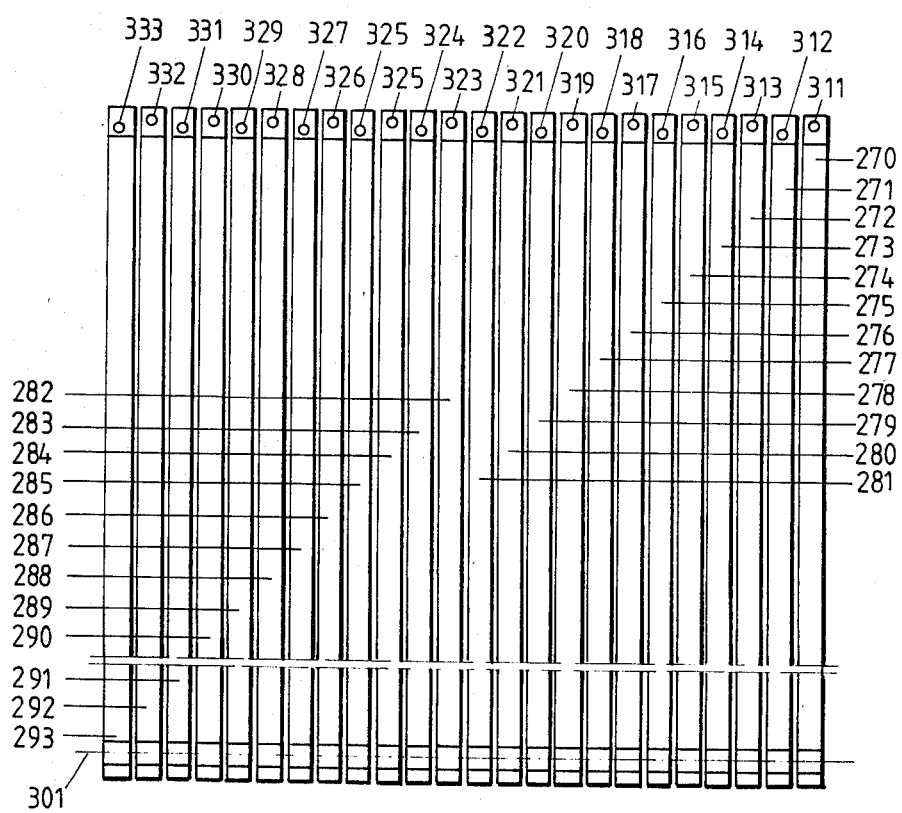

FIG. 11 the swivel arms of the selection keys in a view from below.

Figure 12:
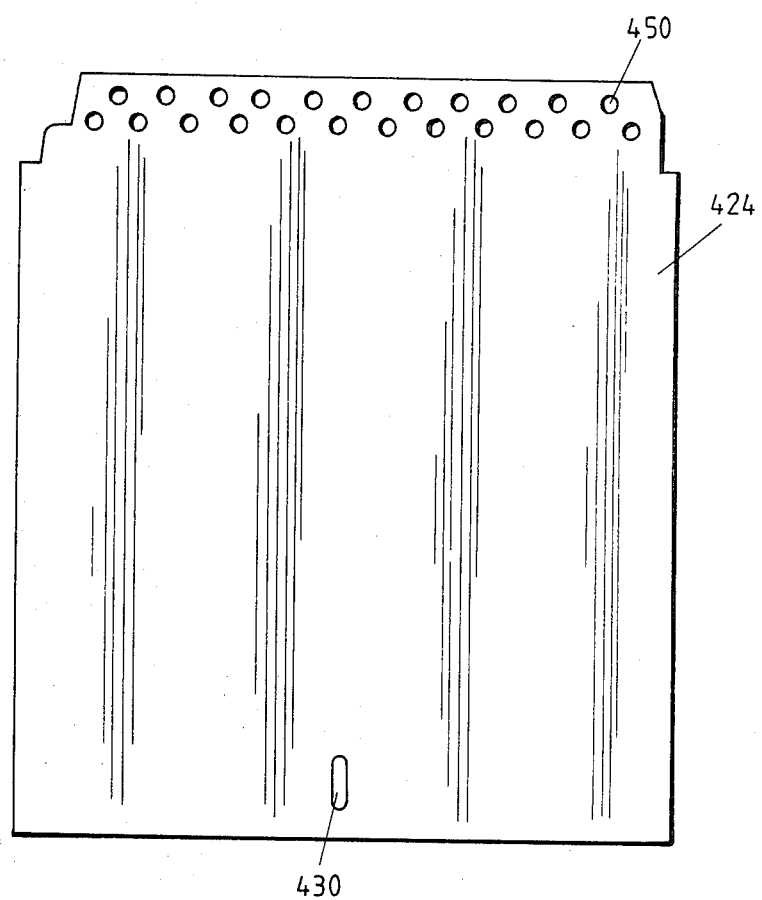

FIG. 12 a plan view of a register card.

Figure 13:
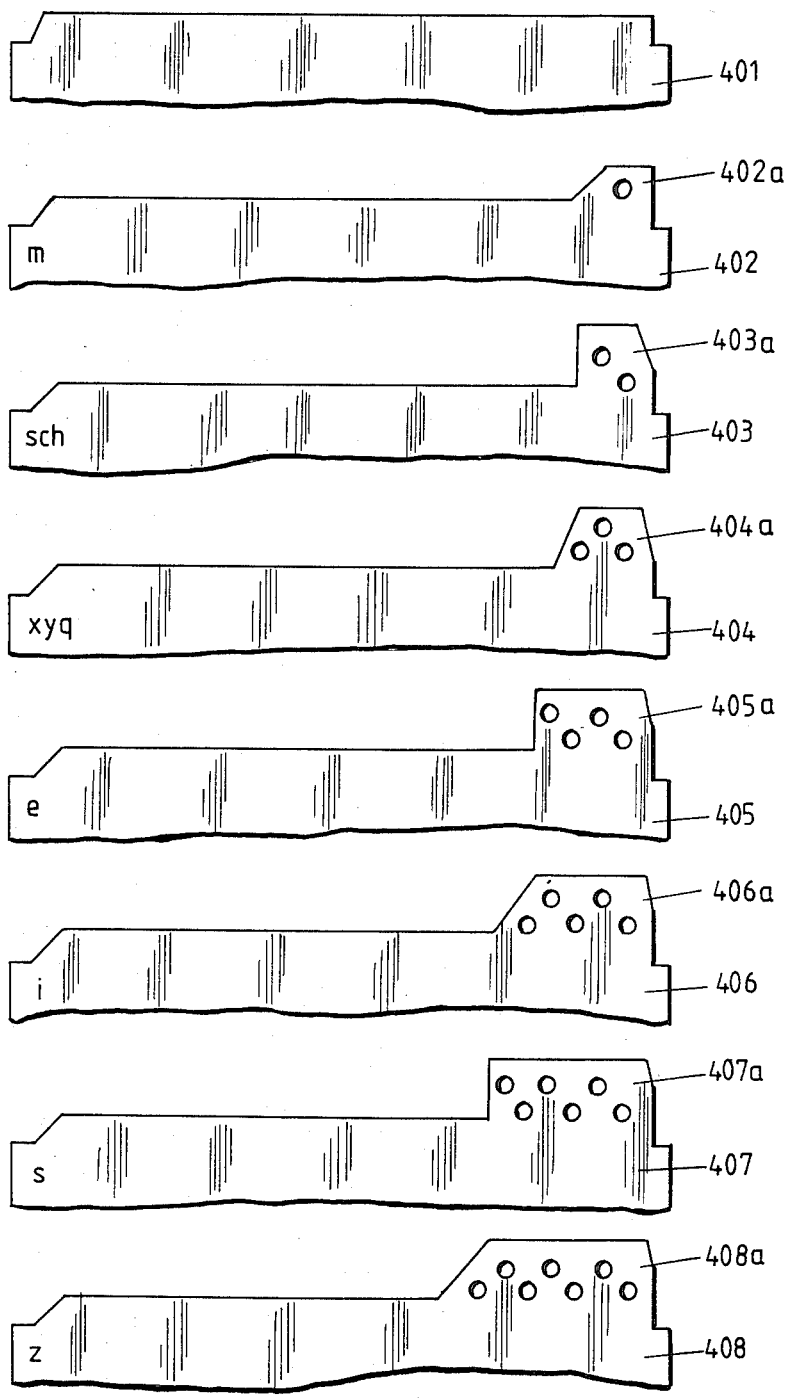
Figure 13A:
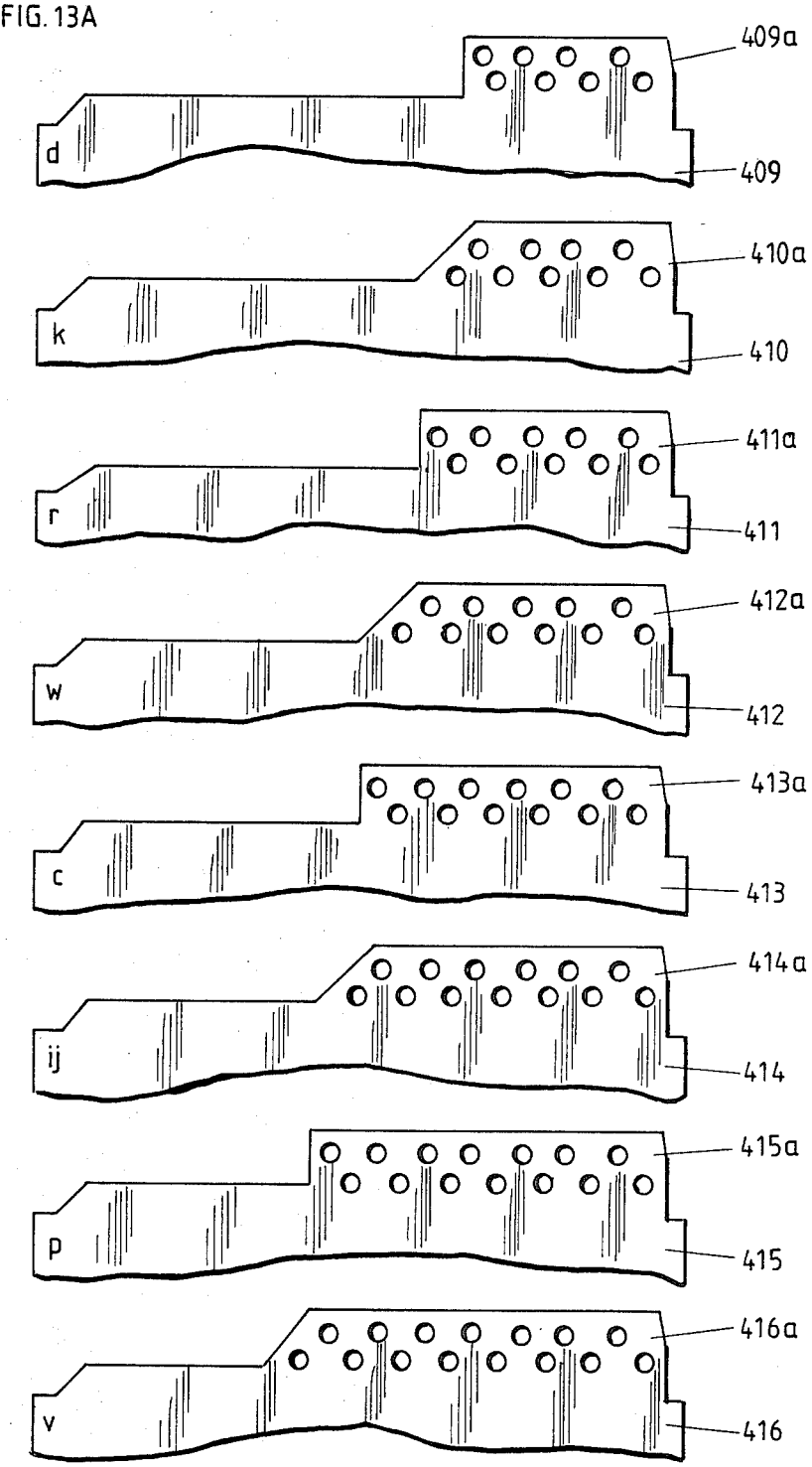
Figure 13B:
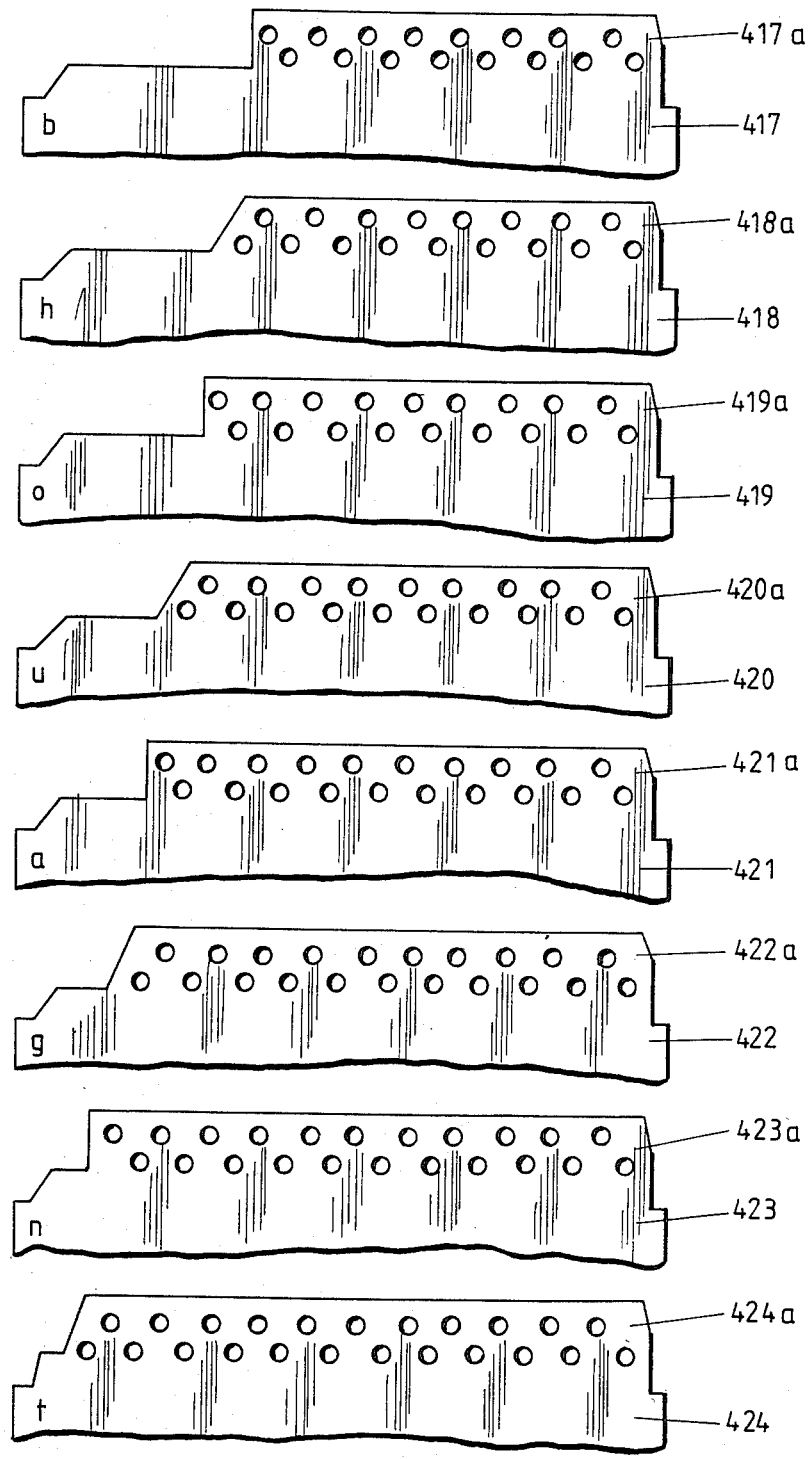

FIGS. 13,13a and 13b the front portions of the successively arranged register cards with selection tongues having openings provided in the rear area in a view from above.

FIG. 14 a view from below of the register card superimposed to form a stack with selection tongues having openings formed in the rear edge area.

FIG. 15 a plan view of the lowermost register card with an opening in the selection tongue.

FIG. 16 a plan view of the register card following the lowermost card with two openings in the selection tongue.

FIG. 17 a plan view of the two register cards of FIGS. 15 and 16 in a superimposed position.

FIG. 18 a diagrammatic exploded view of the two register cards according to FIGS. 15 and 16.

FIG. 19 a diagrammatic view of another embodiment of the register card selection and release device.

FIG. 20 a plan view of the register card selection and release device according to FIG. 19.

FIG. 21 a side view of the register card selection and release device according to FIG. 19.

Figures 22, 23:
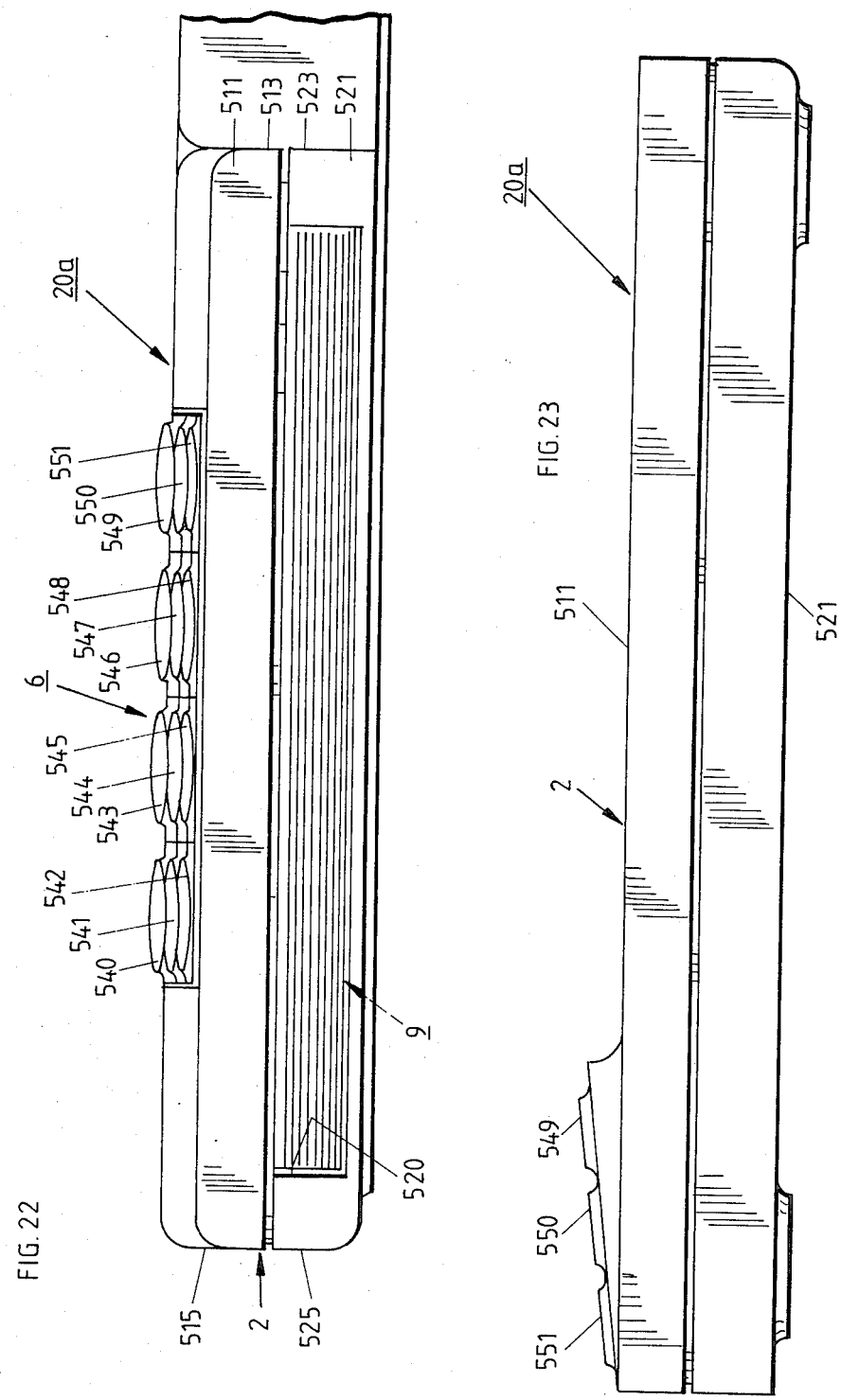

FIG. 22 a front view of the register card selection and release device according to FIG. 19.

FIG. 23 a side view of the register card selection and release device.

FIG. 24 a vertical section along line XXIV—XXIV of FIG. 19.

FIG. 25 a plan view of the register card selection and release device according to FIG. 19, but with the cover removed and the drawer inserted.

FIG. 26 a side view of the register card selection and release device drawer according to FIG. 19.

FIG. 27 a plan view of the register card selection and release device drawer according to FIG. 19.

FIG. 28 the casing cover part of the register card selection and release device of FIG. 19 in a view from the inside.

Figure 29:
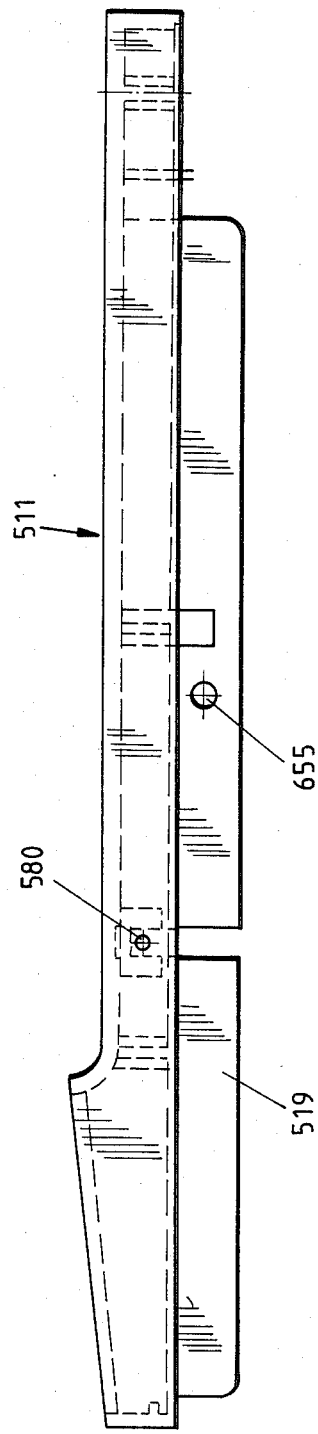

FIG. 29 the casing cover part of the register card selection and release device according to FIG. 19 in side view.

FIG. 30 a side view of the register card selection and release device stirrup actuating the drawer unlocking device.

FIG. 31 a plan view of the stirrup of FIG. 30.

Figure 32:
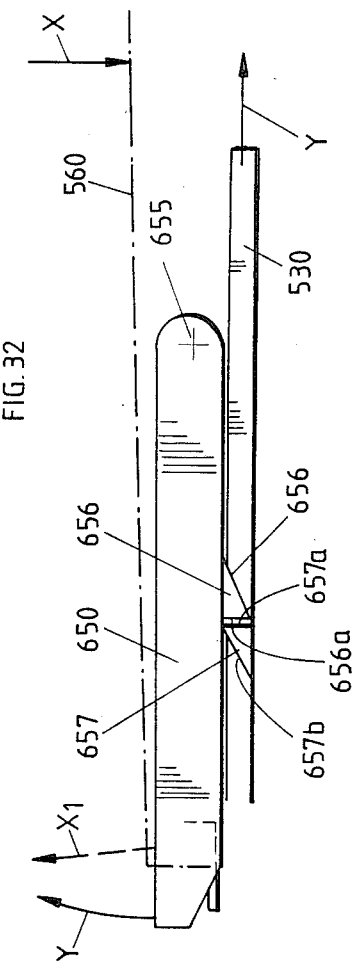

FIG. 32 the interaction between the stirrup, swivel arm and drawer in a diagrammatic side view.

Figure 33:
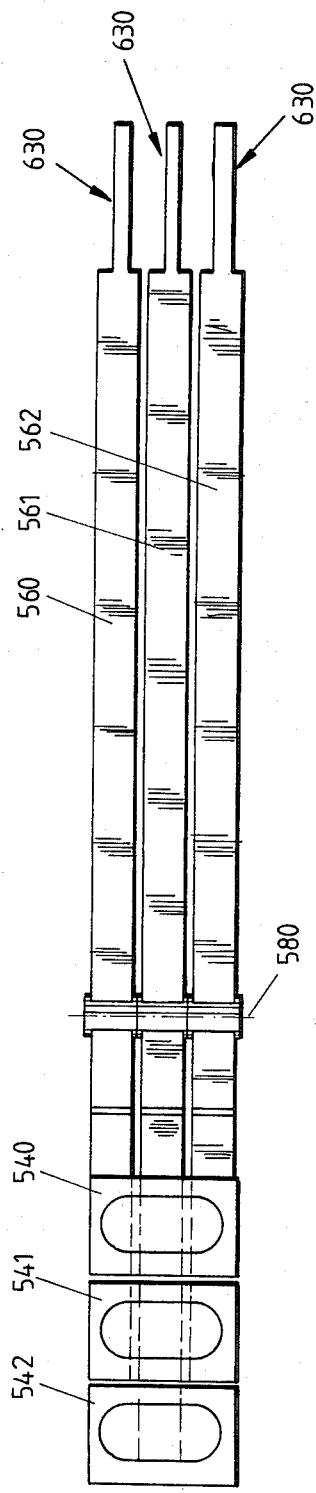

FIG. 33 a plan view of three selection keys with three swivel arms.

Figure 34:
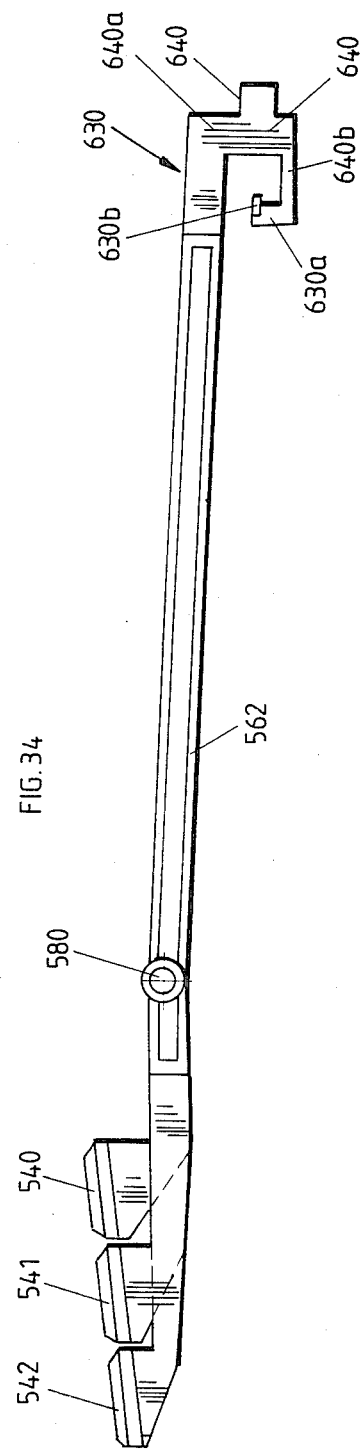

FIG. 34 a side view of the three selection keys and swivel arms of FIG. 33.

Figure 35:
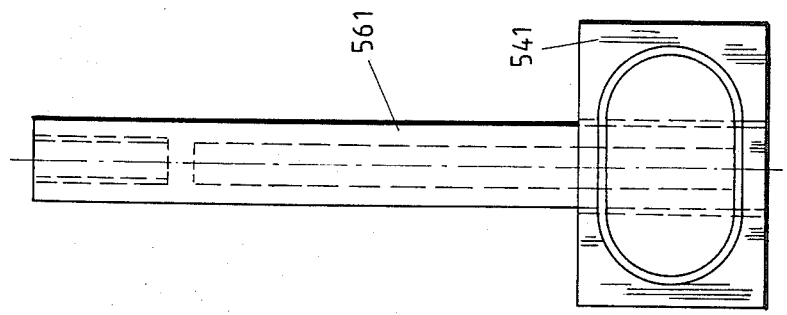

FIG. 35 a larger-scale view of the central selection key of FIG. 33.

Figure 36:
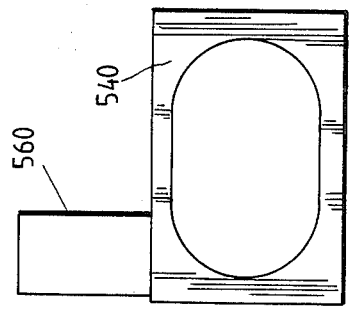

FIG. 36 a larger-scale view of the rear selection key of FIG. 33.

Figure 37:
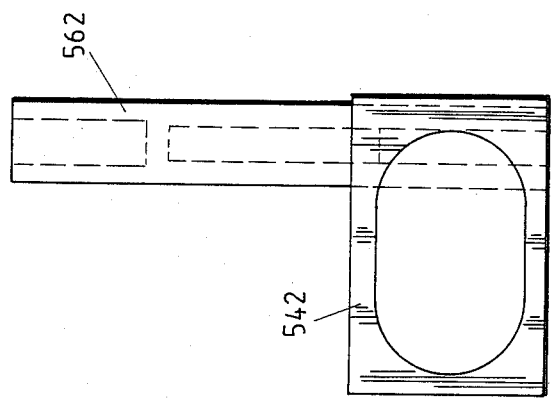

FIG. 37 a larger-scale view of the front selection key according to FIG. 33.

Figure 38:
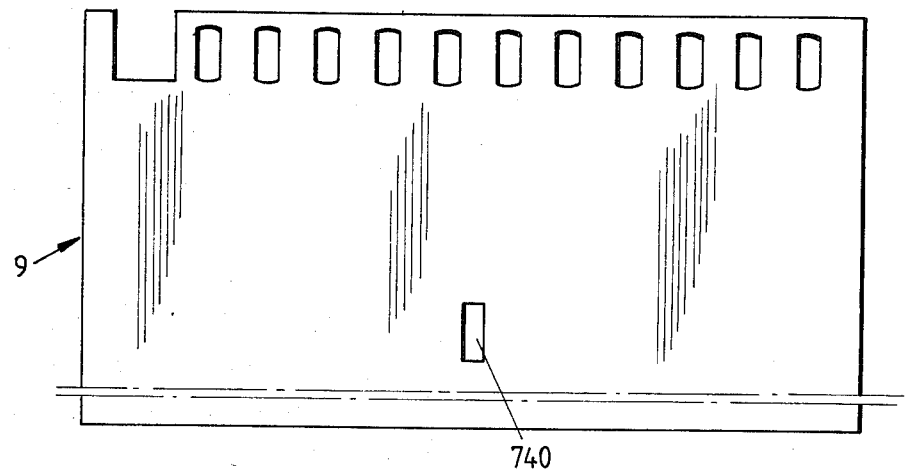

FIG. 38 a plan view of the register card stack.

Figure 39:
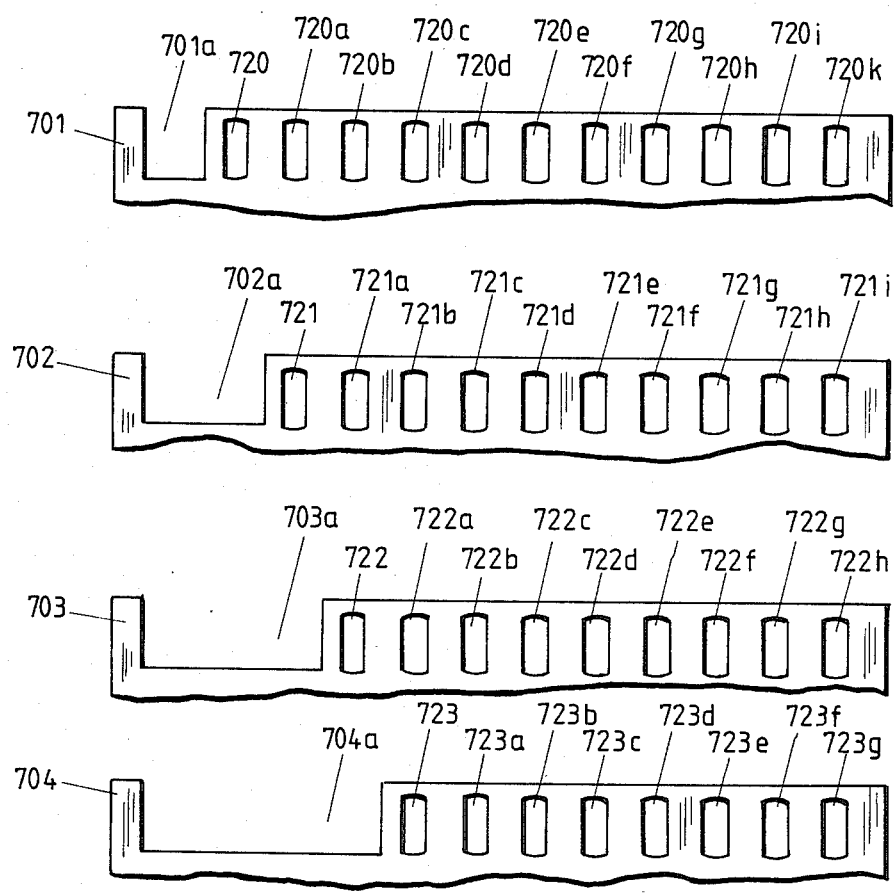

FIGS. 39 and 39a the front portions of the successively arranged register cards with openings formed in the rear area and recesses for the car retaining pins in plan view.

Figure 40:
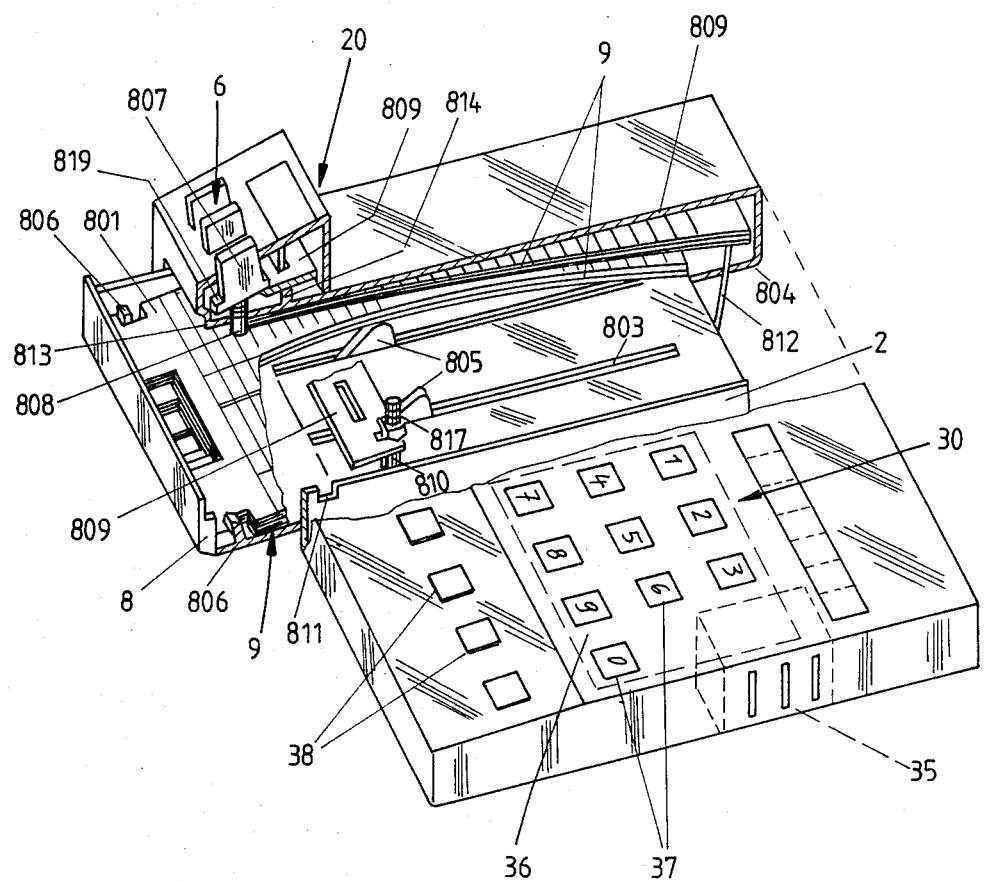

FIG. 40 another embodiment for the register card selection and release device in a diagrammatic view in a longitudinally split casing.

Figure 41:
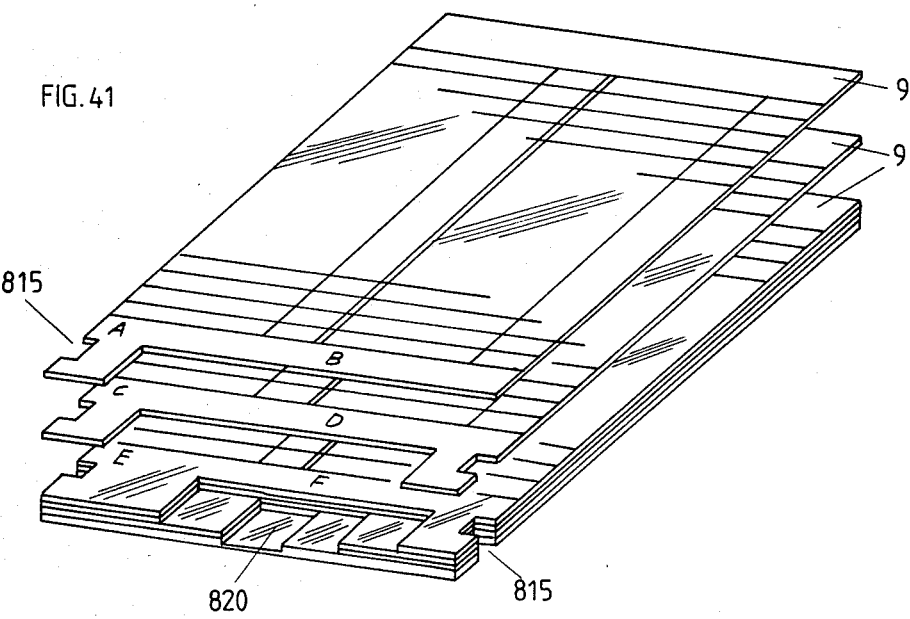

FIG. 41 the register card selection and release device of FIG. 40 in a vertical longitudinal section.

Figure 42:
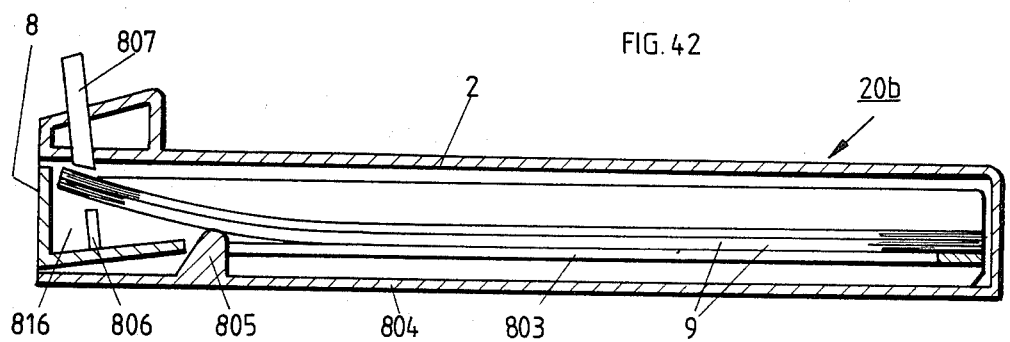

FIG. 42 the register card selection and release device of FIG. 41, but with a partly extended drawer.

Figure 43:
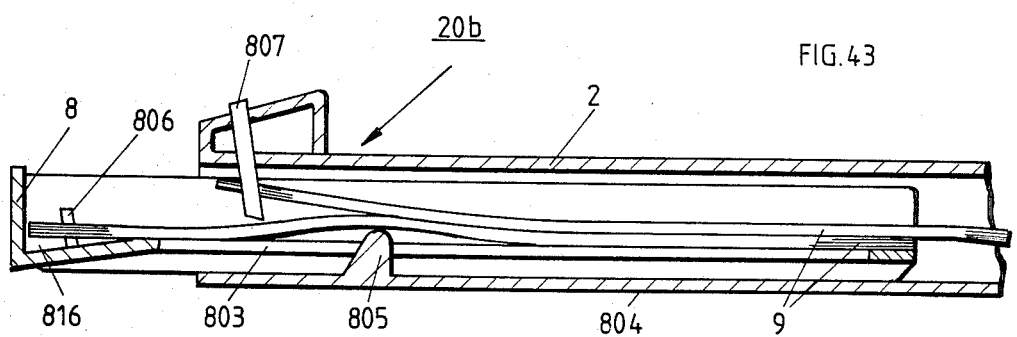

FIG. 43 a diagrammatic view of several superimposed register cards with selection cutouts provided on the front edge of the register card selection and release device of FIG. 40.

Figure 44:
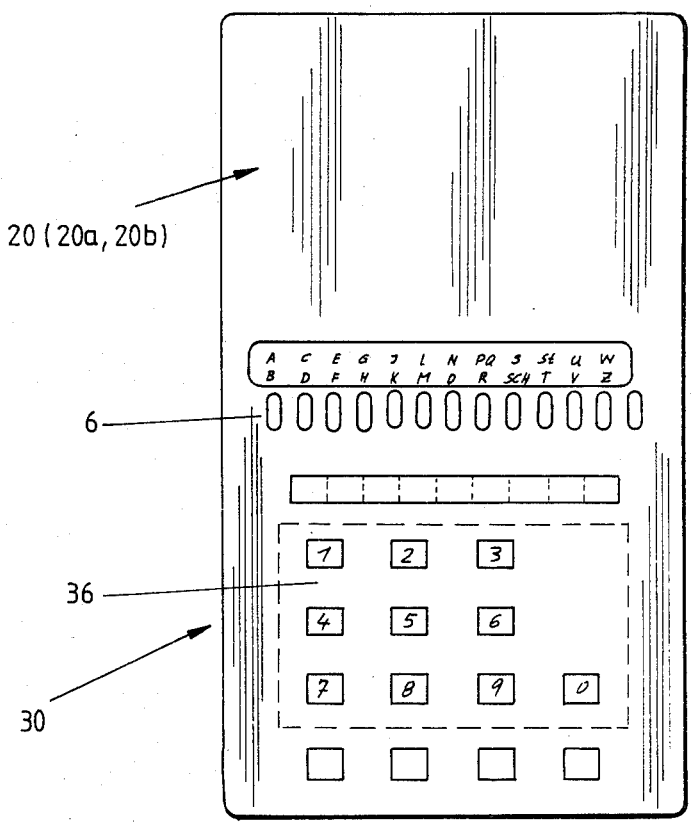

FIG. 44 a front view of another embodiment of the apparatus of FIG. 1, but with superimposed keyboards.

Figure 45:
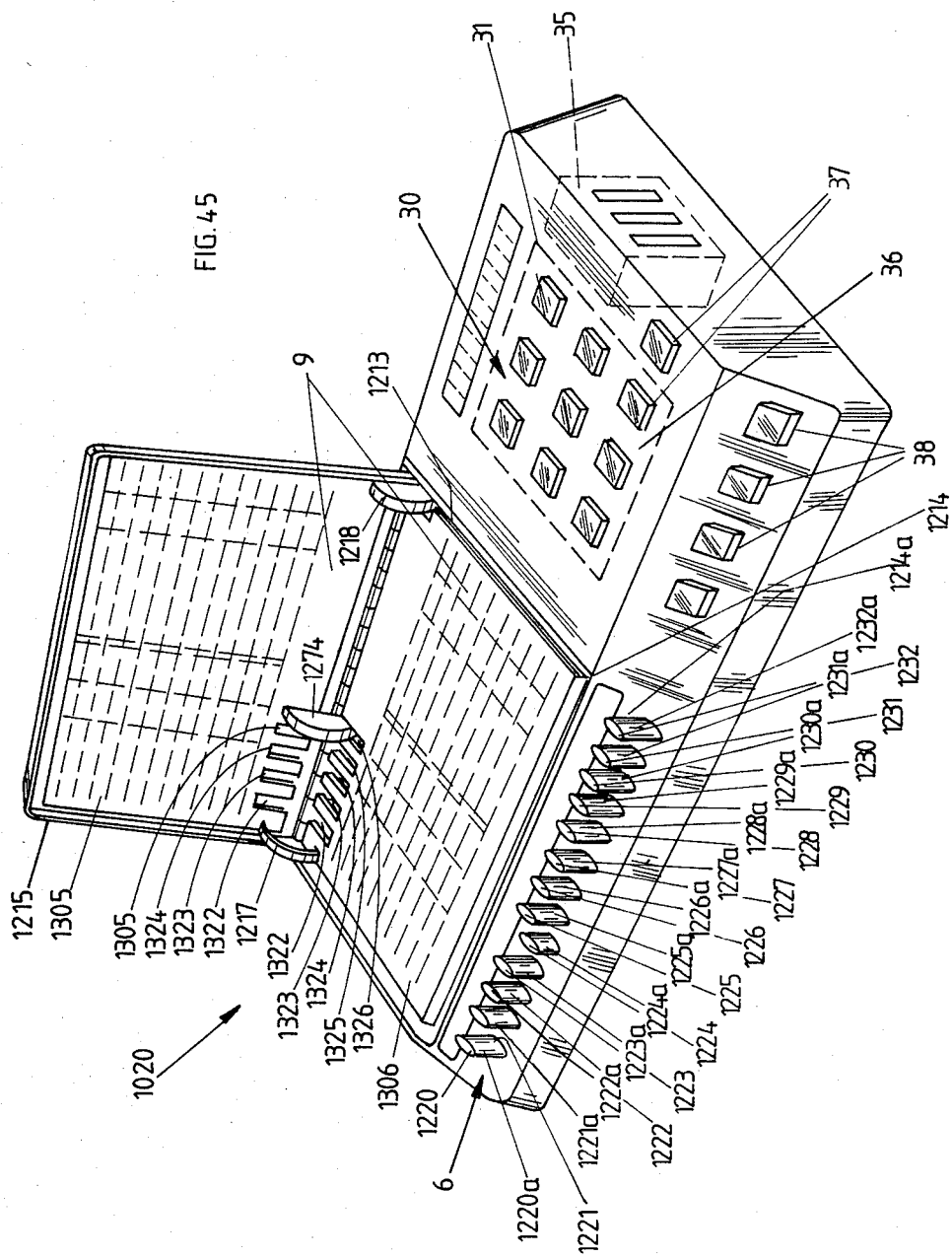

FIG. 45 a diagrammatic view of an apparatus for storing and delivering information comprising a telephone register and a subscriber's number dialing device.

Figure 46:
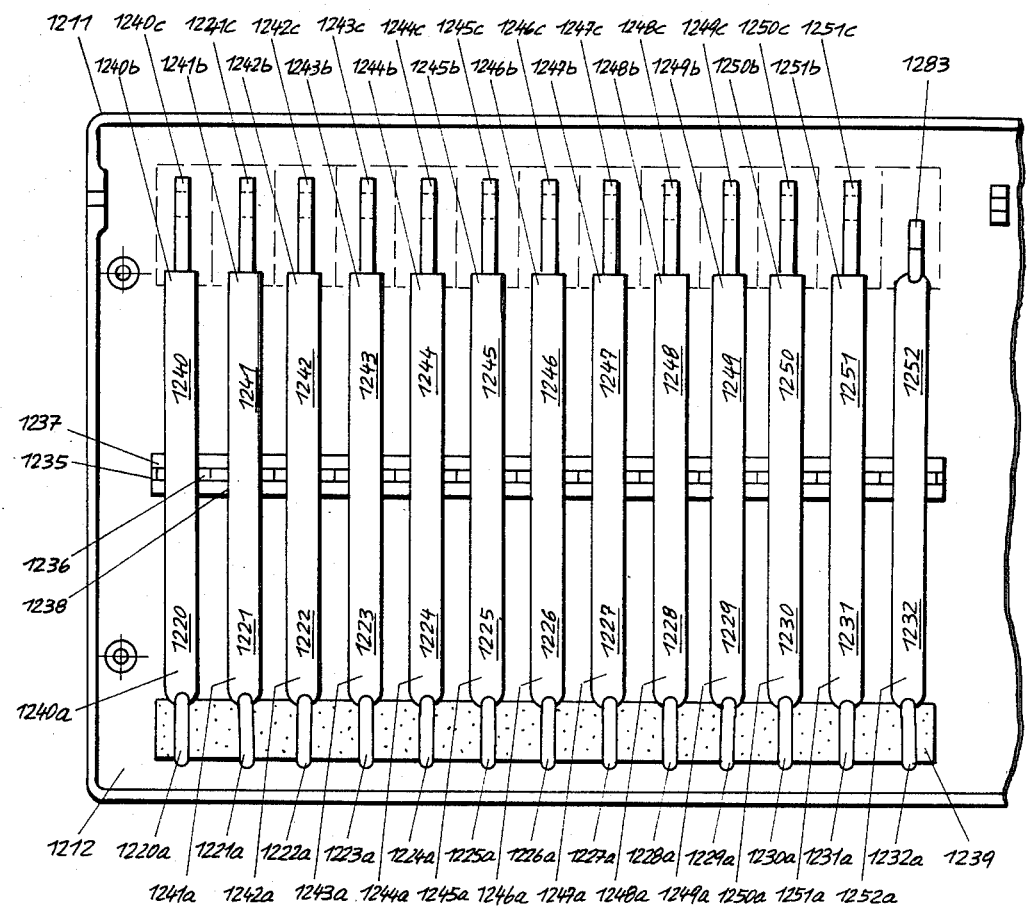

FIG. 46 the telphone register of the apparatus with a removed upper casing part in a plan view.

Figure 47:
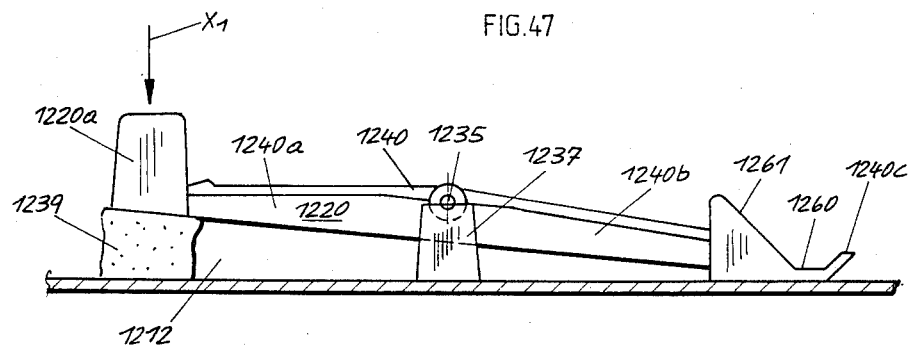

FIG. 47 a two-armed operating lever of the telephone register in side view.

Figure 48:
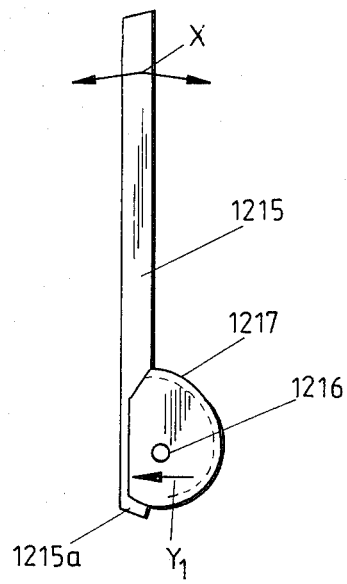

FIG. 48 a side view of the cover with lateral guides for the register cards and with the telephone register swivel pin holding the cover.

Figure 49:
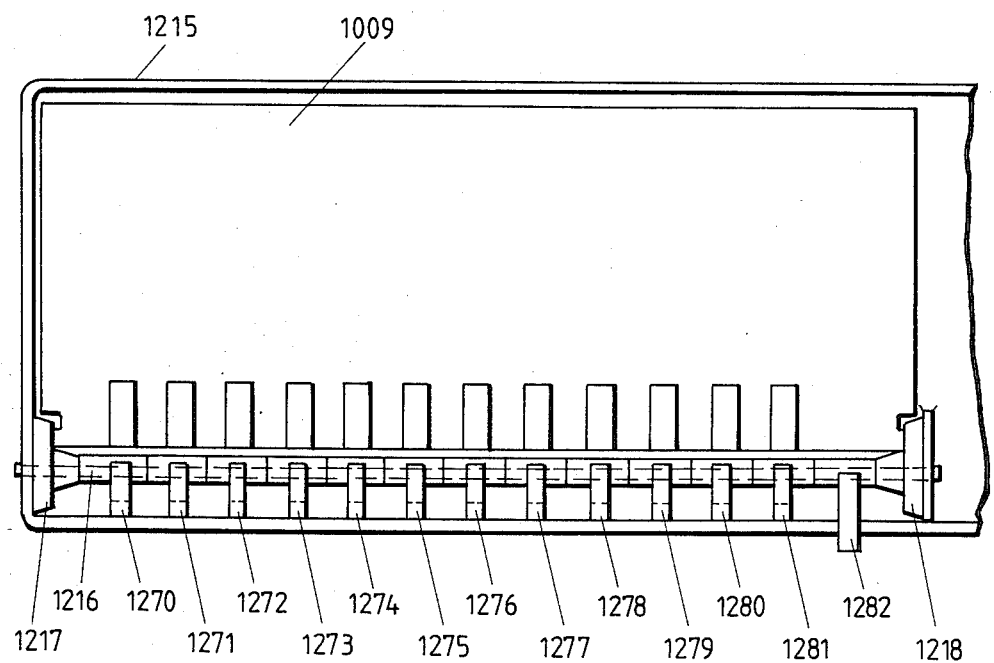

FIG. 49 the cover with the register cards of the cover swivel pin and with the pivoted lever of the telephone register pivotably mounted thereon in a view from the inside of the cover.

Figure 50:
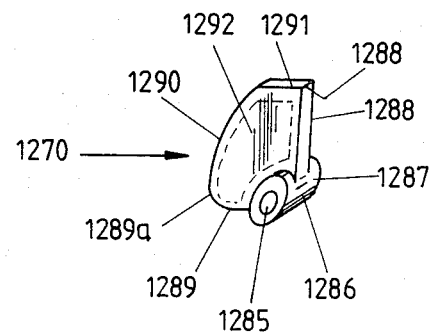

FIG. 50 a pivoted lever of the telephone register in a diagrammatic view.

Figure 51:
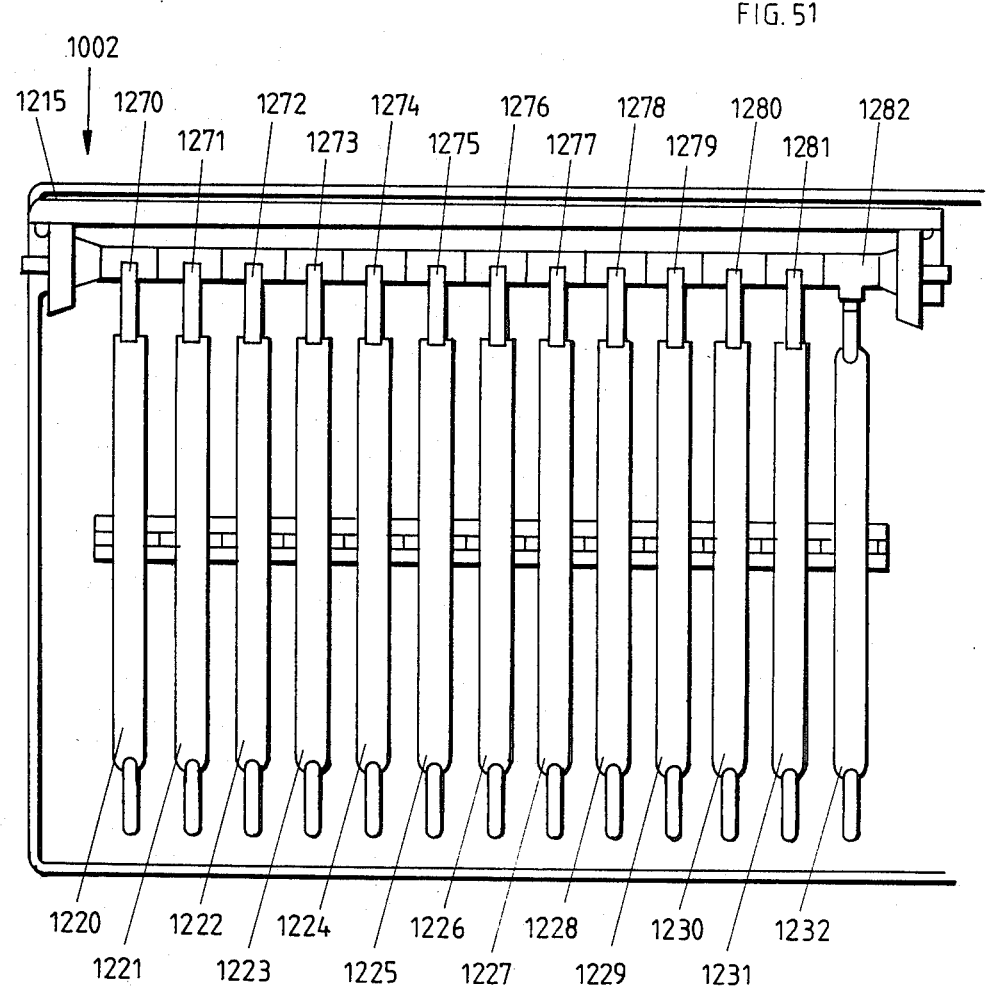

FIG. 51 the telephone register with cover raised and with a removed, upper casing cover plate in plan view.

Figure 52:
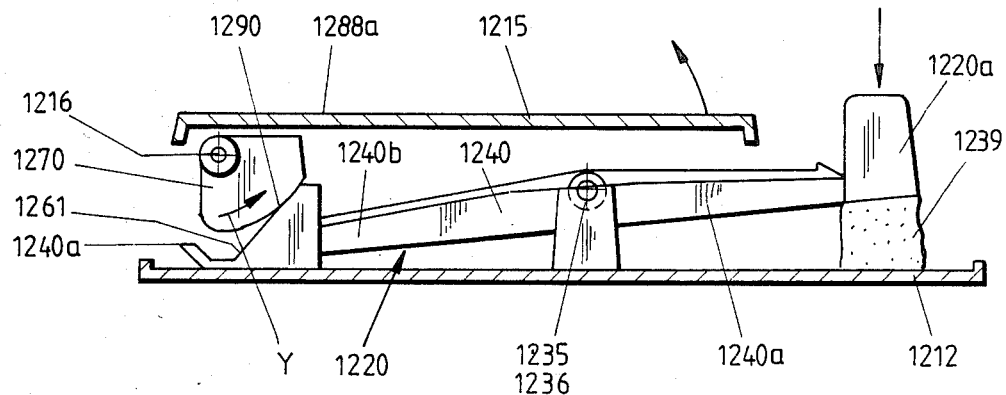
Figure 53:
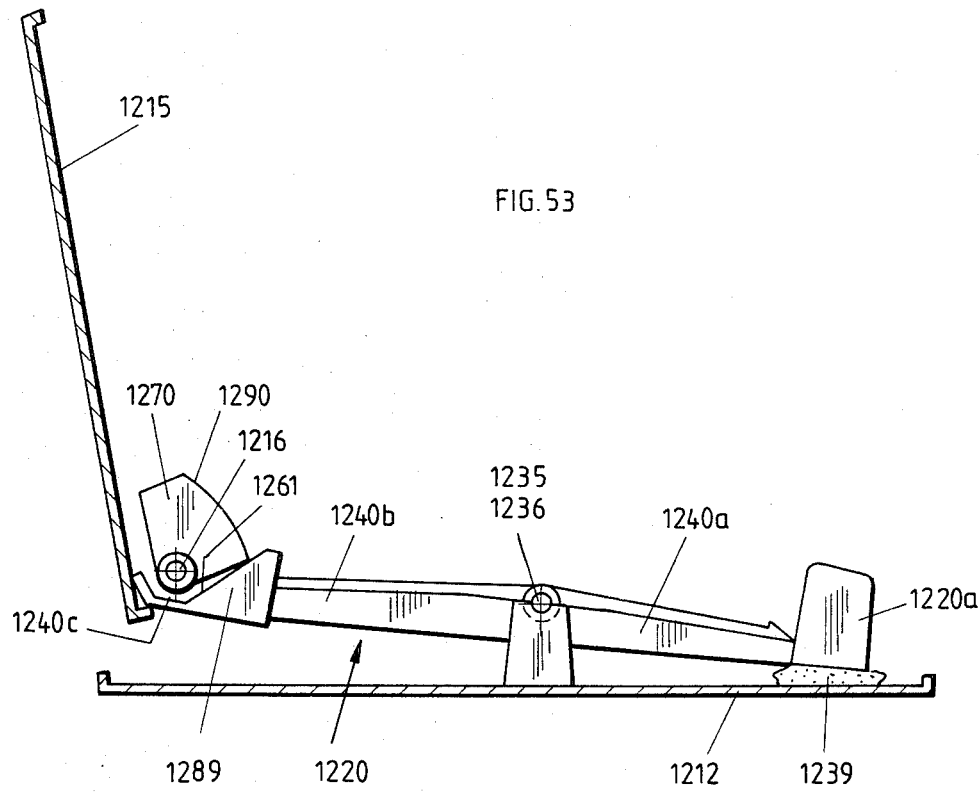

FIGS. 52 and 53 side views of the operation of a selection lever of the telephone register Cooperating with a pivoted lever, in the first case with the cover closed and in the second case with the cover opened.

Figure 54A:
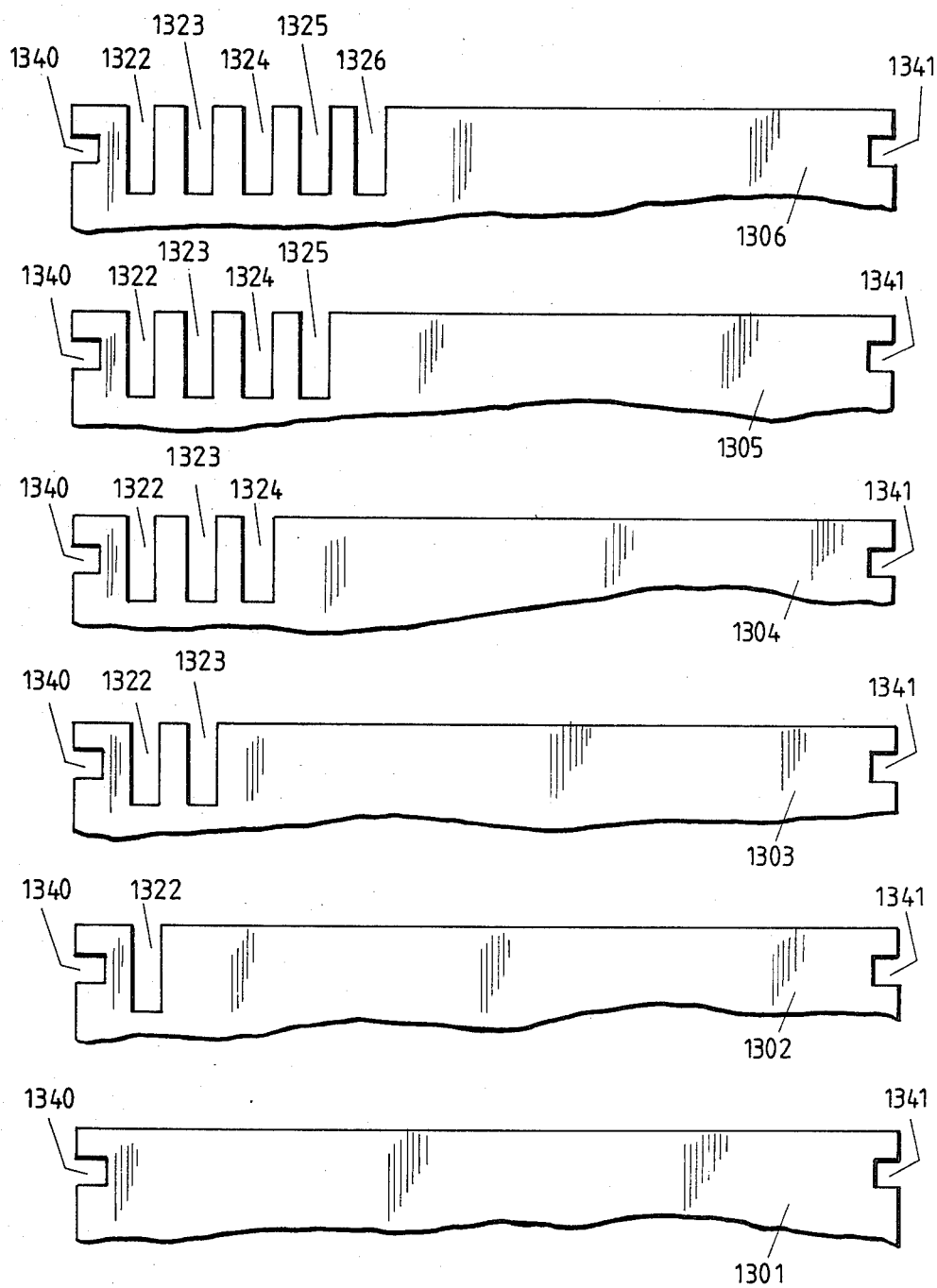
Figure 54B:
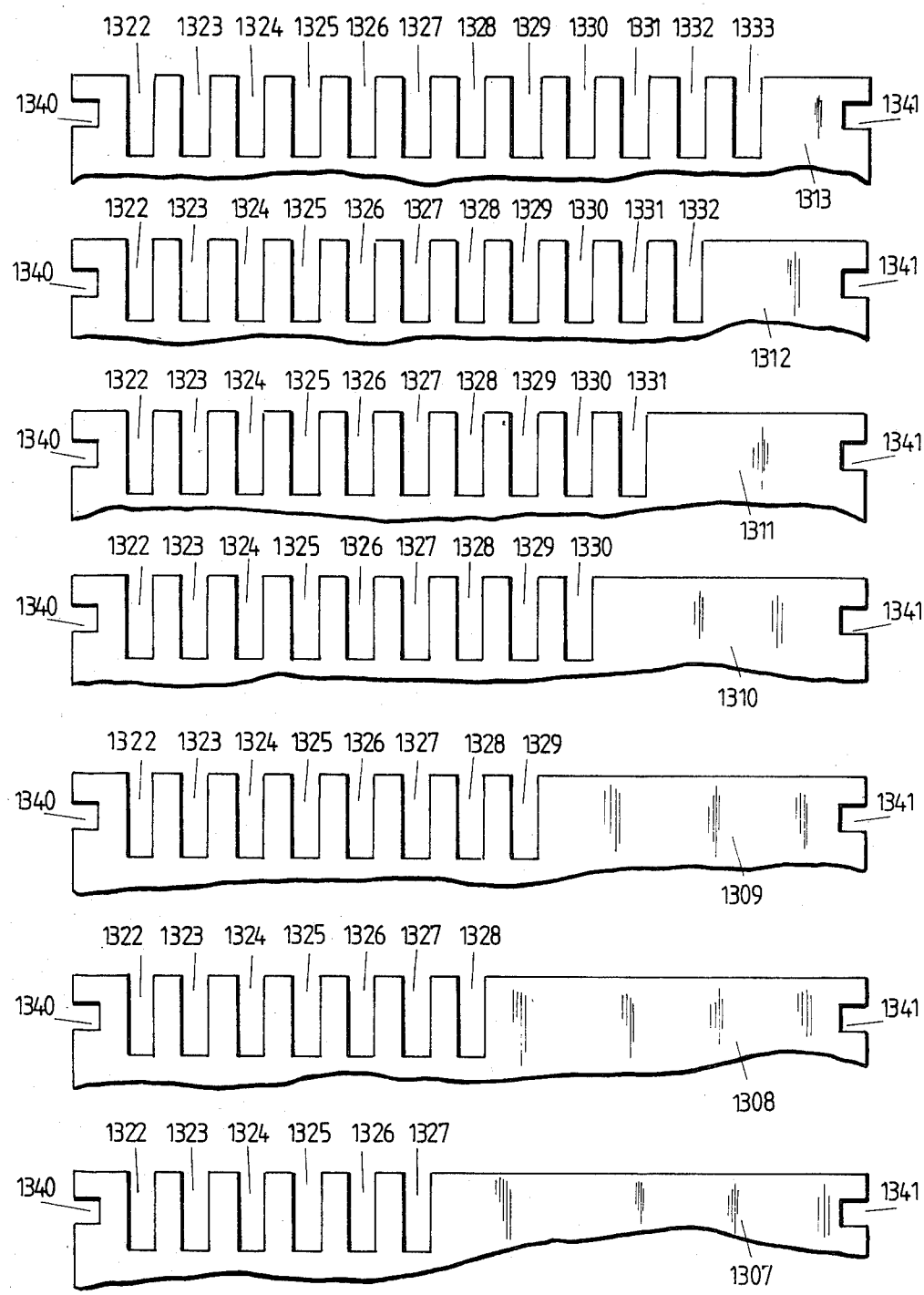

FIGS. 54a and 54b plan views of the register card portions with selection cutouts formed in the edge areas.

Figure 55:
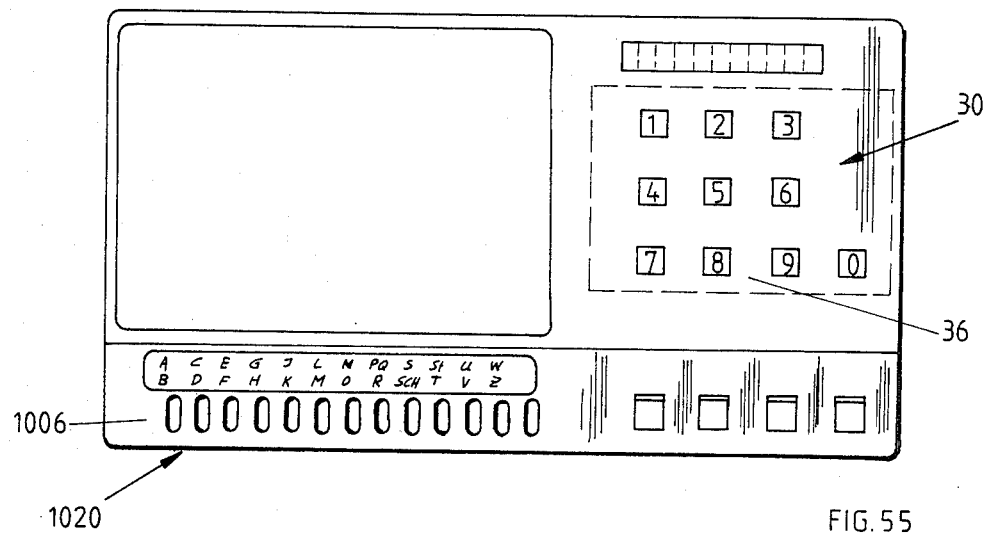

FIG. 55 a plan view of the storage and delivery or reproduction device with juxtaposed keyboards of the telephone register and the subscriber's numer dialling device.

Figure 56:
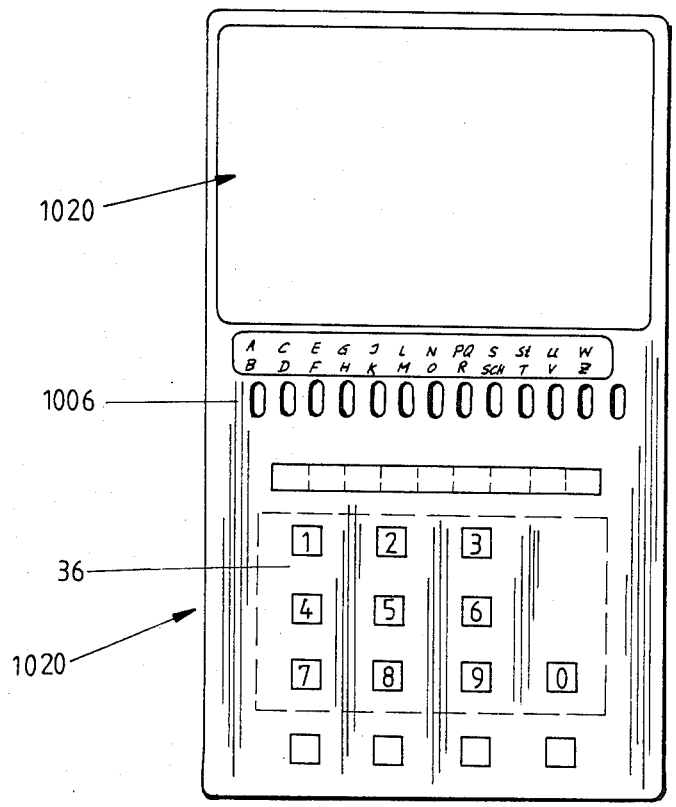

FIG. 56 another embodiment of the storage and delivery device with superimposed keyboards for the telephone register and subscriber's number dialling device in plan view.

Figure 57:
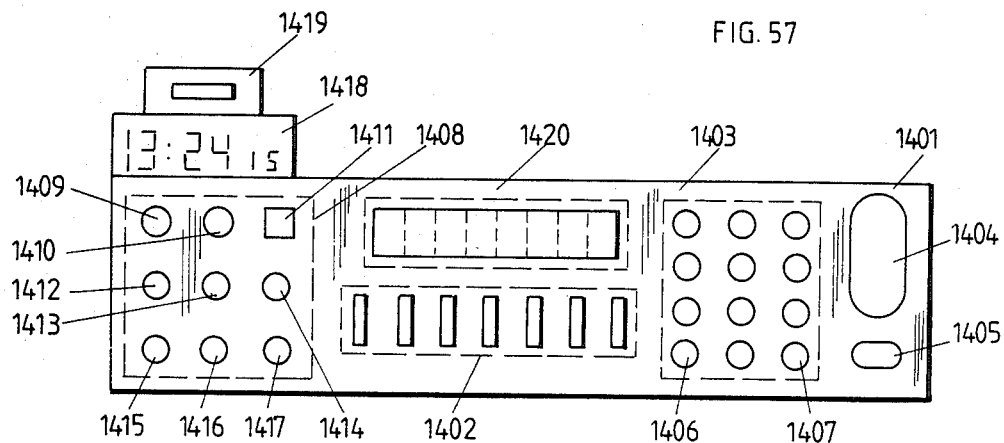

FIG. 57 the arrangement of the keys in an apparatus according to the invention.

Figure 58:
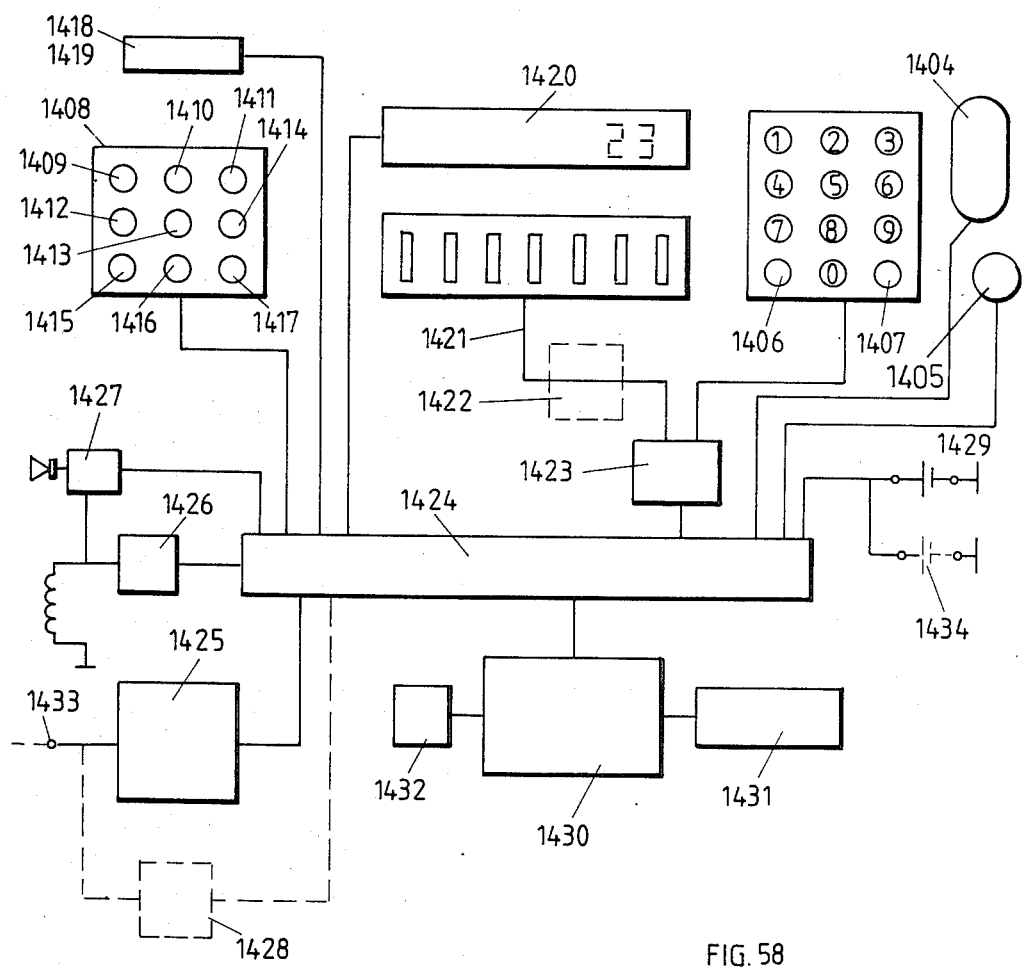

FIG. 58 symbolically in the form of a block diagram, the associated interconnection of individual information processing stages.

The apparatus for storing and delivering information, subscriber's numbers, suscriber's addresses, etc comprises in the embodiments of FIGS. 1, 19 and 40 a casing 2, in which are arranged a register card selection and release device 20, 20a, 20b and a device 30 for storing and automatically dialling subscriber's numbers constructed in per se known manner and connectable or connected to a telephone.

FIGS. 1 to 44 show three different embodiments of a register card selection and release device arranged in casing 2 and which differ as regards their construction and their operation.

The register card selection and release device 20 shown in FIGS. 1 to 5 is arranged in casing 2 with a box-like top part 211 and a box-like bottom part 221. The top part 211 and bottom part 221 of casing 2 are interconnected by means of screw or adhesive connections and are preferably made from plastics. Top part 211 has side views 213, 215, front wall 212 and rear wall 214, together with an upper cover plate 216 in which is provided an approximately square or rectangular opening 217. Portion 218 of the upper cover plate 216, facing front wall 212 of top part 211 is bevelled in a slightly desk-shaped or console-shaped manner and can be provided with a not shown, dish-shaped depression for receiving writing implements.

Bottom part 221 has side walls 223, 224, front wall 222 and rear wall 225, together with a bottom plate 226 and slot-like openings 227 in front wall 222 for receiving a drawer of a register card selection and release device 20. Bottom part 221 also has guide rails 229, 229a running in spaced parallel manner to side walls 223,224. In the rear area of bottom part 221, adjacent to guide rails 229, 229a, there are angularly constructed retaining strips 219, 219a in the advance area of drawer 8 and these zonally overlap a stack 9 of cards in drawer 8 and keeps said cards at the desired height and prevent the removal or raising thereof (FIGS. 5 and 6).

The bottom part 221 of casing 2 receives drawer 8 comprising a bottom plate 231 with side walls 232,233 and a front wall 234 which frontally interconnects the side walls, so that drawer 8 is open at the back.

However, it is also possible to guide the drawer 8 in the bottom part in some other way. Thus, bottom plate 231 of drawer 8 can be provided with a web engaging in a slot in the bottom plate of bottom part 221.

A dovetail-like profiling prevents an unintended raising of drawer 8 from the bottom part. At the front and bottom, bottom plate 231 of drawer 8 carries a cam 235 which, on inserting the drawer into casing 2, engages in a slot-like recess 228 in bottom plate 226 of bottom part 221. A steel spring bar 236 is arranged in the vicinity of this slot-like recess 228, which extends from the leading edge of bottom plate 226 of bottom part 221 and is located centrally in plate 226 in such a way that its free end 236a comes to rest in the vicinity of recess 228, whilst the other end 236b of the steel spring 236 is fixed to bottom plate 226 of bottom part 221. The action of the steel spring 236 corresponds to that of a thrust spring, which is tensioned on inserting drawer 8 into bottom part 221 of casing 2, so that on unlocking drawer 8 it is extended by means of the steel spring bar which springs back into its initial position (FIG. 5).

In addition, in the rear part of bottom plate 231 of drawer 8 is provided a centrally shaped ring 237, which forms part of the drawer locking device 370, which will be described in greater detail hereinafter. In the rear part of its side walls 232, 233, drawer 8 also has guide abutments 238, 238a, which are shaped onto the upper edges of side walls 232, 233 and project laterally, so that they overlap the guide rails 229, 229a shaped onto bottom plate 226 of bottom part 221. These guide abutments 238, 238a simultaneously limit the extension of drawer 8 (FIGS. 4 and 5). Resilient buffer members made from felt or the like 239, 239a on the inner faces of the two parts of front wall 222 on either side of opening 227 of bottom part 221 and in the movement path of guide abutments 238, 238a also serve to limit the movement of the drawer. It is also possible to limit the extension length of drawer 8 by differently constructed means.

In the vicinity of opening 217 in the upper cover plate 216 of the part 211 of casing 2 is provided a plurality of selection keys, combined into a keyboard 6 and which have a square or rectangular shape, being arranged in such a way that the complete surface formed by the selection keys fills opening 217 in top part 211.

In the embodiment of the register card selection and release device shown in FIG. 1, there are 24 selection keys 240,241,242,243,244,245,246,247,248,249,250,251,252,253,254,255,256,257,258,259,260,261,262,263, which are correspondingly marked with the letters of the alphabet.

Selection keys 240 to 263 are provided with a corresponding number of one-armed swivel arms 270,271,272,273,274,275,276,277,278,279,280,281,282,283,284,285,286,287,288,289,290,291,292,293, whose ends 270a,271a,272a,273a,274a,275a,276a,277a,278a,279a,280a,281a,282a,283a,284a,285a,286a,287a,288a,289a,290a,291a,292a,293a, have openings 300 (FIG. 8) for the passage of the supporting member 301, which serves as a swivel pin and whose ends 301a,301b are held in bearing rods 302,303 above drawer 8 in the front area of casing 2 located on either side of drawer 8 on bottom plate 226 of bottom part 221 and which are perpendicular to said plate 226. Swivel arms 270 to 293 are individually pivotably mounted on the supporting member 301, which is arranged in such a way that it is possible at all times to remove it together with the swivel arms 270 to 293. The guide rails 229,229a provided in bottom part 221 and which run in the longitudinal direction of the drawer, simultaneously serve as guides on extending drawer 8 or to ensure its completely satisfactory insertion into casing 2.

The free ends 270b,271b,272b,273b,274b,275b,276b,277b,278b,279b,280b,281b,282b,283b,284b,285b,286b,287b,288b,289b,290b,291b,292b,293b, of swivel arms 270 to 293 carry on their undersides card retaining pins 310,311,312,313,314,315,316,317,318,319,320,321,322,323,324,325,326,327,328,329,330,331,332,333 and further details will be given hereinafter of the arrangement thereof.

The selection keys 240 to 263 are arranged in such a way that in each case six keys are combined into a transverse row, so that four rows A,B,C,D are formed, together with six longitudinal rows a,b,c,d,e,f, as can be gathered from FIG. 1. Through arranging selection keys 240 to 263 in rows, they take up a smaller area, so that the complete apparatus can be kept very small. The opening 217 in the upper cover plate 216 on cover part 211 is dimensioned to the area taken up by keyboard 6. Due to the fact that the swivel arms 270 to 293 are closely juxtaposed in casing 1, the following construction and arrangement of the selection keys is adopted, of FIGS. 8 to 10, with four deys 240,241,242,243 arranged in longitudinal row a. Like the remaining selection keys 244 to 263, keys 240 to 243 comprise plate-like blanks 240a,241a,242a,243a, connected to swivel arms 270,271,272,273 by means of webs 240b,241b,242b,243b. Keys 240,241,243,243 are arranged in such a way that the plate-like blank 240a of selection key 240 is arranged in leftward projecting manner on swivel arm 273 and the plate-like blank 243a of selection key 243 is arranged in rightward projecting manner on swivel arm 270, blank 240a being fixed to the rearward end of swivel arm 273, whilst blank 243a is fixed to that end of swivel arm 270 which faces supporting member 302 (FIGS. 9 and 10). The plate-like blanks 241a,242a of the selection keys 241,242 between the two keys 240 and 243, are connected to the swivel 273,271 in such a way that the plate-like blanks 241a,242a project to either side, but with different lengths. The projecting portion of the plate-like blank 240a of selection key 240 has a width corresponding to the width of three swivel arms 273,272,271. In the same way, the projecting portion of the plate-like blank 243a of selection key 243 has a width corresponding to the width of three swivel arms 271,272,273. The plate-like blank 241a is fixed to the swivel arm 272 in such a way that the plate-like blank 241a projects by the width of arm 273 in the direction of key 240, whilst the portion of the plate-like blank 241a of selection key 241 facing key 242 has a width corresponding to that of swivel arms 271,270. Selection key 242 is fixed to swivel arm 272 in the same way as key 241. The portion of the plate-like blank 242a of selection key 242 facing key 241 has a width corresponding to that of the two swivel arms 272,273, whilst the projecting portion of the plate-like blank 242a facing key 243 has a width corresponding to that of swivel arm 270. As a result of this construction, it is possible to arrange in series in each case four selection keys 240 to 243, because each plate-like blank 240a to 243a of keys 240 to 243 is made with such a width that it corresponds to the width of four swivel arms 273,272,271,270. The selection keys of longitudinal rows b,c,d,e,f are constructed in the same way and are fixed in the same way to their swivel arms, so that a plurality of selection keys can be housed in a very small space.

As shown in FIG. 11, the card retaining pins 310 to 333 arranged on the free ends 270b to 293b of swivel arms 270 to 293 are in two rows, in such a way that the pins of every other swivel arm are combined into rows, so that card retaining pins 311,313,315,317,319,321,323,325,327,329,331 and 333 form a row, whilst pins 310,312,314,316,318,320,322,324,326,328,330 and 332 form another row, so that each row of pins consists of 12 individual pins. The card retaining pins 310 to 333 located on the bottoms of swivel arms 270 to 283 are made from metallic materials, but it is also possible to make them from plastic. In addition, it is also possible to construct the swivel arms and the card retaining pins in one piece.

The free ends 270b to 293b of swivel arms 270 to 293 are supported on resilient tongues 340,341,342,343,345,346,347,348,349,350,351,352,353,354,355,356,357,358,359,360,361,362,363 which are shaped onto the rear wall 225 of bottom part 221 in such a way that the arms 270 to 293 assume a position in which the free ends of the card retaining pins 310 to 333 are positioned above card stack 9 (FIG. 6). In order to be able to lock drawer 8 in casing 2 in the inserted state, a drawer locking device 370 is provided, whereof one part forms the ring 237 on base plate 231 of drawer 8, whilst the orther part of device 370 comprises a drawer retaining strip 371 which, in the vicinity of bottom plate 226 of bottom part 221, is pivotably mounted about a horizontal axis 372 in such a way that the front portion 371a of drawer retaining strip 371 can be pivoted in the direction of arrow X against a resilient member 373 and can be returned from the latter into its initial position (FIG. 6). The resilient member 373 can be in the form of a spring, a foam rubber cushion, etc. The drawer retaining strip 371 is preferably spring-loaded. As can be gathered from FIG. 6, the drawer retaining strip is arranged in the vicinity of a recess 226a in bottom plate 226 of bottom part 221 and has a length corresponding to the width of drawer 8 or the width of the swivel arms 270 to 293 carrying the card retaining pins 310 to 333, so that on operating one of the selction keys 240 to 263, the pin moved downwards by means of the corresponding swivel arm strikes the drawer retaining strip 371 and presses the latter with its front area 371a into recess 226a of bottom plate 226 of bottom part 221.

Centrally and in the movement path of ring 237, the drawer retaining strip 371 on drawer 8 has a trough-shaped depression 374, in the vicinity of which a vertically positioned cam 375 is shaped onto strip 371, which is made from a plastics material in the same way as casing 2. The overall arrangement is such that on inserting drawer 8 into the bottom area 221 of casing 2, ring 237 on drawer 8 engages round cam 375, whilst the drawer retaining strip 371 assumes an approximately horizontal position or a position in which the front portion 371a of drawer retaining strip 371 assumes an upper position. This upper position of the rearwardly fitted drawer retaining strip 371 occurs if the front area 371a of strip 371 is located above opening 226a in bottom plate 226 of bottom part 221. The drawer retaining strip 371 is arranged in the vicinity of the movement path of the card retaining pins 310 to 333. If a selection key is operated, this leads to a pivoting of the swivel arm connected to this key in such a way that the free end of the swivel arm carrying the pin is moved downwards in the direction of arrow X1 (FIG. 8), so that the corresponding pin strikes against the front area 371a of retaining strip 371 and forces the front portion of the latter into recess 226a in bottom plate 226 of bottom part 221. The resilient member 375 is thereby compressed and held under tension. At the instant in which the card retaining pin forces the front portion 371a of the drawer retaining strip 371 into opening 226a of bottom plate 226 of bottom part 221, drawer 8 is unlocked to the extent that cam 375 is swivelled out of the ring 237 fixed to drawer 8. As drawer 8 is under spring tension, the latter is extended at this instant (FIGS. 5 and 6). The drawer retaining strip 371 can be replaced by a differently constructed device and further reference will be made to this matter in connection with FIG. 44. However, said device must also be constructed in such a way that it is possible to unlock drawer 8 from bottom part 232. If bottom plate 226 has a corresponding thickness, it is also possible to provide a recess in place of the opening 226a therein. The essential point is that the front portion 371a of drawer retaining strip 371 can be forced into a recess or opening for unlocking drawer 8 in such a way as to initiate the unlocking process.

The card stack 9 comprises a number of carboard, hardboard or similar register cards corresponding to the number of selection keys 240 to 263. In the embodiment of a register card selection and release device shown in the drawing, there are 24 register cards 401,402,403,404,405,406,407,408,409,410,411,412,413,4-14,415,416,417,418,419,420,421,422,423,424. On their rearward edges, cards 402 to 424 have selection tongues 402a,403a,404a,405a,406a,407a,408a,409a,410a,411a,4-12a,413a,414a,415a,416a,417a,418a,419a,420a,421a,4-22a,423a,424a, which are provided with openings 450 arragend in two parallel rows corresponding to the arrangement of the card retaining pins 310 to 333, so that an opening is associated with each pin. Openings 450 in register cards 402 to 424 are appoximately circular. The in each case lowermost register card 401 can no opening 450.

The arrangement und construction of the selection keys 402a to 424a is such that starting from the bottom with register card 402, the number of openings 450 increases upwards by in each case one opening, so that card 403 on card 402 has one more opening 450 than the latter (FIGS. 15 to 18). In addition, the selection tongues are constructed in such a way that the particular opening increasing the number of openings of the in each case underlying card is covered neither by a selection tongue, nor by an opening of another card. FIG. 15 shows a portion of register card 402 with selection tongue 402a, which has an opening 450a. Selection tongue 402a has a blank, provided on the left-hand side with a sloping portion 402b, so that tongue 402a can just receive opening 450a. Register card 403 located on register card 402 has an approximately square or rectangular blank as selection tongue 403a and is provided with two openings 450a,450b, opening 450a of card 403 corresponding to opening 450a of card 402 (FIG. 16). f the two cards 402 and 403 are superimposed, selection tongue 403a of card 403 covers tongue 402a of card 402 in such a way that only tongue 402a is covered, whilst the remaining portion 403b of tongue 403a overhangs (FIGS. 17 and 18). If the particular selection card is now operated, so that its card retaining pin projects through the opening of the selection tongue 403a of register card 403 in order to simultaneously act on the drawer retaining strip 471, then said card retaining pin holds back card 403 and also all the cards located thereon. As no card retaining pin passes through opening 405a of selection tongue 402a, register card 402 is not held back and is instead advanced with the extending drawer 8.

This displacement of the in each case selected register card or the selected card with the cards located beneath it takes place by means of a cam 380 centrally shaped onto bottom plate 231 of drawer 8, in the vicinity of the drawer front wall 234a. At the front, cards 401 to 424 have an opening 430 in which engages cam 380 and on extending drawer 8 out of casing 2 draws the in each case selected register card and the cards beneath it from card stack 9. Cam 380 has an approximately triangular shape, which ensures that all those register cards which are not held back by the card retaining pin passed through openings 450, can become detached from cam 380, so that it is onyl possible to move out with the drawer the in each case exposed register card, with those cards located below it.

Selection tongues 402a to 424a of register cards 402 to 424 are constructed in stepped manner, as can be gathered from FIG. 14.

A register card selection and release device 20 constructed in this way can be used as follows. When the registered card selection and release device is not in use, drawer 8 is inserted in casing 2. Drawer 8 receives a number of register cards formed into a stack 9 and which in the rear area are provided with selection tongues having openings 450. On operating a selection key, the swivel arm connected thereto is moved with its free end in the direction of bottom plate 226 of bottom part 221 in such a way that the card retaining pin fixed to said swivel arm is passed through the openings 450 in the cards which are associated therewith and arranged in this movement path and this takes place until striking against the drawer retaining strip 371 occurs, so that its front portion 371a if forced into the opening or recess 226a in bottom plate 226 of bottom part 221. At this instant, ring 237 of drawer 8 held by cam 375 of drawer retaining strip 371 is released, because on pivoting the drawer retaining strip 371 cam 375 is pivoted out of ring 237. At this instant, drawer 8 advances as a result of the compression spring and simultaneously takes with it the selected register card and the register cards located beneath it, whereas all those cards above the selected card are held down by the depressed card retaining pin. If the extended drawer 8 with the corresponding register card located in the viewing field is no longer required, drawer 8 is pressed back into casing 2 and is held therein in that ring 237 engages in cam 375 and is held in the locked position by the drawer retaining strip which, after moving the pressure of the card retaining pin on strip 371, is moved into a slightly raised position by the resilient member 373, i.e. is moved back into that position ensuring that ring 237 on drawer 8 runs up onto cam 375 of drawer retaining strip 371 for the locking process. When drawer 8 is inserted, the register cards of card stack 9 are held by the angular retaining strips 219, 219a arranged in the inner area of casing 2 and which laterally zonally overlap the cards in stack 9, so that the cards with their selection tongues are arranged in planar manner in the vicinity of the card retaining pins.

This register card selection and release device 20 involves limited constructional and manufacturing expenditure, because the selection keys 240 to 263, together with their swivel arms 270 to 293 form a removable unit, because the swivel arms 270 to 293 are mounted by one end on supporting member 301. An incorrect selection is not possible, because only that register card is released, whose associated selection key is operated. As the selection tongues with the openings are arranged on the rearward ends of ther register cards, there is a large area of the cards on which it is possible to write. Instead of arranging cam 380 on bottom plate 231 of drawer 8, it is possible to provide laterally positioned cams. The register cards must then be provided with correspondingly constructed recesses for the engagement thereof and it must be ensured that the selected register card, together with the underlying cards, are moved along in a completely satisfactory manner on extending drawer 8, whereas the cards held back by the card retaining pin must be released by the cam. The individual register cards can be effortlessly removed from the casing in order to write thereon.

The register card selection and release 20a in the embodiment of FIGS. 19 to 39/39a is also housed in casing 2 with a box-like top art 511 and a box-like bottom part 521. Top part 511 and bottom part 521 are interconnected by means of screw or adhesive connextions and are preferably made from plastics materials, Top part 511 has side walls 513,515, front wall 512 and a rear wall 514, together with an upper cover plate 516 in which an approximately square or rectangular opening 517 is formed in the vicinity of front wall 512. The portion of upper cover plate 516 carrying opening 517 is slightly bevelled in desk or console-shaped manner. The reamining surface of cover plate 516 is provided with a non-slip covering and has a size such that it can receive a telephone or the like (FIGS. 19 to 23).

Bottom part 521 has side walls 523,525, a front wall 522 and a rear wall 524, together with a bottom plate 526 and a slot-shaped opening in front wall 522 for receiving a drawer 8.

The bottom part 521 of casing 2 receives drawer 8, which comprises a plate-like drawer bottom 531 and a front terminating strip 532 which, when the drawer 8 is inserted, closes the drawer extension opening 520 in front wall 522 of bottom part 521. In the centre of the top surface of drawer bottom 521 is provided a cam 533 (FIGS. 26 and 27). The side walls of drawer 8 are formed by two boundary walls 519,519a, which are shaped onto the inside of the casing top part 511 (FIGS. 28 and 29).

For the purpose of extending drawer 8, on bottom plate 526 of bottom part 521 is provided a steel spring bar (not shown in the drawing) in such a way that its one free end is connected to the plate-like drawer bottom 531, whilst its other end is fixed to bottom plate 526 of bottom part 521. The action of this steel spring corresponds to that of a thrust spring and has the same action as described hereinbefore in connection with spring 236.

In the vicinity of opening 517 in upper cover plate 516 of top part 511 of casing 2, is provided a plurality of selection keys having a square or rectangular shape and which are arranged in such a way that the total surface formed by the selection keys fills the opening 517 in top part 511.

In the case of the embodiment shown in FIGS. 19 and 20, there are 12 selections keys 540,541,542,543,544,545,546,547,548,549,550,551, which are correspondingly marked with the letters of the alphabet and in such a way that key 540 carries letters A, B, key 541 letters I,J,K, key 542 letters S,T, key 543 letters C,D, key 544 letters L,M, key 545 letters SCH, key 546 letters E,F, key 547 letters N,O, key 548 letters U,V, key 549 letters G,H, key 550 letters P,Q,R, and key 551 letters W,Z. The 12 selection keys 540 to 551 are juxtaposed in three rows and in four rows one behind the other, so that keys 540, 541, 542, keys 543, 544, 545, keys 546, 547, 548 and keys 549, 550, 551 in each case form one row. However, it is also possible for the selection keys to be in two rows only. All the keys are combined into a keyboard 6.

Selection keys 540 to 551 are connected to a number of lever-like swivel arms 560,561,562,563, 564,565,566,567,568,569,570 and 571 corresponding to the number of keys and to whose ends 560a,561a,5-62a,563a, 564a,565a,566a,567a,568a,569a,570a, and 571a are fixed keys 540 to 551, whilst the other ends of arms 560 to 571 carry the reference numerals 560b,561b,562b, 563b,564b,565b,566b,567b,568b,569b,570b and 571b (FIG. 25). Swivel arms 560 to 571 are constructed as two-armed levers and are pivotable mounted by means of s swivel pin 550 mounted on the side walls 513, 515 of top part 511 in such a way that the swivel arms 560 to 571 are provided approximately centrally with perforations or bores at right angles to the swivel lever longitudinal axes and through which is passed the swivel pin 580 in such a way that swivel arms 560 to 571 are arranged in freely swivellable manner on swivel pin 580.

In the vicinity of its end 560b to 571b, each swivel arm 560 to 571 has a vertically directed slot-like opening or perforation 590,591,592,593,594,595,596,597,598, 599, 600 and 601 into which engage the guide cams 610,611,612,613,614,615,616,617,618,619, 620 and 621, which are shaped on the inner wall surface of the upper cover plate 516 of top part 511 (FIG. 28). The length of guide cams 610 to 621 is such that the free ends 560b to 571b of swivel arms 560 to 571 with their slot-like openings 590 to 601 are guided by means of the said cams 610 to 621, so that a lateral displacement of the swivel arms 560b to 571b is prevented. In addition, this arrangement offers the further advantage that there is no longer any need for the special fixing of the swivel arms 560 to 571 to swivel pin 580 in order to ensure that no displacement takes place.

Selection keys 540 to 551, which comprise square or rectangular plate-like blanks and which are advantageously fixed by means of vertical webs to ends 560a to 571a of swivel arms 560 to 571, have a width which is such that the total width of selection keys 540,543,546 and 549 and 541,544,547, 550 and 542,545,548,551 juxtaposed in rows is no greater than the total width formed by swivel arms 560 to 571. The arrangement of selection keys 540 to 551 on swivel arms 560 to 571 is explained on the example of selection keys 540,541,542 relative to FIGS. 33 to 37. Selection keys 540 to 542 are arranged in a row one behind the other and are fixed to the ends 560a,561a,562a of swivel arms 560,561,562. Of these selection keys, 540,541,542 selection key 540 is fixed to end 560a of swivel arm 560 in such a way that the plate-like blank of key 540 overlaps to the right the two adjacent swivel arms 561,562, whilst the width of selection key 540 corresponds to the width of three swivel arms 560,561,562. Selection keys 541 and 542 also have widths corresponding to in each case the width of three swivel arms 560,561 and 562. The central selection key 541 is fixed to swivel arm end 561a in such a way that the plate-like key blank projects to either side and overlaps the adjacent swivel arms 560 and 562. The front selection key 541 is fixed to swivel arm end 562a in such a way that its plate-like blank projects to the left and overlaps the two swivel arms 560 and 561 (FIGS. 35,36 and 37). Selection keys 543,544,545 and 546,547,548 and 549,550,551 are fixed in the same way as keys 540,541,542 to their swivel arms 563 to 571.

The end 560b to 571b of each swivel arm 560 to 571 carries a card retaining pin 630 (FIG. 24). Each of these card retaining pins 630 is formed by a U-shaped portion 640 with webs 640a and the leg 640b running parallel to the swivel arm end. The other leg of the U-shaped portion 640 is formed by the end area 560b or 561b to 571b of the individual swivel arms 560 to 571.

The free end of leg 640b of the U-shaped portion 640 of card retaining pins 630 carries a vertically directed rod 630a, which represents the actual card retaining pin. The card retaining pins 630 are arranged on the swivel arm ends 560b to 571b in such a way that on operating a swivel arm by depressing the corresponding selection key, the rearward end of the swivel arm is raised an simultaneously the bar 630a of the U-shaped portion 640 of the particular swivel arm ist raised and, as will be explained in greater detail herinafter, engages in the openings or recesses on the rearwad edges of the register cards of the card stack arranged in drawer 8, as is indicated at 9 in FIG. 24.

To reduce the overall height of the register card selection and release device 20a, a recess 527 is provided in bottom plate 526 of bottom part 521 in the vicinity of the bearing surface of the U-shaped portion 640 of card retaining pins 630 (FIG. 24). The depth of this recess 521 approximately corresponds to the height of the webs 640b of the U-shaped portion 640 of the card retaining pins 630, but the depth of recess 527 can also be greater. What is important is to construct the recess 527 and associate the swivel pin 580 for swivel arms 560 to 571 in such a way that said arms slope slightly in the inoperative position and as shown in FIG. 24. In this inoperative position, webs 640b of the Ushaped portions 640 of the card retaining pins 630 are supported on the base surface of recess 527. This construction ensures a perfect engagement of bar 630a of the card retaining pins 630 in the openings in the rearward edge portions of the cards of stack 9. In addition, the individual bars 630a can be provided with a rearwardly bent portion 630b whose area must not exceed that of the openings provided in the edge area of the cards of stack 9. On extending drawer 8, this rearwardly bent portion 630b of bars 630 prevent a raising of those register cards located below the selected register cards and also their moving out with the drawer. The advantage of this constuction of bar 630 is particularly apparent in the case of register cards which no longer have a flat surface after prolonged use.

In order to be able to extend drawer 8 after operating a selection key, an unlocking device is provided, which is operated ty means of a swivel stirrup 650 (FIGS. 30,31 and 32), which is a U-shaped stirrup with legs 650,652 and a web 653 which interconnects them.

At ends 651a,652a of legs 651,652, swivel stirrup 650 is articulated to the outer wall surfaces of vertical boundary walls 519,519a, shaped onto top part 511 (FIG. 28). It is also possible to articulate swivel stirrup 650 with its leg ends 651,652a to the inner wall surfaces of side walls 523,525, of bottom part 521. Swivel stirrup 650 is fixed in such a way that it can swivel about the swivel pin indicated at 655 in FIG. 28. In addition, swivel stirrup 650 is arranged in such a way that when the register card selection and release device 20a is not in use, web 653 of stirrup 650 rests on swivel arms 560 to 571 in the vicinity of their ends 560b to 571b. However, it is also possible to extend leg 640b of the U-shaped portion 640 of card retaining pins 630 over and beyond the vertically directed web 640a (FIG. 24). The complete extended portions 640c then serve as a bearing surface for web 653 of the U-shaped swivel stirrup 650, which gives the advantage that the height of the casing 2 can be greatly reduced. Then, on operating a selection key of the swivel arm end, only slight raising is necessary for lifting the swivel stirrup 650.

The drawer unlocking device comprises a locking cam 656 shaped onto each of the legs 651 and 652 of swivel stirrup 650 and, as shown in FIG. 32, said cam comprises an approximately triangular body with an approximately vertically directed stop face 656a facing the rear wall of casing 2 and on which can be engaged the counter-cams 657 shaped onto either side of the plate-like drawer bottom 531, whereby each counter-cam 657 is constructed as a triangular body with a vertically directed edge 657a facing the front of casing 2.

According to FIG. 32, this drawer unlocking device functions in such a way that on operating a selection key in the direction of arrow X, the free end of the swivel arm carrying the card retaining pins 630 pivots upwards in the direction of arrow X1 and simultaneously pivots upwards the swivel stirrup 650 in the direction of arrow Y. During the pivoting of stirrup 650 in the direction of arrow Y, the two locking cams 656 on legs 651,652 of stirrups 650 are disengaged from the counter-cams 657 of drawer 8, so that drawer 8 can be extended by spring tension in the direction of arrow Y1, If, after examining a register card, drawer 8 is again to assume its position within casing 2, the drawer is inserted into casing 2 counter to the tension of the spring until the counter-cams 657 an drawer 8 engage behind the locking cams 656 on stirrups 650, the latter then assuming its inoperative position. The sliding past of counter-cams 657 of locking cam 656 on inserting drawer 8 into casing 2 is aided by the wedge-shaped guidance surfaces 656b,657b of locking cam 656 and counter-cam 657. If after inserting drawer 8, counter-cams 657 have assumed their position behind the locking cam 656, the swivel stirrup 650 swivels into its bottom position due to its own weight or also aided by a spring and consequently locks the drawer 8.

In order that in the inserted state, drawer 8 has a maximum larger bearing surface for the register card stack 9, the plate-like drawer bottom 531 has in the rear edge area a number of slot-like recesses 660,661,662,663,664,665,666,667, 668,669,670 and 671 corresponding to the number of card retaining pins 630. The length of each recess 660 to 671 corresponds to the length or leg 640b of the U-shaped portions 640 of each card retaining pin 630, so that when the pivoted levers 560 to 571 are in the inoperative position, the U-shaped portions 640 extending in the direction of the front of casing 2 engage by means of their legs 640b in the slot-like recesses 660 to 671. This construction simultaneously ensures that the swivel arms 560 to 571 are arranged in aligned manner in the inner area of casing 2, so that on operating a selection key, the corresponding card retaining pin can engage in the openings on the rear edge areas of the register cards, without any lateral displacement.

The reigster card stack 9 arranged in casing 3 has a number of register cards 701,702,703,704,705,706,707,708,709,710,711 and 712 corresponding to the number of selection keys 540 to 541, card 701 being the top card and card 712 the bottom card in stack 9 (FIGS. 38, 39 and 39a).

Each card 701 to 712 is provided with an edge recess and with a plurality of slot-like openings, whereby the edge recess extends from the uppermost register card 701 to 712 from the left-hand card side to the right-hand card side, whilst simultaneously increasing the edge recess by in each case one slot-shaped opening, whilst simultaneously reducing the number of slot-like openings from top card 701 to bottom card 713. As shown in FIGS. 39 and 39a, slot-like recesses 701a,702a,703a, 704a,705a,706a,707a,708a,709a,710a,711a and 712a are provided in the rear edge areas of register cards 701 to 712. Each register card 701 to 712 has a recess 701a to 712a. Apart from a recess 701a to 712a, each card, with the exception of the bottom card 712a, is provided with a plurality of slot-like openings, whose number decreases by in each case one opening from top card 701 to the one from bottom card 711, so that only card 712 has no opening. Instead, it only has a single recess 721a, which extends from recess 701a of card 701 up to the opening in card 711.

Thus, register card 701 has, apart from edge recess 711a, 11 openings 720,720a,720b,720c,720d, 720e,720f,720g,720h,720i i and 720k, card 703, apart from the twice as wide recess 702a, has 10 openings 721, 721a,721b,721c,721d,721e,721f,721g,721h and 721i, card 703, apart from recess 703a, has 9 openings 722,722a,722b,722c,722d,722e,722f,722g and 722h, card 704, apart from recess 704a, has 8 openings 723,723a,723b,723c,723d,723e,723f and 723g, card 705, apart from recess 705a, has 7 openings 724,724a, 724b,724c,724d,724e and 724f, card 706, apart from recess 706a, has 6 openings 725,725a,725b,725c,725d and 725e, card 707, apart from recess 707a, has 5 openings 726,726a, 726b,726c,726d, card 708, apart from recess 708a, has 4 openings 727,727a,727b,727c, card 709, apart from recess 709a, has 3 openings 728,728a,728b, card 710, apart from recess 710a, 2 openings 729 and 729a, card 711, apart from recess 711a, an opening 730 and card 712 a single recess 712a extending over the entire width of the register card. The openings formed in the edge areas of cards 701 to 712 and the edge recesses 701a to 712 are constructed and arranged in such a way that the recesses and openings of the superimposed cards are aligned with one another.

As a result of this construction, the selection of a register card takes place in such a way that on operating a selection key, by means of the pivotable swivel arm, the card retaining pin with its bar 630a engages from below in the recesses and the overlying openings, so that on extending drawer 8 all those register cards above the selected card are held back. These cards are held back by bar 630a passed through the openings, whereas the other, underlying cards can be moved out with the selected card in the drawer 8, because bar 630a passes through the recesses below the openings of the overlying cards and is consequently unable to hold back said cards.

Register cards 701 to 712 are made from cardboard, hardboard, etc and can be provided with corresponding line guides, fields, etc. In addition, each register card 701 to 712 carry those letters corresponding to the letters of the alphabet placed on the particular selection key associated with the corresponding card. Thus, card 701 carries letters A,B, Card 702 letters S,T, card 703 letters I,J,K, card 704 letters C,D, card 705 letters SCH, card 706. letters L,M, card 707 letters E,F, card 708 letters U,V, card 709 letters N,O, card 710 letters G,H, card 711 letters W,Z and card 712 letters P,Q,R.

As shown in FIG. 28, all the register cards 701 to 712 centrally have a slot-like opening 740, in which engages the cam 533 on the plate-like drawer bottom 531. Cam 533 is also triangular, so that the cards to be moved out with drawer 8 are engaged by cam 533 and can be moved with it, whilst the cards held back by the card retaining pins 630 cannot be moved with cam 533.

The aforementioned locking and unlocking device for drawer 8 can be replaced by other embodiments and reference will be made thereto in conjunction with FIG. 44.

FIGS. 40 to 43 show another embodiment of a register card selection and release device 20b operating with a drawer 8. In this case, the individual register cards are not selected by means of swivel arms and card retaining pins constructed thereon. Here, selection takes place by means of the actual selection keys, which simultaneously serve as card retaining pins.

A register card selection and release device 20b according to FIG. 40 constructed in this way comprises a casing 2 with a rearwardly open drawer 8 guided in the casing bottom and which receives a stack 9 of register cards 801. Register cards 801 are made from resilient elastic material and are provided on their longitudinal sides and adjacent to the leading card end, with engaging cutouts 815. The leading ends of register cards 801 on extending drawer 8 have selection cutouts 820, which run in stepped manner from the left and right card longitudinal side towards the centre of the cards and in accordance with the alternate step system are made smaller for each underlying registerd card. The alternate step system is preferably such that the lefthand steps are formed by the first, third, fifth and seventh cards and the right-hand step from the second, fourth and sixth card (FIG. 43).

The bottom of the drawer 8 guided in casing 2 and which is under the action of a thrust spring 812 is provided with parallel elongated slots 803 for the passage of nose-shaped cams 805 fixed to the bottom of the casing. These cams 805 have a predetermined spacing from the casing opening and which, with drawer 8 inserted, corresponds to the length of a bottom part of drawer 8 bounding a depression 816 and which slopes away from its front wall and on whose longitudinal edges is arranged in each case a dog 806 for engaging in the driving cutouts 815 of register cards 801.

Selection keys 807, combined into a keyboard 6 engage in the selection cutouts 820 of cards 801 and act on a sliding bolt 810 for closing drawer 8. Each selection key 807, which is rectangular in plan view, is under the action of an opposing spring 813 and has on each of the narrow sides a shoulder 819, said two shoulders limiting the upward travel brought about by spring 813. Below shoulders 819, that selection key 807 adapted to the profiling of the selection cutouts 820 of cards 801 is provided with a bolt 808.

For closing drawer 8, sliding bolt 810 engages in a recess 811 provided in a longitudinal side wall of drawer 8 and is adjacent to the leading end wall of said drawer. In order to be able to pivot said sliding bolt 810 out of recess 811, a control rail 809 is provided in the movement path of selection keys 807 and which is subject to the action thereof and is tiltable at right angles to the longitudinal direction thereof about a projection 814 shaped onto the box-like casing 2. On the longitudinal side opposite to selection keys 807 is guided in control rail 809 sliding bolt 810, under the action of a spring 817, is forced into recess 811 of drawer 8 and which on swinging out is simultaneously supported on control rail 809.

When this register card selection and release device 20b according to FIG. 40 is not in use, drawer 8 is held in casing 2 by sliding bolt 810. By means of the cam 805 passed through the bottom of the drawer, the register cards 801 are slightly raised in the adjacent area of their end face having selection cutouts 820, so that this area of the cards comes to rest below keys 807 (FIG. 41).

If a selection key 807 is now depressed by means of a finger, bolt 808 of this key presses on the corresponding register card projecting into the cutout area of the selection cutouts 820 of cards 801 and bends it over cam 805, optionally together with the further cards located beneath it, into the recess 816 of drawer 8 to such an extent that dog 806 engages in the lateral engaging cutouts 815 of cards 801. At the same time, the depressed bolt 808 holds back any register cards remaining in the casing in such a way that bolt 808 passes through the in each case larger selection cutout of the register card or cards located above the selected card 801 and consequently prevents said card or the further cards resting on it from being moved out as a result of frictional forces on extending drawer 8. A register card is then selected by transferring the selected card with the underlying cards into a plane, which is lower than that plane in which the cards are located when drawer 8 is inserted. The depression 816 in drawer 8 need not be formed in the drawer end face. It is also possible to position the depression in some other area of the drawer and once again the selection keys 807 must be provided with swivel arms pivotable mounted within the casing and which have at their free ends correspondingly constructed card retaining pins, by means of which the same function is fulfilled on operating a selection key as on operating the key of the telephone reigster described herein before.

During the further downwards movement of the depressable selection key 807, it strikes against the tiltable control rail 809. The lifting movement of control rail 809 directed counter to the key movement leads to the pivoting out of the sliding bolt 810 resiliently depressed by means of spring 817 from catch 811 provided in drawer 8. Control rail or strip 809 and bolt 810 are arranged in such a way that drawer 8 is only unlocked if the selected register card 801, with optionally the further cards located beneath it are engaged by the dogs 807 engaging in the driving cutouts 815 of the cards and the cards remaining in casing 2 are locked.

After pivoting sliding bolt 810 out of catch 811, drawer 8 is advanced by means of the thrust spring 812 preferably constructed as a spreading or expanding spring. On advancing drawer 8, the register cards 801 engaged by dogs 806 are drawn out of casing 2, so that the selected register card, optionally as the top card in a stack, is available with its full size for examination or to enable writing to take place thereon. During the adavance of drawer 8, the cards remaining therein slide over the nose-like projection 805 and beneath the depressed bolt 808 as a result of the resilient elastic properties of the card material (FIG. 42).

The extension of drawer 8 is determined by the length of the slots 803 provided in the bottom of drawer 8. The end of each slot can be rubber-cushioned to reduce the striking noise.

The back of cam 805 facing the front of the apparatus is bevelled to such an extent that, following the removal of register cards, they can be effortlessly reinserted into the correct stack sequence.

If after operating the register card selection and release device 20b, the finger is removed from the depressed selection key 807, as a result of restoring spring 813, this key is moved back into the initial position fixed by shoulder 819. Simultaneously, release strip 809 releases bolt 810 for engaging in recess 811 of drawer 8. Bolt 810 is forced into catch 811 when, after using the telephone register, the drawer is inserted in casing 2. On inserting drawer 8, thrust spring 812 is again tensioned and the stack of register cards is transferred into the selection position, as shown in FIG. 41.

It is also possible with this register card selection and release device to provide a differently constructed locking and unlocking device for drawer 8 and reference will be made thereto in connection with FIG. 44.

Apart from the telephone register 20, within casing 2 is arranged the device 30 for the automatic dialling of stored subscriber's numbers connected or connectable to a telephone (FIG. 1). This subscriber's number dialling device 30 is constructed in per se known manner and comprises a subscriber's number storage unit 31 and figures keys 37 and operating keys 38 combined into a keyboard 36, whereby, in accordance with FIGS. 1 an 11, the keyboard 6,36 of telephone register 20 and dialling device 30 are juxtaposed in the casing or whereby, according to FIG. 12, they are superimposed therein.

The keyboard 36 of the subscriber's number dialling device 30 comprises the keys 37 carrying the FIGS. 1 to 9 and 0. On operating a corresponding operating key, by means of figures keys 37 the individual subscriber's numbers are fed into the storage unit 31 and can in each case be called up for the automatic dialling process on feeding in a short or code number. Here again, an operating key is to be operated, after the short or code number has been fed in by means of figures keys 37. The operating keys 38 comprise e.g. a so-called index key, which is operated if the short or index number of the selected telephone is fed in. Another operating key is constituted by a repetition key, which is operated if the busy or engaged signal can be heard after starting the automatic dialling process, for which purpose the subscriber's number dialling device 30 is connected to a loudspeaker 35. After depressing the repetition key, the dialling process is repeated as often as necessary until connection with the desired subscriber is obtained. A further operating key is a programming key, which is operated whenever subscriber's numbers are to be stored in the storage unit 31. By means of a loudspeaker key, it is possible to switch on the loudspeaker 35 provided on casing 2, so that conversations with the subscriber can be carried on via the loudspeaker with the receiver replaced. By means of an erase key, it is possible to erase those subscriber's numbers which are no longer required. Operating keys initiating further special functions can be provided for different processes. In addition, in the vicinity of the dialling device 30 in the upper cover plate of casing 2, there can be a luminous figures display, by means of which it is possible to check the dialling process. The dialled subscriber's number can also be reproduced by means of this luminance figures display.

Due to the fact that the register cards of the telephone register 20 record the telephone subscribers with their short numbers for carrying out automatic dialling processes, an apparatus is provided which, in a compact manner, link a telephone register and an automatic subscriber's number dialling device, so that a plurality of subscribers can be stored in register 20 in a very small area, so that, as in known telephone computers, there is no need for supplementary modules for storing further subscriber's numbers in conjunction with the names of the subscribers. As in all cases the capacity of the telephone register exceeds the storage capacity of the telephone numbers in the storage unit of the automatic dialling device, the telephone register can also be used for noting unstored subscriber's numbers and consequently the apparatus has a multiplicity of different uses.

If for storing and recovering information and the like, the apparatus is provided with a register card selection and release device 20, in which the keyboard 6 takes up a large part of the upper casing cover plate 218, then that part of the cover plate below which is arranged the dialling device 30, can be constructed as a surface for receiving a telephone. This apparatus is also used as an anicillary device.

In the same way as the register card selection and release device 20 of FIG. 1 is provided with a subscriber's number dialling device 30, the register card selection and release devices 20a and 20b described hereinbefore and shown in FIGS. 19 and 40 are provided with a correspondingly constructed dialling device 30. The register card selection and release devices 20,20a and 20b form a structural unit with the subscriber's number dialling device 30.

The apparatus for the storage and recovery of information, subscriber's numbers, subscriber's adresses, etc comprises, according to FIG. 43, a casing with a box-like bottom part 1211, whose bottom plate is 1212 (FIG. 51). Bottom part 1211 is provided with an upper cover plate 1214, which passes into a frontal, console-shaped bevelled portion 1214a.

Casing 1002 contains a telephone register 1020 with selection devices for selecting individual register cards of a register card stack 1009, as well as an automatic subscriber's number dialling device 1030.

The telephone register 1020 is constructed as follows. Casing cover plate 1214 has a dish-shaped recess 1213, which receives the register card stack 1009, consisting of a plurality of sheets or cards carrying tags. In the present embodiment, there are 13 cards, numbered 1301,1302,1303,1304,1305,1306,1307,1308,1309,1310,13-11,1312,1313 in FIGS. 54a and 54b. At the front and back, the cards are provided with lines for inserting names, addresses, subsbcriber's numbers and code numbers. The letters of the alphabet are also printed on the cards in such a way that on its side facing the following card 1302, card 1301 carries letter A, whilst the in each case following cards 1303 to 1313 in each case carry two letters, whereof one letter is printed on the front and the other on the back. It is also possible to use a different arrangement of letters. In addition, the longitudinal edges of cards 1301 to 1313 facing the back of casing 1002 have selection cutouts 1322,1323,1324,1325,1326,1327,1328,1329,1330,1331,13-32,1333, to which further reference will be made hereinafter. On the narrow sides adjacent to the longitudinal edges of the cards and approximately level with the selection rods 1322 to 1333, each card 1301 to 1313 has slot-like recesses 1340,1341, which are used for holding and guidung the cards in casing 1002 (FIG. 49).

The dish-shaped recess 1213 can be closed by means of a cover 1215, which is preferably constructed in key-like manner and has an all around edge with the height of the complete register card stack 1009 (FIG. 45). Cover 1215 is pivotely mounted in the direction of arrow X by means of a pivot pin 1216 fixed to the casing bottom plate 1212 and is extended beyond pivot pin 1216 by a portion 1215 (FIG. 48). Curved guide rails 1217,1218 comprising angle sections are laterally shaped onto cover 1215 and which with in each case one of their two flanges are passed into recesses 1340,1341 of register cards 1301 to 1313 . In this way, cards 1301 to 1303 are also held on cover 1215 during their pivoting movement (FIGS. 45 and 49). Selection and control levers 1220,1221,1222,1223,1224,1225,1226,1227,1228,1229,12-30, 1231 and a closing lever 1232 are arranged frontally with respect to the dish-shaped recess 1213 on the desk-shaped bevelled portion 1214a of casing cover plate 1214.

Selection levers 1220 to 1231 are used for transferring the particular selected card into the viewing position, whilst lever 1232 returns the flapped up cover 1215 into the closed position.

Each selection lever 1220 to 1231 and also the closing lever 1232 are formed by two-armed levers 1240,1241,1242,1243,1244,1245,1246,1247,1248,1249,1250,1251 and 1252. The latter are pivotably mounted by means of journals 1235, 1236 shaped centrally and on either side of each lever, said journals being held in bearings 1237,1238 shaped onto bottom plate 1212. The two arms of each lever are designated 1240a,1240b,1241a,1241b,1242a,1242b,1243a, 1243b,1244a,1244b,1245a,1245b,1246a,1246b,1247a,1247b, 1248a,1248b,1249a,1249b,1250a,1250b,1251a,1251b and 1252a,1252b (FIGS. 45,46 and 47).

Lever arm ends 1240a to 1251a and 1252a of levers 1240 to 1251 and 1252 carry approximately rectangular keys 1220a,1221a,1222a,1223a,1224a,1225a, 1226a,1227a,1228a,1229a,1230a,1231a, which are passed through openings formed in the bevelled portion 1214a of casing cover plate 1214 to such an extent that keys 1220a to 1231a and 1232a project by a portion out of the bevelled part 1214a of plate 1214 and can be pressed down by the finger.

Selection keys 1220a to 1231a arranged on the bevelled portion 1214a of cover plate 1214 are combined into a keyboard 6 (FIG. 45).

In the vicinity of selection keys 1220a to 1232a is arranged on bottom plate 1212 of casing 1002 a foam body 1239 which, in the relaxed state, maintains keys 1220a to 1232a in a raised state, whilst the free ends of lever arm 1240b to 1252b come to rest on bottom plate 1212 (FIG. 47). However, if one of the keys is depressed in the direction of arrow X1 (FIG. 47), foam body 1239 is compressed in the vicinity of said key and the other free end of the lever is raised. On removing the pressure exerted on the key, the foam body 1239 attempts to move back into its original position, so that the keys are moved into their original position counter to the direction of arrow Y1. It is possible to provide differently constructed spring members in place of foam body 1239.

The ends of lever arms 1240b to 1251b of selection levers 1220 to 1231 are constructed as tongue-like portions 1240c,1241c,1242c,1243c,1244c, 1245c,1246c,1247c,1248c,1249c,1250c,1251c, which have a horizontally directed section 1260 (FIG. 47), which at one side passes into an upwardly sloping bent end portion, whilst at the other end of the horizontal section, there is an upwardly sloping bent guidance surface 1261 directed towards keys 1220a to 1231a (FIGS. 46 and 47).

Pivoted levers 1270,1271,1272,1273,1274,1274,1275,1276,1277,1278,1279,1280,1281 are associated with each of the selection levers 1220 to 1231 and with their guidance surfaces 1260,1261 cooperate with the tongue-like portions 1240c to 1251c of levers 1240 to 1251. Each pivoted lever 1270 to 1281 comprises an approximately rectangular or square, disk-like member with an opening 1285 formed in one of its four corner areas for the passage of pivot pin 1216. Prefeably, a journal-like bearing 1286,1287 is shaped onto the pivoted lever and namely on either side thereof, through which is passed pivot pin 1216 and which simultaneously serve as spacers when the pivoted levers 1270 to 1281 are mounted on pivot pin 1216 (FIGS. 50 and 51).

Due ot the fact that bearings 1286,1287 receive the pivot pin 1216 of each pivoted lever 1270 to 1281 are located in one of the four corner areas of the pivoted lever in each case, said levers are mounted in eccentric manner on pivot pin 1216. The four lateral edges of each pivoted lever 1270 to 1281 are given reference numerals 1288,1289,1290,1291. Lateral edges 1288,1289 are at a right angle to one another and in the vicinity thereof is provided opening 1285 for pivot pin 1216. Lateral edge 1289 passes into an arcuate portion 1289a, to which is connected lateral edge 1290, which slopes and is arcuate with respect to the free end of lateral edge 1288, the arcuate portion passing into a portion 1291 which is approximately parallel to lateral edge 1289, which is shorter than the latter. The area 1292 surrounded by lateral edges 1288,1289,1290,1291 is indicated by broken lines in FIG. 50 and can be constructed in solid manner or as an opening. In the latter case, the bearing orifice with opening 1285 is shaped onto the lateral edges 1288,1289 in the joining area thereof.

The construction of pivoted levers 1270 to 1281 and the shaping of guide surfaces 1289,1290 is such that when cover 1215 is closed (FIG. 52), the pivoted lever surface 1290 comes to rest on the rising portion 1261 on the ends of lever arms 1240b to 1251b. If, for example, key 1220 is now depressed, then selection lever 1220 is pivoted about its central rotation axis 1235, 1236 in such a way that the free end of 1240b is raised. The guide surface 1290 of pivoted lever 1270 now moves in the direction of guide surface 1289 of guide portion 1261 at the free end of lever arm 1240b in such a way that pivoted lever 1270 is rotated on the pivot pin 1216 in the direction of arrow Y. During this rotary movement of pivoted lever 1270, the corner portion 1288a of the latter rests on the inside of cover 1215 and simultaneously engages through the particular selection cutouts of those register cards below the selected card, so that lever 1270 comes to rest on the card to be selected and raises the latter with the overlying card stack and the cover and transfers it into a roughly vertical position. To ensure that there is no automatic folding back of the open cover 1215, the latter has an opening position, which corresponds to an angle to the plane of the casing cover plate 1214 which is greater than 90° (FIG. 53). In addition, the cover is maintained in the raised position by the upwardly sloping bent end portions 1240c to 1251c.

However, pivoted levers 1270 to 1281 need not have the construction described hereinbefore. It is also possible to construct the finger keys as selection levers with a selection lever arm and a pressure lever arm which pivots the lifting fingers by means of a tooth system. The selection levers then directly engage in the pivotable lifting fingers, whilst tooth portions are provided on the selection levers and the lifting fingers which, with the fingers swung downwards, are out of reciprocal engagement and only when these fingers are swung upwards come into reciprocal engagement, The selection levers have projections, which press on the lifting fingers in the pivoting direction and bring about the pivoting movement until the tooth portions engage.

The operation of the above-described telephone register 1020 will now be explained. If key 1224a is depressed, by means of lever 1244, the pivoted lever 1274 associated therewith is pivoted and is passed trough the cutouts 1326 of the register cards located in recess 1213 of cover plate 1214, said cards being guided from bottom to top and are numbered 1313,1312,1311,1310,1309,1308,1307 and 1306 and engages on the bottom of card 1305, as shown in FIG. 45. Due to the fact that lever 1274 is pivoted upwards, cover 1215 is opened and simultaneously cards 1304,1303,1302,1301 located above card 1305 are flapped up. If key 1232a is depressed, cam 1282 slides on a sloping surface 1283 formed on the free end of lever 1242 (FIG. 46) and rotates about pivot pin 1216 in such a way that it engages on the portion of the cover 1215 indicated below said pin, so that cover 1215 is forced in the direction of arrow Y1 and on passing beyond the vertical cover position is moved into the closed position as a result of its own weight (FIG. 48) and by means of portion 1240c of lever 1240 is simultaneously subject to a braking wedging action. The dover is closed by operating closing key 1232 by means of cam 1282, which is also arranged on pivot pin 1216 (FIG. 51).

Apart from the telephone register 1220, the interior of casing 1002 contains the device 30 for the automatic dialling of stored subscriber's numbers and which is connected or connectable to a telephone (FIG. 45). This subscriber's number dialling device 30 is constructed in per se known manner and comprises a subscriber's number storage unit 31 and figures keys 37 and operating keys 38 combined into a keyboard 36. Keyboard 6,36 of the telephone register 1020 and dialling device 30 are juxtaposed in the casing according to FIGS. 45 and 55 or are superimposed in the casing according to FIG. 56.

Keyboard 36 of dialling device 30 comprises keys 37 carrying numbers 1 to 9 and 0. By means of the figures keys 37, on operating a corresponding operating key, the individual subscriber's numbers are fed into the storage unit 31 and can be called up for the automatic dialling process at all times by feeding in a short or code number. Here again, one of the operating keys must be operated, after feeding in the short or code numbers by means of figures keys 37. Operating keys 38 comprise, for example, a so-called index key, which is operated if the short or index number of the desired telephone is fed in. A further operating key is constituted by a repetition key, which is operated if, after starting the automatic dialling process, the engaged or busy signal can be heard, for which purpose dialling device 30 is connected to a loudspeaker 35. After depressing the repetition key, the dialling process is repeated as frequently as necessary until the connection with the desired subscriber is obtained. An additional operating key is a programming key, which is operated whenever subscriber's numbers are to be stored in the storage unit 31. By means of a loudspeaker key, it is possible to switch on loudspeaker 35 provided on casing 1002, so that conversations with the subscriber can take place via the loudspeaker with the receiver replaced. An erase key makes it possible to erase those subscriber's numbers, which are no longer required. For various other processes, it is possible to provide other operating keys which initiate special functions. In addition, a luminous figure display can be provided in the upper cover plate of casing 1002 in the vicinity of dialling device 30 and by means of this the dialling process can be checked. The luminous figure display also makes it possible to reproduce the desired subscriber's number.

Due to the fact that the register cards of the telephone register 1020 carry the telephone subscribers with their short numbers for carrying out automatic dialling processes, an apparatus is provided combining in a compact construction a telephone register and an automatic subscriber's number dialling device, so that it is possible to store a plurality of subscribers in register 1020 in a very small space so that, as in known telephone computers, there is no need for supplementary modules for storing further subscriber's numbers in conjunction with the namens of the subscribers. Since in all cases the telephone register capacity exceeds the storage capacity for telephone numbers in the storage unit of the dialling device, the telephone register can also be used for noting unstored numbers, so that the complete apparatus has a multiplicity of uses.

FIG. 57 shows a keyboard 1401 in which, bounded by a broken line border, a plurality of selection keys is provided, on whose operation one from a stack of register cards is selected and is rendered visible to the user. Such an apparatus is known and is not therefore shown again in FIG. 57.

Apart from the selection keys 1402, figures keys 1403 are provided in a broken line border in an arrangement of the type used in pushbutton telephones by the German Post Office. Alongside keys 1403, there is a key 1404, which is made somewhat larger for reasons of clarity and which permits the dialling of a number in the Post Office exchange line. Below the exchange key 1404 is provided an erase key 1405, whose operation is able to erase already fed-in figures for correction purpose. Below figures key 7 is provided a function key 1406, whose operation leads to the feeding in of a selection signal "earth". Below figures key 9 is provided a function key 1407, whose operation inserts a signal for an interval in the subscriber's number.

To the left and alongside selection keys 1402, further function keys 1409 to 1417 are arranged in a unit represented by border 1408 and their actual function will be described hereinafter. Above these function keys is provided a display panel 1418, which normally shows the time with hours, minutes and seconds. When after dialling a number, the subscriber lifts up the receiver and the conversation begins, the stopwatch starts to run and the conversation time is permanently displayed on display 1418. In addition, the tariff units pulses coming in on the exchange line are summated in the electronic part and can optionally be converted into a particular monitary sum by multiplication with the price of a tariff unit. For this purpose, a switch 1419 is arranged above display 1418, which makes it possible to choose in different switching positions whether at the start of conversation, the conversation time, or the number of tariff units or the conversation price is to be continuously displayed. This continuous display is maintained when the conversation is at an end and is erased prior to the next dialling operation, e.g. when the receiver of an associated telephone is replaced. The number of speech units can also be established by means of a connected printed and/or summated in a continuous manner by means of a summating device, e.g. for a period of a complete month.

Above selection keys 1402 is provided a display panel 1420, in which are shown the fed-in figures and characters, e.g. in an eight-digit, eight-segment display.

FIG. 58 shows in block diagram form the parts of an apparatus according to the invention shown in FIG. 57, together with the associated electronic signal processing stages, the connecting line between the individual stages optionally being in the form of a bus and designed for separate signal transmission in opposite directions.

In the case of such an apparatus by means of one of the contacts associated with each selection key 1402, a signal is supplied to a line 1421, associated with the first code number. As the signal from selection key 1402 is possibly not exact due to the coupled mechanism, it may be advantageous to connect a pulse shaper 1422 into line 1421 and which supplies an exacht control signal on operating a key 1402. This signal is supplied by means of a combination stage 1423 to an input, processing and output unit 1424, to which are connected further function groups, such as code selectors 1425, display means 1420, exchange line character analyzers 2426, monitoring devices 1427, tariff pulse filters 1428, keys 1404 to 1417, clock 1418 and switch 1419, a battery 1429 and a microprocessor 1430, as well as possible further stages. By means of processing unit 1424, the first code number is displayed in display unit 1420. Simultaneously, microprocessors 1430 and a storage unit 1431 check whether a storage location is still free with a second code number corresponding to the first code number selected by key 1402. The number of a free storage location is displayed alongside the first code number with an additional marking, e.g. an underline or a rhythmic flashing. If the display 1420 has only one digit, i.e. only permits the representation of a single figure, the first code number is initially displayed for a certain time, e.g. one second and subsequently the second code number with its corresponding marking. If there is no further storage location associated with the first code number which is free, another marking, e.g. a horinzontal line in the centre of the figures field is displayed.

If a free second code number appears and a new subscriber's number is to be written into the said store, this figure is introduced in keyboard 1403 and therefore operated. The code number is then finished and the aforementioned marking, e.g. a flashing process ends. The two code numbers are combined in a combination stage 1423 and fed to input unit 1424. Combination stage 1423 preferably contains a barrier in such a way that the connection of the contacts of the other selection keys 1402 to processing unit 1424 is interrupted if a selection key has already been depressed. This prevents a modification of the first code number if e.g. on entering an address on a register card, another selection key 1402 has been touched in error.

According to another embodiment, the combination stage 1423 can be constructed in such a way that the signal transferred by a first register contact into stage 1423 is corrected if, after depressing a first key, a second key is depressed. If a subscriber cannot be found on a register card, it is possible without difficulty to operate another register card and the associated first code number is automatically fed in.

If a free store is selected by choosing the figures of the second code number, key 1409 is operated for preparing the store and, optionally following the displayed code number, display 1420 displays a corresponding reference, e.g. a letter S. The desired subscriber's number can then be fed in with the aid of the figures keys 1403. An interval can be inserted by operating key 1407 between parts of subscriber's numbers, e.g. the actual number, the place code and optionally the country code. Particularly in the case of private branch exchanges, it may be necessary to key in with key 1407, an earth connection as an auxiliary signal, in conjunction with the desired subscriber's number. The interval can appear as a gap or a large P in the display panel, whilst the symbol E can be used for the earth key 1406. After feeding in the subscriber's number, key 1410 is operated and the storage process is then at an end.

If a stored subscriber's number is sought and then automatically dialled, the card of the particular subscriber is firstly depressed, in the manner described hereinbefore for storing a subscriber's number. The second code number of a free storage location and/or the symbol for occupied storage locations apperaring in addition to the first code number ist then ignored and the second code number of the desired subscriber is fed in by means of figures key 1403. The sought subscriber's number is then transferred to a dialing store 1432 and is also represented in display 1420, optionally in the form of individual figures, or in figure groups, or in successive continuous manner. On operating the exchange key 1404, dialling unit 1425 calls the telephone number out of dialling store 1432 digit by digit and, in accordance with the pulses, is transferred into an exchange line connected to a terminal 1433.

If it is not possible to make the connection, by depressing a repetition key 1414, it is possible to bring about an automatic redialling of the desired number from dialling store 1432 after a given time, e.g. 3 minutes. By depressing store key 1409 and then reserve key 1412 or 1413, it is also possible to transfer the subscriber's number in dialling store 1432 into a reserve store to enable its dialling at a random later time through depressing the particular reserve key and the exchange key 1404. Thus, it is possible to subsequently redial an engaged subscriber and in the meantime carry out another telephone conversation. If a call is repeated, the associated telephone number is always displayed on display 1420.

If a subscriber is to be directly dialled, this can take place by means of figures keys 1403. If a first code number is not supplied via line 1421 from selection keys 1402, it is established in combination stage 1423 that dialling is taking place without a code number, so that the signals are transferred from keyboard 1403 directly into store 1432 and are displayed on display 1420. If exchange key 1404 is depressed, dialling takes place via device 1425.

It is also possible to dial without opening the register and without making a card visible. For this purpose, e.g. from memory, the first code number is fed in by slight contact with the associated selction key 1402 and then the second code number by a key 1403.

By depressing exchange key 1404, the thus selected subscriber's number passes via terminal 1433 to each exchange line.

In each of the keys 1415 and 1416 can be stored an emergency or distress call number, which is directly transferred via dialling device 1425 to the exchange line on depressing one of these two keys. Storage takes place in the manner described hereinbefore for direct telephone dialling and for the repeat keys. The subscriber's number is fed into the dialling store 1432 with coupled display 1420 by means of keys 1403. The store keys 1409 and the particular emergency call key 1415 or 1416 is then pressed. The content of the dialling store is consequently transferred into the store associated with the particular emergency call key. Preferably, at least one of the keys 1415 or 1416 is differentiated by its shape, colour or the like from the remaining function keys, e.g. for the police.

The exchange key 1404 can be combined with a mechanism for extending a note pad or the like, which is then accessible in place of a register card and can be used for taking notes during the telephone conversation. Advantageously, the exchange key is constructed in such a way that an electrical contact is closed even when weak finger pressure is exerted and dialling takes place in accordance with the figures in dialling store 1425. When stronger pressure is exerted on the exchange key, dialling is started and for this purpose the note pad or the like is extended.

Advantageously, the display and the further information processing stages are constructed in accordance with a technology, e.g. semiconductor technology with minimum current consumption and supply takes place by means of a battery 1429 having a life of several years. There is an indication, e.g. by flashing of the figures desplayed on display 1420 is given when the battery is near the end of its life, but the electrical parts of the apparatus are still fully supplied and operate completely satisfactorily. The user can then insert a new battery in battery holder 1434 alongside the holder for the first battery 1429, which can then be removed. Thus, the apparatus is constantly live and no stored information is lost.

A subscriber's number stored under a code number can be erased by operating the associated selection key 1402 and figures key 1403, followed by the store key 1409. As described hereinbefore, it is then possible to feed in a new telephone number with the aid of keyboard 1403, after which key 1410 is pressed to end the storage process. If key 1410 is operated immediately after key 1409, the particular store is completely erased.

The signal on the exchange line can be tapped by means of an induction coil 1435 and supplied to a monitoring device. In addition, the exchange line signal is supplied to a monitoring device 1426, which establishes whether the called subscriber answers or whether the line is engaged. This information can be further evaluated by means of processing unit 1424.

A not shown key switch can be connected to unit 1424 to allow or inhibit dialling. The key switch can also be switched in such a way that it can allow or prevent new subscriber's numbers to be stored or erased.

Both the keys of keyboard 6 and keyboards 36 can be used for operating the apparatus for selecting register cards from a stack of cards and for subscriber dialling according to the figures of a subscriber's number in an exchange line of a telecommunications and in particular telephone system, i.e. the apparatus can be operated by means of the selection keys of keyboard 6.

I claim:

1. Apparatus for the storing and recovery of information, like subscriber's numbers and subscriber's addresses, characterized in that in a casing (2) a register card selection and release device (20, 20a, 20b) is provided, comprising:

a plurality of selection keys (240–263) combined into a keyboard (6) and a drawer (230) under the action of a compression spring and closable by means of a locking device with a stack (9) of register cards (401–424) housed therein, which on their back edge portions have selection tongues (402a–424a) with openings (450), each selection key (240–263) being fixed to a swivel arm (270–293) constructed as a lever and mounted in the casing (2) and which carries at its free end (270b–293b) a card retaining pin (310–323) directed perpendicular to the base plate (226) of the casing bottom part (221), the card retaining pins (310–323) being juxtaposed in two rows and being staggered relative to one another in such a way that the pins of every other swivel arm are combined into a row, while a resiliently mounted drawer retaining strip (371) is arranged in the vicinity of the movement path of the card retaining pins (310–323) in the rear area of the base plate of the casing bottom part (221), said retaining strip being in operative connection with a drawer locking device (270) releasing the extension of the drawer under the action by the card retaining pin of a depressed selection key and the openings (450) for the card retaining pins (310–333) in the rear edge portions of the register cards (401–424) extend in stepped manner and are increasing in size by in each case one selection tongue carrying an opening from the lowermost register card (402) with the first opening (450) from right bottom to top left and the uppermost register card (424), each selection tongue (404a) having a number of openings (250b) corresponding to the number of openings (450) of the selection tongues (420a–424a) of the in each case lower register card (402), increased by one opening, wherein the opening by which each register card is increased compared with the openings of the selection tongues of the in each case underlying register card overhangs with respect to the card portions of the in each case underlying register cards carrying the tongue-like openings, whilst the openings in the selection tongues of the register cards are arranged in a superimposed manner, the selection tongues of every other register card having a sloping portion (402b) for releasing an opening (450b) of the selection tongue (403a) of the in each case underlying register card (403), and furthermore a device (30) arranged within said casing for automatically dialing stored subscriber's numbers connectable to a telephone, and which is provided with a subscriber's number storage unit (31) having a keyboard (36), figures keys (37), and operating keys (38).

2. Apparatus according to claim 1, characterized in that the plurality of selection keys (240–263) are series juxtaposed.

3. Apparatus according to claim 1, characterized in that the plurality of selection keys are superimposed.

4. Apparatus according to claim 2, characterized in that the plurality of selection keys are superimposed.

5. Apparatus for the storing and recovery of information, like subscriber's numbers and subscriber's addresses, characterized in that in a casing (2) a register card selection and release device (20, 20a, 20b) is provided, comprising:

a plurality of series juxtaposed and superimposed selection keys (540–551) combined into a keyboard (6) and a drawer (530) under the action of compression springs and closable by means of a locking device having a stack (9) of register cards (701–712) arranged therein, which on their rear edge portions have selection tongues (701a–712a) with openings, each selection key (540–551) being fixed to a swivel arm (560–571) constructed as a lever and mounted in the casing and which carries at its other free rear end a U-shaped card retaining pin (630), wherein the vertically upwardly directed bar (630a) of every card retaining pin (630) has a cam-like projection parallel to the leg (640b) of the U-shaped portion (640) of the card retaining pin, wherein the drawer comprising a plate-like drawer bottom (531) with a front closing strip (532) closing the drawer extension opening (520) in the casing front wall (512, 522) when the drawer (530) is inserted is constructed to be open at the back and at both sides and in its rearward edge area has a number of slot-like recesses (660–671) corresponding to the number of card retaining pins (630) and having a length corresponding to that of the U-shaped portions (640) at the ends of the swivel lever (560, 571), while the two lateral drawer boundary walls are formed by the two boundary walls (519, 519a) arranged on either side of the plate-like drawer bottom (531) and shaped onto the inner wall surface of the casing cover part and wherein for guiding the swivel lever, each swivel lever is provided on the end (560b–571b) carrying the card retaining pin (630) with a vertically directed slot-like opening (590–601) in which engages a cam (610–621) shaped onto the inner wall surface of the casing cover part (511) and is guided in said opening, and furthermore a device (30) arranged within said casing for automatically dialing stored subscriber's numbers connectable to a telephone, and which is provided with a subscriber's number storage unit (31) having a keyboard(36), figures keys (37), and operating keys (38).

6. Apparatus for the storing and recovery of information, like subscriber's numbers and subscriber's addresses, characterized in that in a casing (2) a register card selection and release device (20, 20a, 20b) is provided, comprising:

an extendable and retractable drawer (802) arranged in the casing (2) with a stack (9) of register cards (801) with selection cutouts (820) and with a depression (816) formed in the drawer bottom for separating the selected register card from the register cards left behind in the casing (2) and for transferring the selected card into an extension plane by means of selection keys (807) combined into a keyboard (6), and with dogs (806), and furthermore a device (30) arranged within said casing for automatically dialing stored subscriber's numbers connectable to a telephone, and which is provided with a subscriber's number storage unit (31) having a keyboard (36), figures keys (37), and operating keys (38).

7. Apparatus for the storing and recovery of information, like subscriber's numbers and subscriber's addresses, characterized in that in a casing (2) a register card selection and release device (20, 20a, 20b) is provided, comprising:

a casing (1002) with selection means, wherein the casing (1002) with a box-like base part (1211), whose upper casing cover plate (1214) is provided with a dish-shaped depression (1213) for receiving a stack of loose register cards (1009) carrying reference numbers, is provided on the edge with register-like selection cutouts (1222–1333), a cover being pivotably mounted on the casing about a horizontal axis (1216) which covers the dish-shaped depression (1213) with the cards, said cover (1215) being in operative connection with two-armed selection and control levers (1270–1281) which can be depressed by vertical pushbutton pressure and acting on the register cards via swivel levers having at its front free ends selection keys (1220a–1231a) combined into a keyboard (1006) and at the ends opposite to the selection keys tongue-like portions, (1240c–1251c), the register cards of the stack being held in lateral guides (1217, 1218) in the vicinity of the cover swivel axis (1216), and furthermore a device (30) arranged within said casing for automatically dialing stored subscriber's numbers connectable to a telephone, and which is provided with a subscriber's number storage unit (31) having a keyboard (36), figures keys (37), and operating keys (38).

8. Apparatus according to claim 1, characterized in that a loudspeaker (35) connected to the subscriber's number dialling device (30) is arranged in the casing (2).

9. Apparatus for selecting a register card from a stack by operating a selection key and for carrying out subscriber dialling on the basis of the digits of a subscriber's number in a subscriber's line in telecommunications and particularly telephone equipment, on the basis of a two-digit code number, wherein via electrical contacts associated with the digits of the code number, a microprocessor with the associated stores is controlled, wherein the selection key selects the register card, perferably through mechanical means and makes said card visible, by selectably drawing out a drawer and raising a cover, an associated contact being operable by each selection key, the code number and optionally the digits of a subscriber's number being displayed on a display panel located alongside the selection keys, whilst further function keys are provided, according to claims 1, 5, 6 or 7, characterized in that alongside the selection keys there are figures keys for the digits of a decade, and that with the contact of one of the selection keys there is fed in the first code number, and with the contact of one of the figures keys (1403), the second code number is fed in, said code numbers being supplied to the microprocessor (1430) in such a way that on operating one selection key automatically the associated first code number and selectably one of a reference character and symbol are displayed on the display panel (1420), and that at least one function key (1415, 1416) is provided for one of directly calling a stored subscriber's number and dialling with the figures keys (1403).

10. Apparatus according to claim 9, characterized in that the figures keys (1403) are positioned adjacent to the selection keys.

11. Apparatus according to claim 9, characterized in that the function keys (1409–1417) are positioned adjacent to the selection keys.

12. Apparatus according to claim 9, characterized in that a exchange key (1405) is arranged alongside the figures key (1403).

13. Apparatus according to claim 9, characterized in that the exchange key (1401) is combined with a mechanism adapted for extending a note pad.

14. Apparatus according to claim 13, characterized in that when weak pressure is exerted on the exchange key, an electrical contact is closed and dialling takes place in accordance with the figures in a dialling store (1432).

15. Apparatus according to claim 13, characterized in that when stronger pressure is exerted on exchange key (1404) dialling is commenced and the note pad extended.

16. Apparatus according to claim 9, characterized in that the figures stored in dialling store (1432) are displayed.

17. Apparatus according to claim 12, characterized in that by means of at least one function key (1415,1416) an emergency call can be initiated, which is delivered to the exchange line without any additional operation of the exchange key (1004).

18. Apparatus according to claim 17, characterized in that the emergency function key (1415,1416) is differentiated by one of shape, and colour from the other function keys.

19. Apparatus according to claim 9, characterized in that an erase key (1405) is arranged alongside the figures keys (1403) for erasing the fed-in-figures.

20. Apparatus, according to claim 9, characterized in that the display means and further information processing stages (1422,1423,1424,1425,1426,1427,1428,1430,1431,1432) use a minimum amount of power and that supply is provided by a long-life battery (1429).

21. Apparatus according to claim 20, characterized in that a display takes place, e.g. by the rhythmic flashing of the displayed figures, when the battery (1429) nears the end of its life, but the electrical parts of the apparatus are still fully supplied with power.

22. Apparatus according to claim 21, characterized in that alongside the holder for the first battery (1429) is provided a second battery holder (1434) whose contacts are connected in parallel to the contacts of the first battery holder.

23. Apparatus according to claim 20, characterized in that the keys and other function groups, namely the code selector (1425), display (1420), exchange line character analyzer (1426), monitoring device (1427), tariff pulse filter (1428), are interconnected by means of an input, processing and output device (1424), whilst being connected to a microprocessor (1430).

24. Apparatus according to claim 9, characterized in that function keys are provided for exchange dialling (1404), by at least one of repeat dialling (1414), reserve store (1412,1413), emergency direct dialling (1415,1416), storage start (1409) and storage end (1410).

25. Apparatus according to claim 9, characterized in that the contacts of the selection keys (1402) are connected to the processing unit (1424) via at least one pulse shaping stage (1422).

26. Apparatus according to claim 9, characterized in that the contacts of the selection keys (1402) and figures keys (1403) are connected to the processing unit (1424) via a combination stage (1423).

27. Apparatus according to claim 25, characterized in that the connection between the contacts of the other selection keys (1402) and the processing unit (1424) is interrupted, if a selection key has been depressed.

28. Apparatus according to claim 25, characterized in that the signal transferred from a first selection key (1402) into the combination stage (1423) is corrected if a further selection key is depressed with a first selection key already depressed.

29. Apparatus according to claim 9, characterized in that upon pressing a selection key, the first code number may be fed in, and the fed in code number is thereafter displayed.

30. Apparatus according to claim 29, characterized in that the store offered as free by the marking is selected by pressing the particular figures key (1403), that a key (1409) is operated for preparing the store and displays a symbol, e.g. S, that the desired telephone subscriber's number is fed in and that then a key (1410) is operated for ending the storage process.

31. Apparatus according to claim 9, characterized in that a dialled subscriber's number, e.g. when a connection has not taken place, is transferred by means of a function key (1412,1413) into a reserve store and can be called up from there at a random time.

32. Apparatus according to claim 1, characterized in that there is a time display (1418) which, before the start of a conversation, displays the duration one of the conversation or the accumulated tariff units.

33. Apparatus according to claim 32, characterized in that it is possible to choose by means of a switch (1419) if one of the stopped conversation duration and the number of tariff units is to be displayed in display (1418) after the start of the conversation.

34. Apparatus according to claim 32, characterized in that it is optionally possible to choose by means of switch (19) to display the tariff monitary sum in place of the tariff units.

35. Apparatus according to claim 29, wherein, following display of said code number, those figures which display a next free store are indicated, and that another marking, e.g. a horizontal line is displayed when all the stores belonging to the first code number are occupied.

36. Apparatus according to claim 29, wherein the figures displaying a next free store are indicated by an additional marking, e.g. one of underlining and flashing.

37. Apparatus according to claim 9, wherein the figures which have been called up from a store are transferred into a dialling store (1432).

38. Apparatus according to claim 9, wherein, in the case of direct dialling, the figures which have been transferred into an exchange line (1433) are further transferred into a dialling store (1432).

39. Apparatus according to claim 37, wherein the figures which have been transferred into the dialling store (1432) are displayed by one of an individual, successive, and continuous display.

40. Apparatus according to claim 38, wherein the figures which have been transferred into the dialling store (1432) are displayed by one of an individual, successive, and continuous display.

* * * * *